United States Patent
Li et al.

(10) Patent No.: US 9,468,022 B2
(45) Date of Patent: Oct. 11, 2016

(54) METHOD AND APPARATUS FOR RANDOM ACCESS IN COMMUNICATION SYSTEM WITH LARGE NUMBER OF ANTENNAS

(71) Applicant: Samsung Electronics Co., LTD, Suwon-si, Gyeonggi-do (KR)

(72) Inventors: Ying Li, Richardson, TX (US); Richard Stirling-Gallacher, Dallas, TX (US); Zhouyue Pi, Allen, TX (US); Rakesh Taori, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 14/133,483

(22) Filed: Dec. 18, 2013

(65) Prior Publication Data

US 2014/0177607 A1   Jun. 26, 2014

(51) Int. Cl.
*H04B 7/06*   (2006.01)
*H04W 74/08*   (2009.01)

(52) U.S. Cl.
CPC .............................. *H04W 74/0833* (2013.01)

(58) Field of Classification Search
CPC .. H04W 16/28; H04B 7/0617; H04B 7/0632
See application file for complete search history.

(56) References Cited

U.S. PATENT DOCUMENTS

| | | | |
|---|---|---|---|
| 6,349,217 B1 | 2/2002 | Honcharenko et al. | |
| 2009/0168718 A1* | 7/2009 | Wang et al. | 370/330 |
| 2009/0170514 A1* | 7/2009 | Yokoyama | 455/436 |
| 2009/0175161 A1 | 7/2009 | Yi et al. | |
| 2009/0253387 A1* | 10/2009 | Van Rensburg et al. | 455/90.2 |
| 2010/0150013 A1 | 6/2010 | Hara et al. | |
| 2010/0267341 A1* | 10/2010 | Bergel et al. | 455/63.1 |
| 2010/0296472 A1* | 11/2010 | Lee et al. | 370/329 |
| 2011/0085610 A1* | 4/2011 | Zhuang et al. | 375/260 |
| 2011/0122821 A1 | 5/2011 | Laroia et al. | |
| 2011/0170498 A1* | 7/2011 | Liu et al. | 370/329 |
| 2012/0063302 A1* | 3/2012 | Damnjanovic et al. | 370/228 |
| 2012/0320874 A1 | 12/2012 | Li et al. | |
| 2013/0148611 A1 | 6/2013 | Moulsley et al. | |
| 2015/0049824 A1* | 2/2015 | Kim et al. | 375/267 |

FOREIGN PATENT DOCUMENTS

| WO | WO 2009/075622 A1 | 6/2009 |
|---|---|---|
| WO | WO 2011/053993 A1 | 5/2011 |
| WO | WO 2012/028204 A1 | 3/2012 |

OTHER PUBLICATIONS

International Search Report dated Apr. 25, 2014 in connection with International Patent Application No. PCT/KR2013/012208, 4 pages.
Written Opinion of International Searching Authority dated Apr. 25, 2014 in connection with International Patent Application No. PCT/KR2013/012208, 6 pages.
Extended European Search Report dated Jul. 27, 2016 in connection with European Application No. 13868201.8, 7 pages.

* cited by examiner

*Primary Examiner* — Fan Ng

(57) ABSTRACT

A method for performing random access by a User Equipment (UE) in a wireless network, comprises configuring at least one UE transmit beam for a transmission of a random access signal, generating the at least one UE transmit beam using an antenna array according to the configuration, and transmitting the random access signal to a base station (BS) on the at least one UE transmit beam. An user equipment for performing random access in a wireless network, the User Equipment comprises a processing circuit configured to configure at least one UE transmit beam for a transmission of a random access signal, and generate the at least one UE transmit beam using an antenna array according to the configuration, and transmit the random access signal to the Base Station (BS) on the at least one UE transmit beam.

12 Claims, 28 Drawing Sheets

| FIG. 18A | FIG. 18B | FIG. 18C |

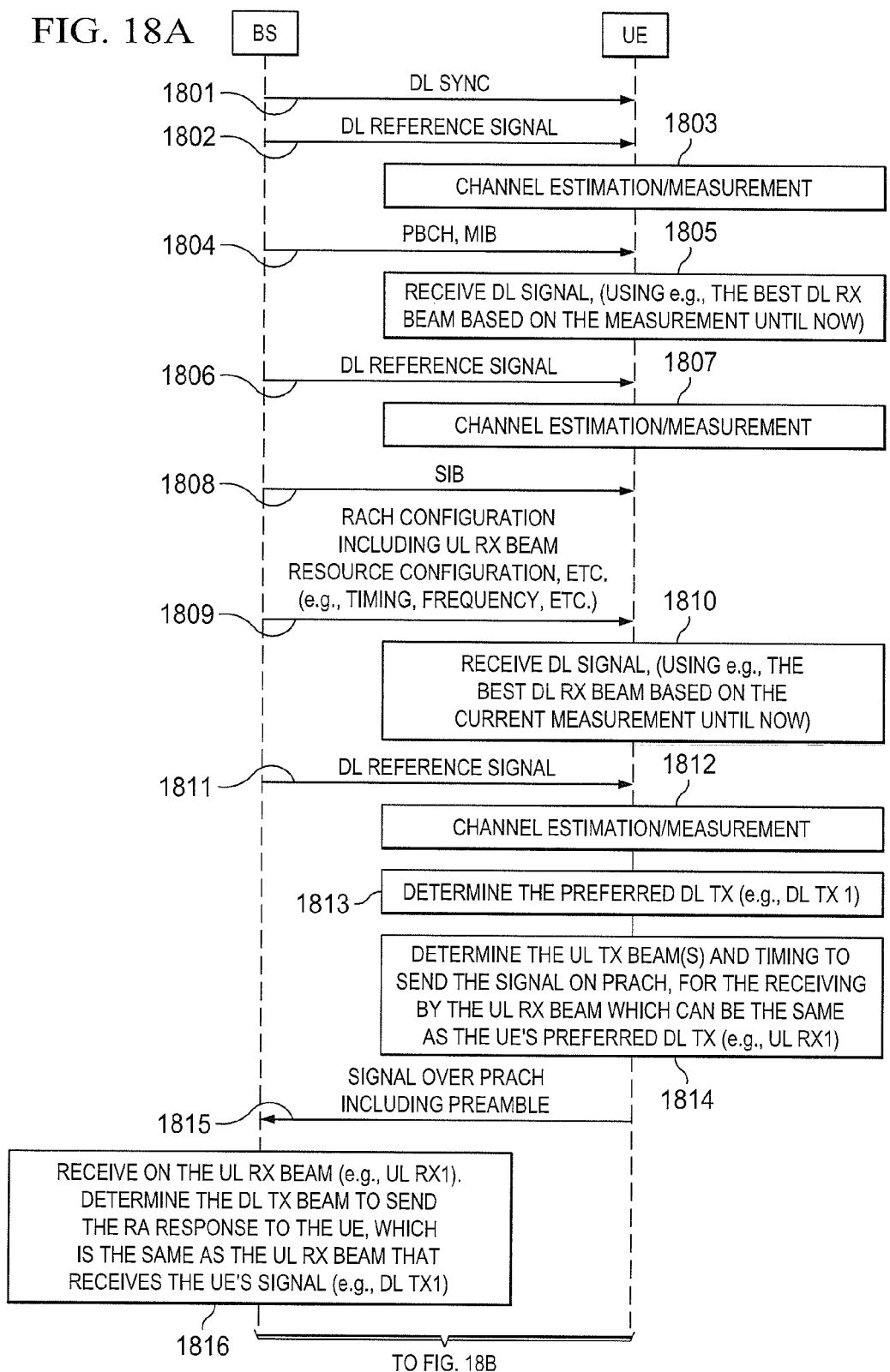

METHOD AND APPARATUS FOR RANDOM ACCESS IN COMMUNICATION SYSTEM WITH LARGE NUMBER OF ANTENNAS

CROSS-REFERENCE TO RELATED APPLICATION(S) AND CLAIM OF PRIORITY

The present application claims priority to U.S. Provisional Patent Application Ser. No. 61/748,363, filed Jan. 2, 2013, entitled "RANDOM ACCESS IN COMMUNICATION SYSTEM WITH LARGE NUMBER OF ANTENNAS" and to U.S. Provisional Patent Application Ser. No. 61/745,977, filed Dec. 26, 2012, entitled "ADAPTIVE RANDOM ACCESS IN WIRELESS NETWORKS WITH LARGE NUMBER OF ANTENNAS". The content of the above-identified patent documents is incorporated herein by reference.

TECHNICAL FIELD

The present disclosure relates generally to a random access channel (RACH) procedure in the millimeter-wave mobile broadband (MMB) system.

BACKGROUND

It is anticipated that the next generation of mobile broadband communication systems (5G) will need to deliver 100~1000 times more capacity than current 4G systems (e.g., LTE and WiMAX) to meet the expected growth in mobile traffic. Existing approaches to increase spectral efficiency are unlikely to meet this explosive demand in wireless data. Current 4G systems use a variety of advanced techniques including Orthogonal Frequency Division Multiplexing (OFDM), Multiple Input Multiple Output (MIMO), multi-user diversity, spatial division multiple access (SDMA), higher order modulation and advanced coding, and link adaptation to virtually eliminate the difference between theoretical limits and practical achievements. Accordingly, newer techniques like carrier aggregation, higher order MIMO, Coordinated Multi-Point (CoMP) transmission, and relays are expected to provide only modest improvement in spectral efficiency. One strategy for increasing system capacity that has worked well in the past is the use of smaller cells. However, the capital and operating costs required to acquire, install, and maintain a large number of cells can be challenging since a 1000 fold increase in capacity would, in theory, entail a 1000 fold increase in the number of cells deployed. Moreover as the cell size shrinks, there is a need to perform frequent handovers that increase network signaling overhead and latency.

SUMMARY

Embodiments of this disclosure provide a method and system for performing adaptive random access in a wireless network with a large number of antennas.

In certain embodiments, a method for performing random access by a User Equipment (UE) in a wireless network is provided. The method includes configuring at least one UE transmit beam for a transmission of a random access signal. The method also includes generating the at least one UE transmit beam using an antenna array according to the configuration. Further, the method includes transmitting the random access signal to a base station (BS) on the at least one UE transmit beam.

In certain embodiments, a method for performing random access by a Base Station (BS) in a wireless network is provided. The method includes receiving a random access signal on at least one User Equipment (UE) transmit beam from a UE. The method also includes configuring at least one downlink transmit (DL TX) beam for transmitting a response to the random access signal. The response to the random access signal is transmitted to the UE on the at least one DL TX beam.

In certain embodiments, a User Equipment (UE) for performing random access in a wireless network is provided. The UE includes a processing circuit configured to configure at least one UE to transmit beam for a transmission of a random access signal. The processing circuit is also configured to generate the at least one UE transmit beam using an antenna array according to the configuration and transmit the random access signal to the Base Station (BS) on the at least one UE transmit beam.

In certain embodiments, a base station for performing random access by a Base Station (BS) in a wireless network is provided. The BS includes a processing circuit configured to receive a random access signal on at least one User Equipment (UE) transmit beam from a UE. The processing circuit is configured to configure at least one downlink transmit (DL TX) beam for transmitting a response to the random access signal and transmit the response to the random access signal to the UE on the at least one DL TX beam.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
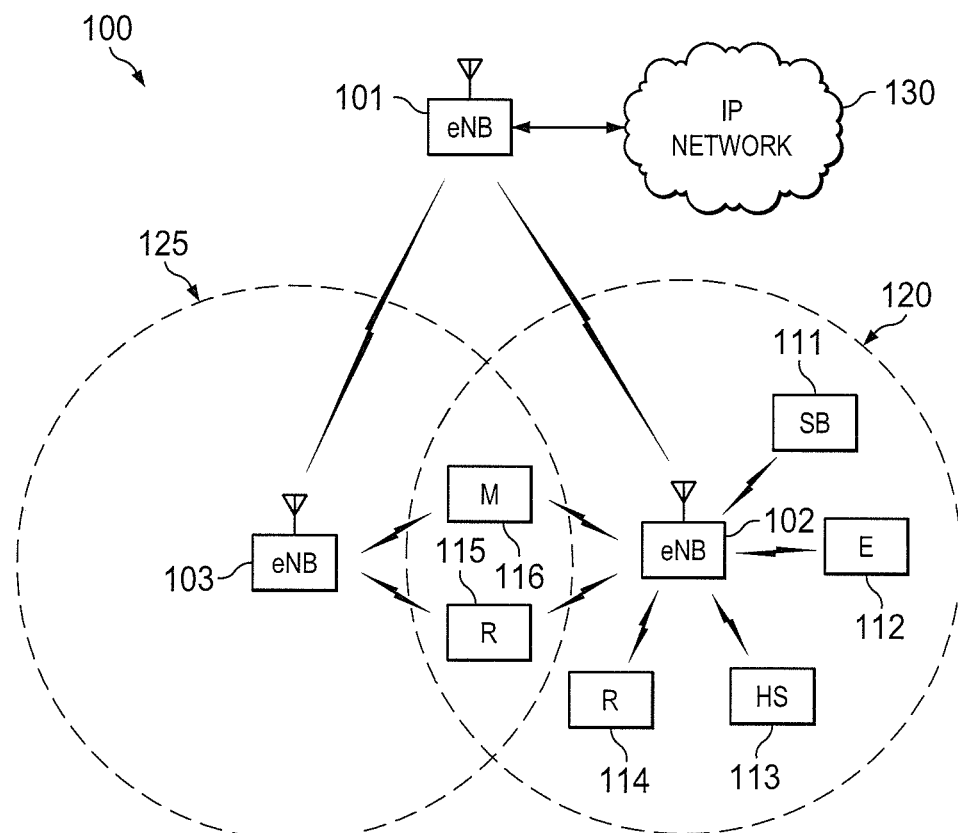
FIG. 1 illustrates a wireless network according to embodiments of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure.

Accordingly, the drawings and description are to be regarded as illustrative in nature, and not as restrictive. The disclosure is illustrated by way of example, and not by way of limitation, in the figures of the accompanying drawings.

In this disclosure, we use limited number and types of base stations or limited number of mobile stations or limited number of service flows or limited number of connections or limited number of routes or limited use cases as an example for illustration. However, the embodiments disclosed in this disclosure are also applicable to arbitrary number and types of base stations, arbitrary number of mobile stations, arbitrary number of service flows, arbitrary number of connections, and other related use cases. Embodiments described here are not limited to base station (BS) and a User Equipment (UE) (BS-UE) communications, but are also applicable to BS-BS, UE-UE communications.

We use the following terms in the disclosure. However, the terms can be named differently in different system. The disclosure is not limited to these terms.

BS: base station. A BS can have a globally unique identifier, BSID which is typically is a MAC ID. A BS can have multiple cells (e.g., one sector can be one cell), each with a physical cell identifier, or a preamble sequence.

Each cell in a BS can have one or multiple antenna arrays, wherein each of the said array can have different configurations of the frame structures, e.g., different uplink (UL) and downlink (DL) ratio in a time division duplex (TDD) system. Multiple TX/RX (transmission/receiving) chains can be applied in one array, or in one cell, the like. One or multiple antenna arrays in a cell can have the same DL control channel (e.g., synchronization channel, physical broadcast channel, and the like) transmission, while the other channels such as data channel, and the like, can be transmitted in the frame structure specific to each antenna array.

The BSs can use antennas or antenna arrays for beam forming. Antenna arrays can form beams with different widths, e.g., wide beam, or narrow beam, the like. DL control channel (e.g., synchronization channel, physical broadcast channel, and the like), broadcast signals/messages, broadcast data channel or control channel, can be transmitted in wide beams. A wide beam can be realized either by radiating a physical wide beam or by sequentially sweeping narrow beams to cover a wider area. Multicast, unicast data/control/signals/messages can be sent in narrow beams.

Cell identifiers can be carried in the synchronization channel. Array or Beam identifiers can be implicitly or explicitly carried in the DL control channels (e.g., synchronization channel, physical broadcast channel, and the like). They should be sent over the wide beams. By acquiring these channels, the User Equipment (UE) can detect the said identifiers.

UE: User Equipment. This term is used interchangeably with the term Mobile Station (MS), subscriber station, and the like. Accordingly, the terms UE and MS are considered to be synonymous throughout this document, unless otherwise noted. A mobile station (MS), or User Equipment (UE) can also use antennas or antenna arrays for beam forming.

Embodiments of this disclosure provide a method and system for performing adaptive random access in a wireless network with a large number of antennas. One example for next generation mobile communication (5G) is a millimeter-wave mobile broadband (MMB) system that advocates the use of large amounts of untapped spectrum in the 3-300 GHz range, as discussed in "An Introduction to Millimeter-Wave Mobile Broadband Systems," by Z. Pi and F. Khan, IEEE Communications Magazine, June 2011 and "System Design and Network Architecture for a Millimeter-Wave Mobile Broadband (MMB) system," by Z. Pi and F. Khan, PROC. Sarnoff Symposium, 2011, the contents of which are hereby incorporated by reference. A primary obstacle to successful operation at such high frequencies is the harsh propagation environment. Millimeter wave signals do not penetrate solid matter very well and are severely absorbed by foliage and rain. Alternatively, at higher frequencies, the antennas used in base station (BS) and mobile devices can be made smaller allowing a large number of antennas (sometimes referred to as massive MIMO) to be packed in a compact area. The availability of large number of antennas bestows the ability to achieve high gain using transmit and/or receive beam-forming which can be employed to combat propagation path loss. With a large number of antennas, it also becomes possible to spatially separate downlink and uplink transmissions between the BS and multiple mobile devices, thus reaping the power of space division multiple access to increase system capacity. For example, the wavelength of a broadband communication system at 6 GHz is just 5 cm, allowing the placement of a 64-element antenna array at the mobile station (MS) with a reasonable form-factor. Such a UE can easily form a large number of beam patterns for uplink transmission and downlink reception with different levels of directional gain. With progress in antenna technology and the use of higher frequencies, it will become feasible to form even larger number of beam patterns with higher levels of directivity. The design of a random access mechanism for a system employing multiple antennas at both the BS and UEs offers both challenges and opportunities.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, in some embodiments, one or more of eNBs 101-103 can communicate with each other and with UEs 111-116 using 5G, LTE, LTE-A, or WiMAX techniques including techniques for random access using multiple antennas as described in embodiments of the present disclosure. In certain embodiments, one or more of eNBs 101-103 is configured to receive a random access signal on at least one User Equipment (UE) transmit beam from a UE; to configure at least one downlink transmit (DL TX) beam for transmitting a response to the random access signal; and transmit the response to the random access signal to the UE on the at least one DL TX beam. In certain embodiments, one or more of UEs 111-116 is configured to configure at least one UE to transmit beam for a transmission of a random access signal; generate the at least one UE transmit beam using an antenna array according to the configuration; and transmit the random access signal to the Base Station (BS) on the at least one UE transmit beam.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
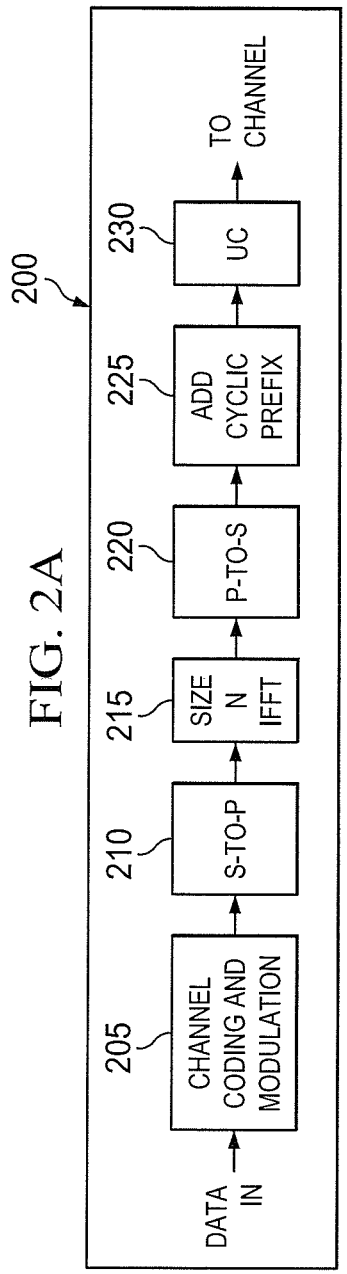
FIG. 2A illustrates a high-level diagram of a wireless transmit path according to embodiments of this disclosure.
Figure 2B:
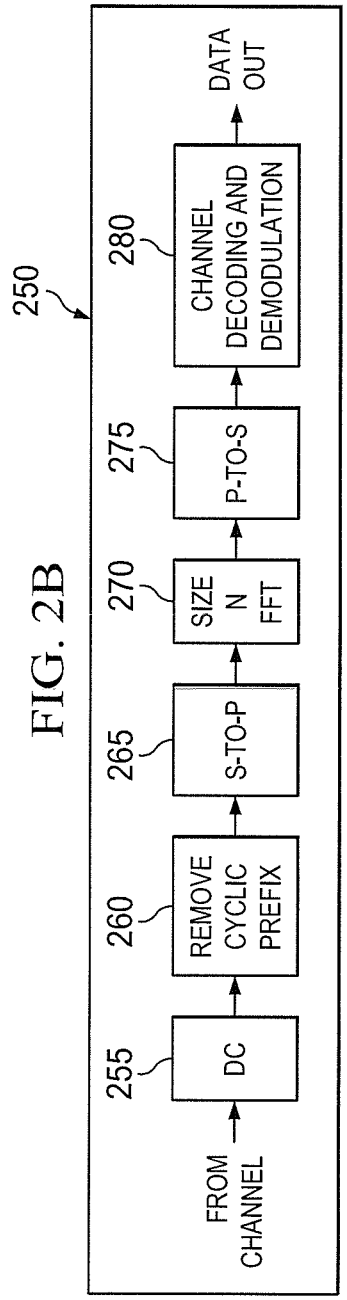
FIG. 2B illustrates a high-level diagram of a wireless receive path according to embodiments of this disclosure.

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to perform methods for random access using multiple antennas as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
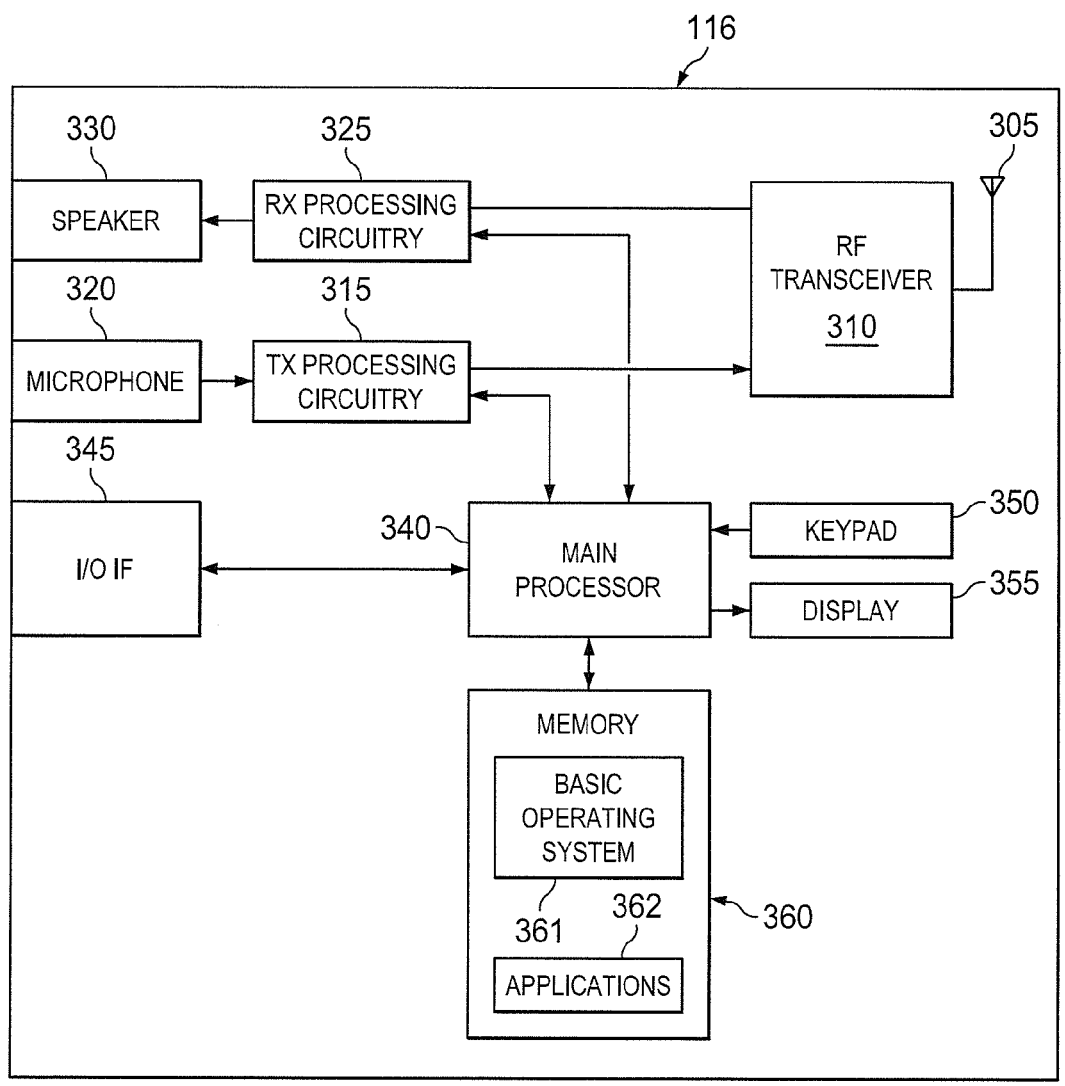
FIG. 3 illustrates a subscriber station according to embodiments of the present disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for performing random access using multiple antennas as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Embodiments of the present disclosure disclose random access in communication systems with large number of antennas. Certain embodiments are applicable to communication with millimeter waves frequencies around a few tens of gigahertz to a few hundred gigahertz and other communication medium, e.g., radio waves with frequency of 3 GHz-30 GHz, electromagnetic waves with terahertz frequencies, infrared, visible light, and other optical media, as well as cellular band with frequencies around a few hundred megahertz to a few gigahertz, and other frequency bands.

The UE and BS can receive random access messages using different combination of Tx (transmit) and receive (Rx) beams to ensure sufficient coverage. Since random access in cellular systems typically has tight delay requirements (usually several tens of milliseconds), an efficient procedure for determining suitable Rx-Tx pair(s) is required. In some situations where channel reciprocity holds (e.g., TDD), a UE may be able to rely on downlink Tx beam measurements to identify a suitable uplink Tx beam. However such an assumption is not reliable in many other situations. For example, in an FDD system, or when the UE uses separate digital chains for Tx and Rx. Even in TDD systems, a UE moving at high speed may not be able to rely on downlink measurements to form uplink Tx beams.

The UE also needs to select the kind of beam to use for sending random messages. In particular, a UE with multiple antennas can deploy beams of different width expressed, for example, in terms of half power beamwidth (HPBW). If the UE employs narrow beams, then the BS may be able to spatially separate transmissions from different UEs and reduce the frequency of collisions between competing UEs. Alternatively, a UE using narrow beams will need to attempt transmissions in multiple spatial directions to ensure successful reception, increasing the latency associated with the random access procedure. The UE can reduce the latency associated with the search procedure by using wider beams as long as sufficient directional gain to satisfy uplink coverage requirements is met. A disadvantage of using wide beams is that uplink transmissions from different UEs are more likely to interfere, increasing the probability of collision and impacting random access performance. A suitable choice of beamwidth is likely to be a complex function of the number of UEs in a cell, their geographic distribution, transmit power capability, and beamforming capability.

In certain examples of random access designs, e.g. in LTE REF3 or WiMAX, UEs can be configured to ramp up the power of their transmission after detecting a random access failure. With multiple antennas, it also becomes possible to exploit spatial degrees of freedom. For example, a UE may deploy narrower beams with higher directional gain in successive retransmission attempts. A retransmission mechanism that combines power ramping with beamwidth selection needs to be devised.

Embodiments of the present disclosure provide methods and apparatus to perform random access in a system where both the BS and UEs have access to multiple antennas. In this disclosure, for the purpose of illustration, we use the term beamwidth to distinguish the spatial signature of the different kind of beams that can be formed for transmission and reception. The term beamwidth should be construed to include other possible descriptions of beam patterns including, for example, codebooks (of possibly different sizes) and directional gain associated with a particular beam pattern. A BS can serve one or more cells.

Figure 4:
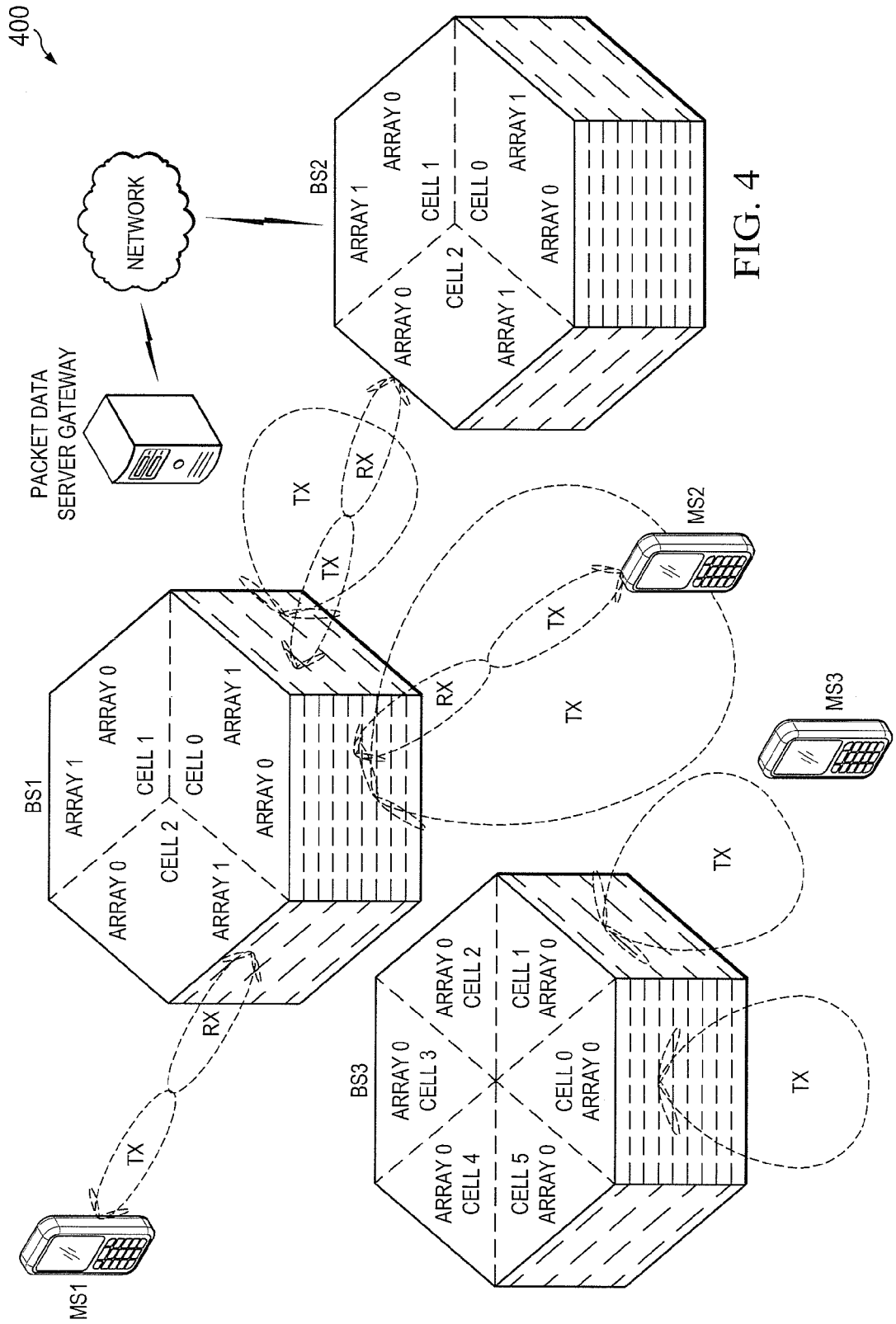
FIG. 4 illustrates a wireless communication system according to the embodiments of the present disclosure.

FIG. 4 shows a wireless communication system 400 according to the embodiments of the present disclosure. The embodiment of the wireless communication system illustrated in FIG. 4 is for illustration only. Other embodiments of the wireless communication system could be used without departing from the scope of this disclosure.

In the FIG. 4, BS1 has 3 cells (Cell 0 through Cell 2). Each cell (e.g. cell 0) can have multiple arrays (e.g. antenna array 0 and array 1). Array 0 can have a different frame structure from array 1, e.g., array 0 can communicate with UE2 (e.g. array 0 can be engaged in a UL unicast communication with UE2 420), while array 1 can communicate with Cell 2 (e.g. array 1 can have a downlink wireless backhaul communication with BS2 cell2 array 0). In this FIGURE, BS2 has a wired backhaul connecting to the backhaul networks.

The wireless access link (i.e. the link between a BS and a UE) can suffer from blockages (e.g. due to moving objects such as bus, car, or people), or the NLOS (non-line of sight) signal can be weak to maintain the communication. Even a UE that is close to the BS may need to switch to a different link because blockages can happen anywhere (this is unlike the traditional cellular bands where the propagation is not very directional).

If the antenna is not placed high enough (which is likely to be the case as we move to next generation systems with smaller cell coverage), many TX or RX beams covering a sphere may be needed. For example, with pencil beams (or very narrow beams) many sampling points can be required to cover 360 degrees of azimuth search, and 180 degrees of elevation search. For higher antenna heights, limited elevation search can be sufficient.

In a sector, or a cell, one or multiple arrays with one or multiple RF chain can generate beams in different shape for different purposes.

Figure 5:
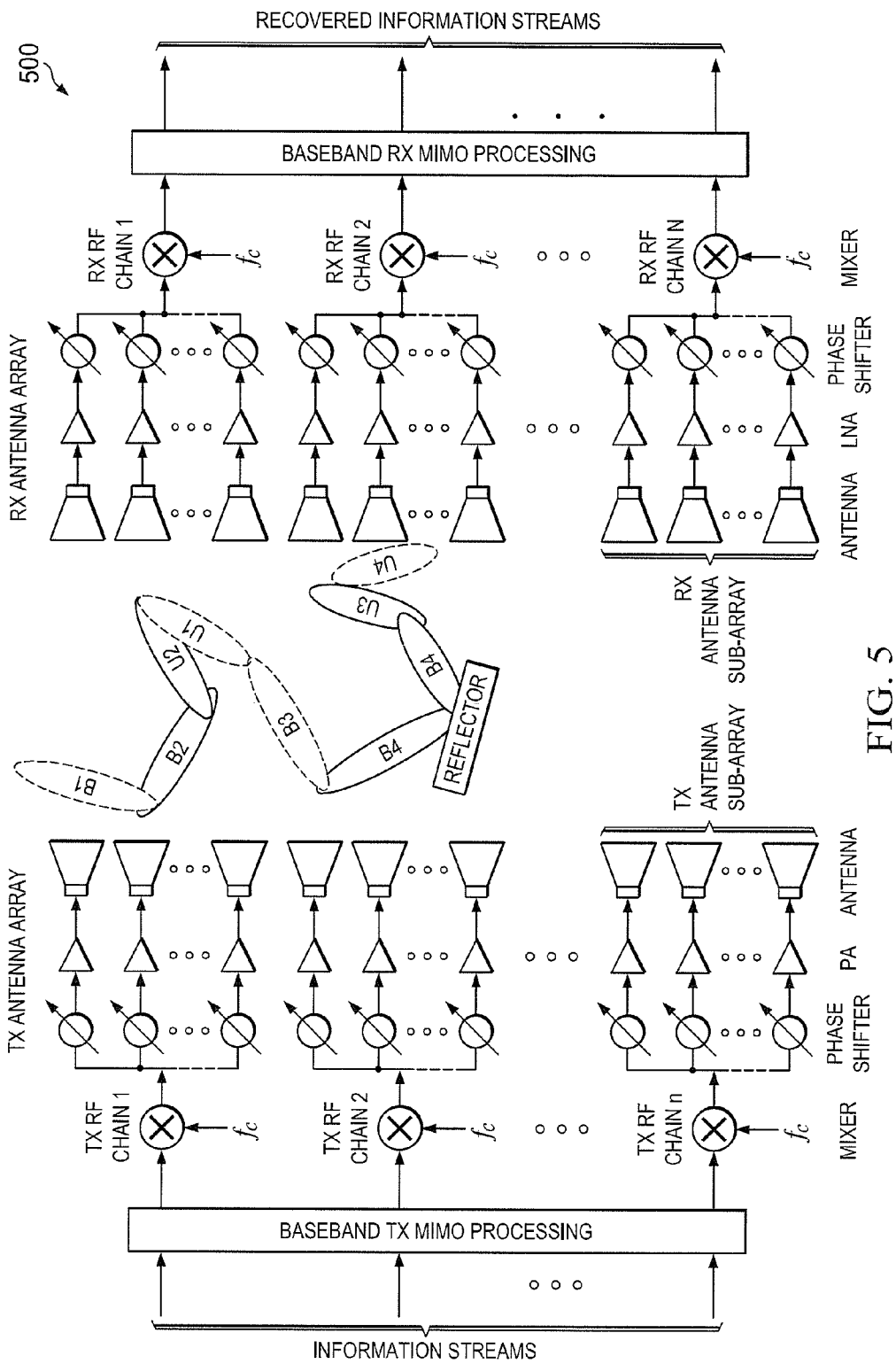
FIG. 5 illustrates a transmitter and a receiver and their beam paths in a millimeter wave system according to the embodiments of the present disclosure.

FIG. 5 illustrates a transmitter and a receiver and their beam paths in a millimeter wave system 500 according to the embodiments of the present disclosure. The embodiment of the millimeter wave system illustrated in FIG. 5 is for illustration only. Other embodiments of the millimeter wave system could be used without departing from the scope of this disclosure.

In the figure, TX RF chain 1 forms beams B1 and B2. Beams B1 and B2 are formed by steering, i.e., B1 and B2 are not formed concurrently; rather they are formed one after another in a sequential manner. TX RF chain 2 forms beams B3 and B4. B3 and B4 can be formed by steering. RX RF chain1 forms beams U1 and U2 sequentially, while RX RF chain 2 forms the beams U3 and U4 sequentially. U2 can receive B2, and U3 can receive B4 after B4 was reflected by a reflector. B3 can be received by U1. So there are three possible links (B2, U2), (B3, U1), (B4, U3). Since the beams are formed by steering, the three links (B2, U2), (B3, U1), (B4, U3) cannot be concurrent. Possible concurrent TX/RX beam pairs can be (B2, U2) and (B4, U3) as shown in FIG. 5.

In various embodiments of the present disclosure, a BS can have one or multiple cells, and each cell can have one or multiple antenna arrays, where each array within a cell can have different frame structures, (e.g., different uplink and downlink ratios in a time division duplex (TDD) system). Multiple TX/RX (transmitting/receiving) chains can be applied in one array or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted, e.g., in wide beams. A wide beam may include a single wide beam transmitted at one time or a sweep of narrow beams at sequential times. Multicast and unicast data and control signals and messages can be transmitted, e.g., in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages and broadcast data channels and control channels can be transmitted, e.g., in wide beams. Multicast and unicast data and control signals and messages can be transmitted, e.g., in narrow beams.

The beams can be in various shapes or can have various beam patterns. The beam shapes or the beam patterns can be regular or irregular, e.g., pencil beam shape, cone beam shape, irregular main lobe with side lobes, and the like. The beams can be formed, transmitted, received, using, e.g., the transmit paths and the receive paths in FIGS. 6A through 6D. For example, the transmit paths and the receive paths in FIGS. 6A through 6D can be located in transceivers of wireless communication devices at different points in a wireless communication (e.g., transmit paths and receive paths in one or more of the base stations 101-103 or the mobile stations 111-116 in FIG. 1).

Figure 6A:
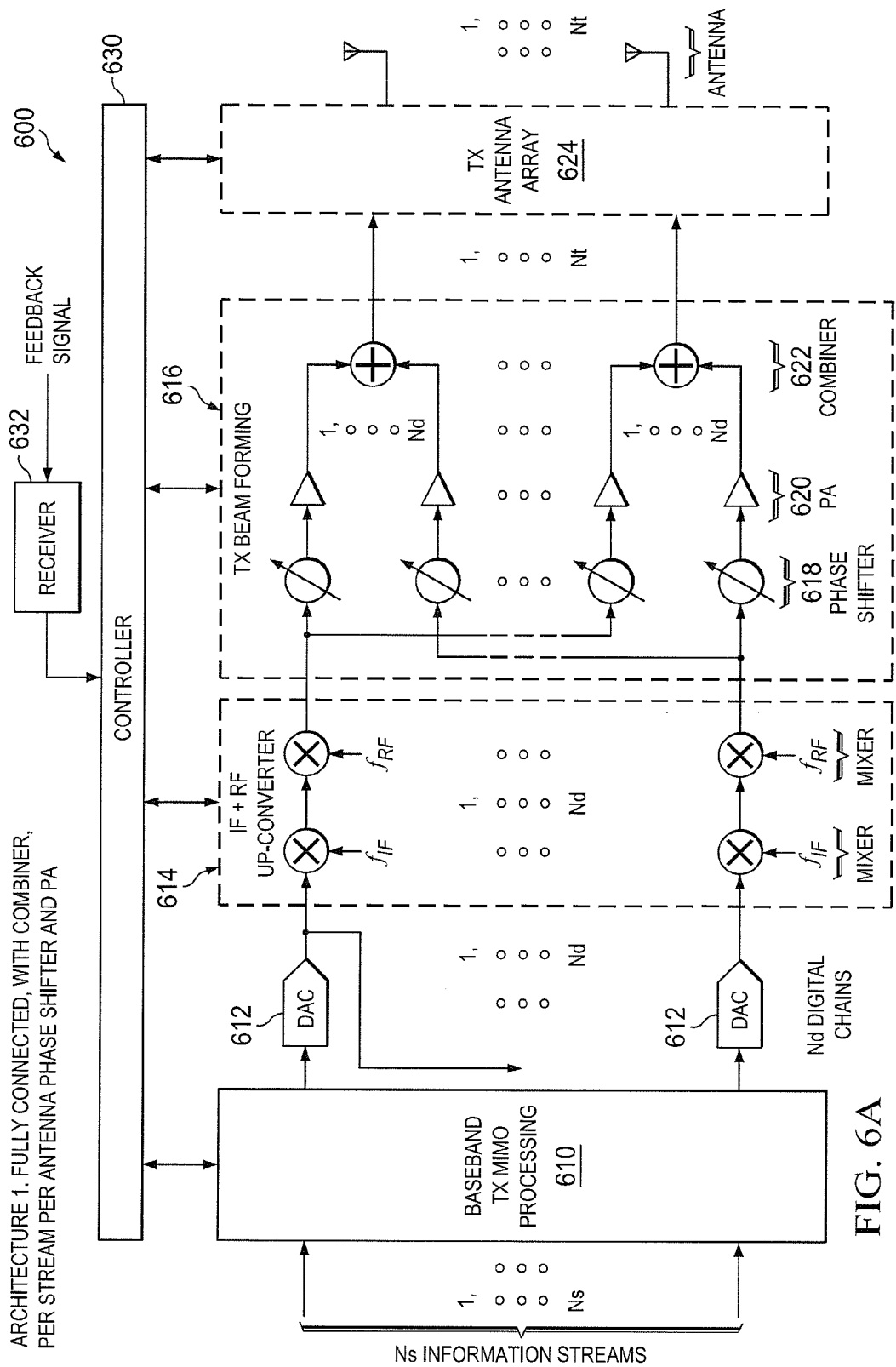
FIG. 6A illustrates a transmit path for multiple input multiple output (MIMO) baseband processing and analog beam forming with a large number of antennas, according to various embodiments of the present disclosure.

FIG. 6A illustrates a transmit path for multiple input multiple output (MIMO) baseband processing and analog beam forming with a large number of antennas, according to embodiments of this disclosure. The transmit path 600 includes a beam forming architecture in which all of the signals output from baseband processing are fully connected to all the phase shifters and power amplifiers (PAs) of the antenna array.

As shown in FIG. 6A, Ns information streams are processed by a baseband processor (not shown), and input to the baseband TX MIMO processing block 610. After the baseband TX MIMO processing, the information streams are converted at a digital and analog converter (DAC) 612 and further processed by an interim frequency (IF) and RF up-converter 614, which converts the baseband signal to the signal in RF carrier band. In some embodiments, one information stream can be split to I (in-phase) and Q (quadrature) signals for modulation. After the IF and RF up-converter 614, the signals are input to a TX beam forming module 616.

FIG. 6A shows one possible architecture for the TX beam forming module 616, where the signals are fully connected to all the phase shifters and power amplifiers (PAs) of the transmit antennas. Each of the signals from the IF and RF up-converter 614 can go through one phase shifter 618 and one PA 620, and via a combiner 622, all the signals can be combined to contribute to one of the antennas of the TX antenna array 624. In FIG. 6A, there are Nt transmit antennas in the TX antenna array 624. Each antenna can have one or multiple antenna elements. Each antenna transmits the signal over the air. A controller 630 can interact with the TX modules, including the baseband processor, IF and RF up-converter 614, TX beam forming module 616, and TX antenna array 624. A receiver module 632 can receive feedback signals, and the feedback signals can be input to the controller 630. The controller 630 can process the feedback signal and adjust the TX modules.

Figure 6B:
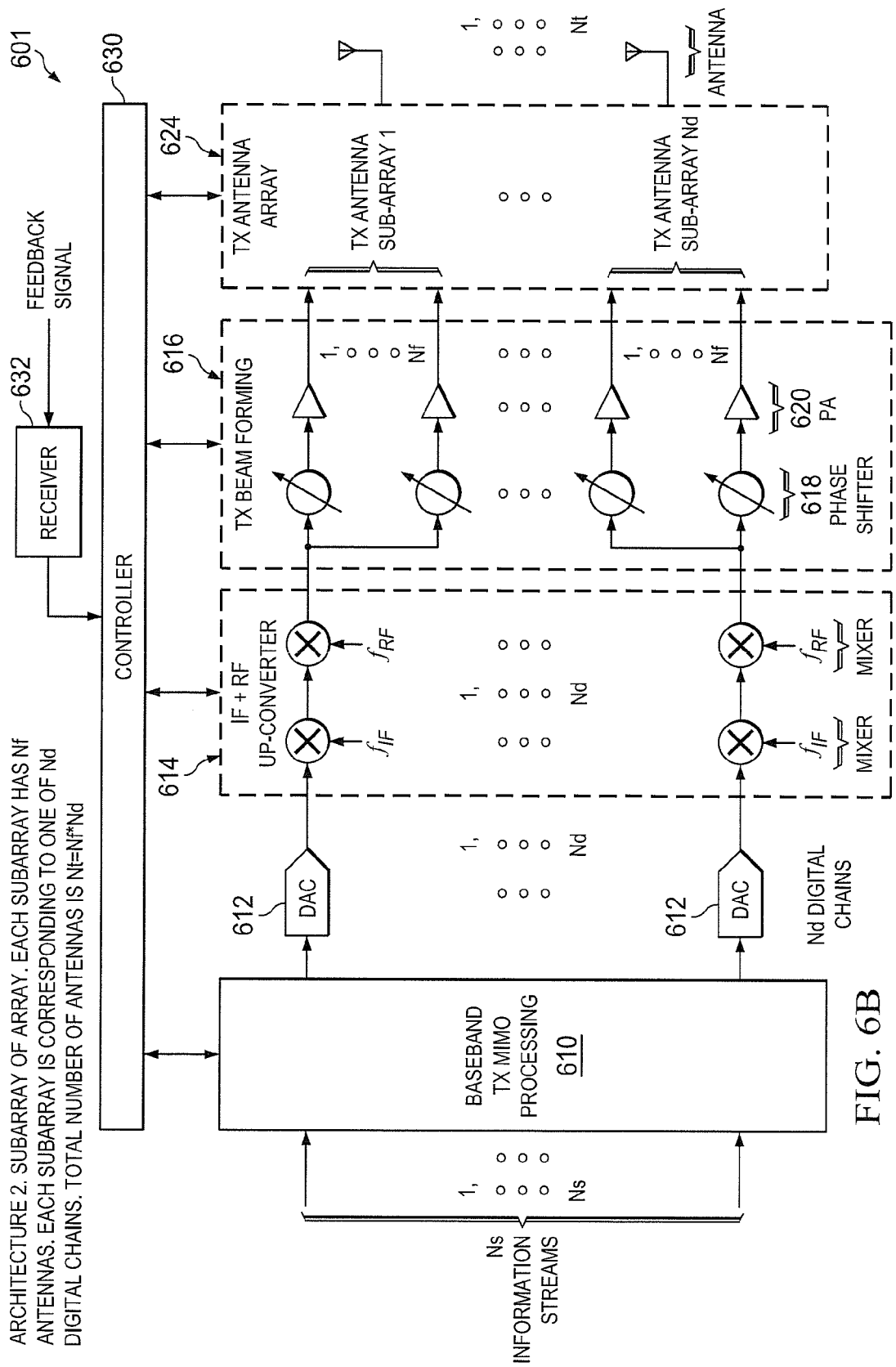
FIG. 6B illustrates another transmit path for MIMO baseband processing and analog beam forming with a large number of antennas, according to various embodiments of the present disclosure.

FIG. 6B illustrates another transmit path for MIMO baseband processing and analog beam forming with a large number of antennas, according to embodiments of this disclosure. The transmit path 601 includes a beam forming architecture in which a signal output from baseband processing is connected to the phase shifters and power amplifiers (PAs) of a sub-array of the antenna array. The transmit path 601 is similar to the transmit path 600 of FIG. 6A, except for differences in the TX beam forming module 616.

As shown in FIG. 6B, the signal from the baseband is processed through the IF and RF up-converter 614, and is input to the phase shifters 618 and power amplifiers 620 of a sub-array of the antenna array 624, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 601 includes an equal number of antennas for each sub-array. However, the disclosure is not limited thereto. Rather, the number of antennas for each sub-array need not be equal across all sub-arrays.

The transmit path 601 includes one output signal from the MIMO processing as the input to the RF processing with one sub-array of antennas. However, this disclosure is not limited thereto. Rather, one or multiple signals out of the Nd signals from baseband processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 6A, or any type of the RF and IF signal processing with an array of antennas. The process related to one sub-array of the antennas may be referred to as one "RF chain".

Figure 6C:
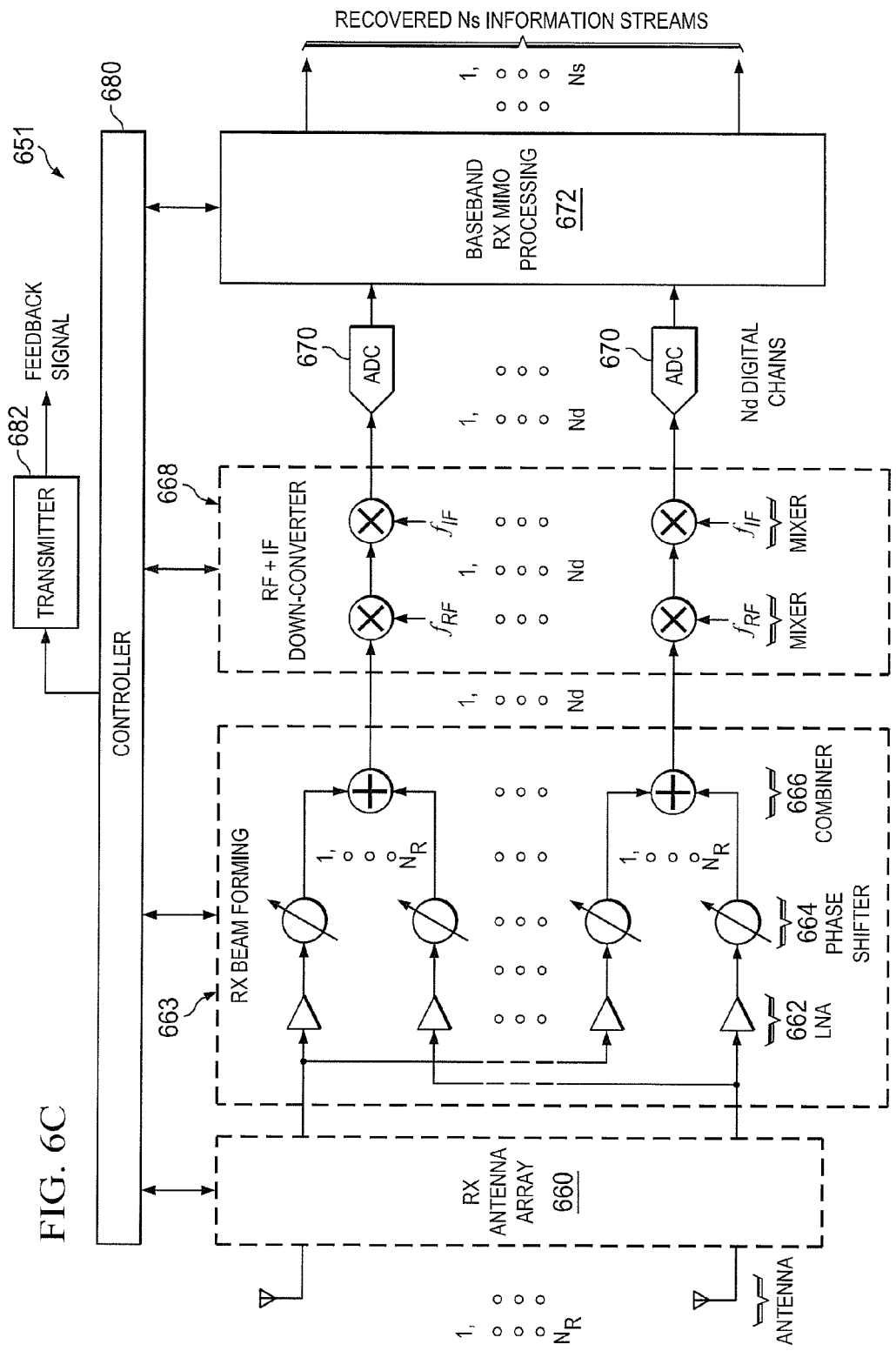
FIG. 6C illustrates a receive path for MIMO baseband processing and analog beam forming with a large number of antennas, according to various embodiments of the present disclosure.

FIG. 6C illustrates a receive path for MIMO baseband processing and analog beam forming with a large number of antennas, according to embodiments of this disclosure. The receive path 650 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 6C, NR receive antennas 660 receive the signals transmitted by the transmit antennas over the air. Each receive antenna can have one or multiple antenna elements. The signals from the RX antennas are processed through the LNAs 662 and the phase shifters 664. The signals are then combined at a combiner 666 to form an analog stream. In total, Nd analog streams can be formed. Each analog stream can be further converted to the baseband signal via an RF and IF down-converter 668 and an analog to digital converter (ADC) 670. The converted digital signals can be processed in a baseband RX MIMO processing module 672 and other baseband processing, to obtain the recovered NS information streams. A controller 680 can interact with the RX modules including the baseband processor, RF and IF down-converter 668, RX beam forming module 663, and RX antenna array module 660. The controller 680 can send signals to a transmitter module 682, which can send a feedback signal. The controller 680 can adjust the RX modules and determine and form the feedback signal.

Figure 6D:
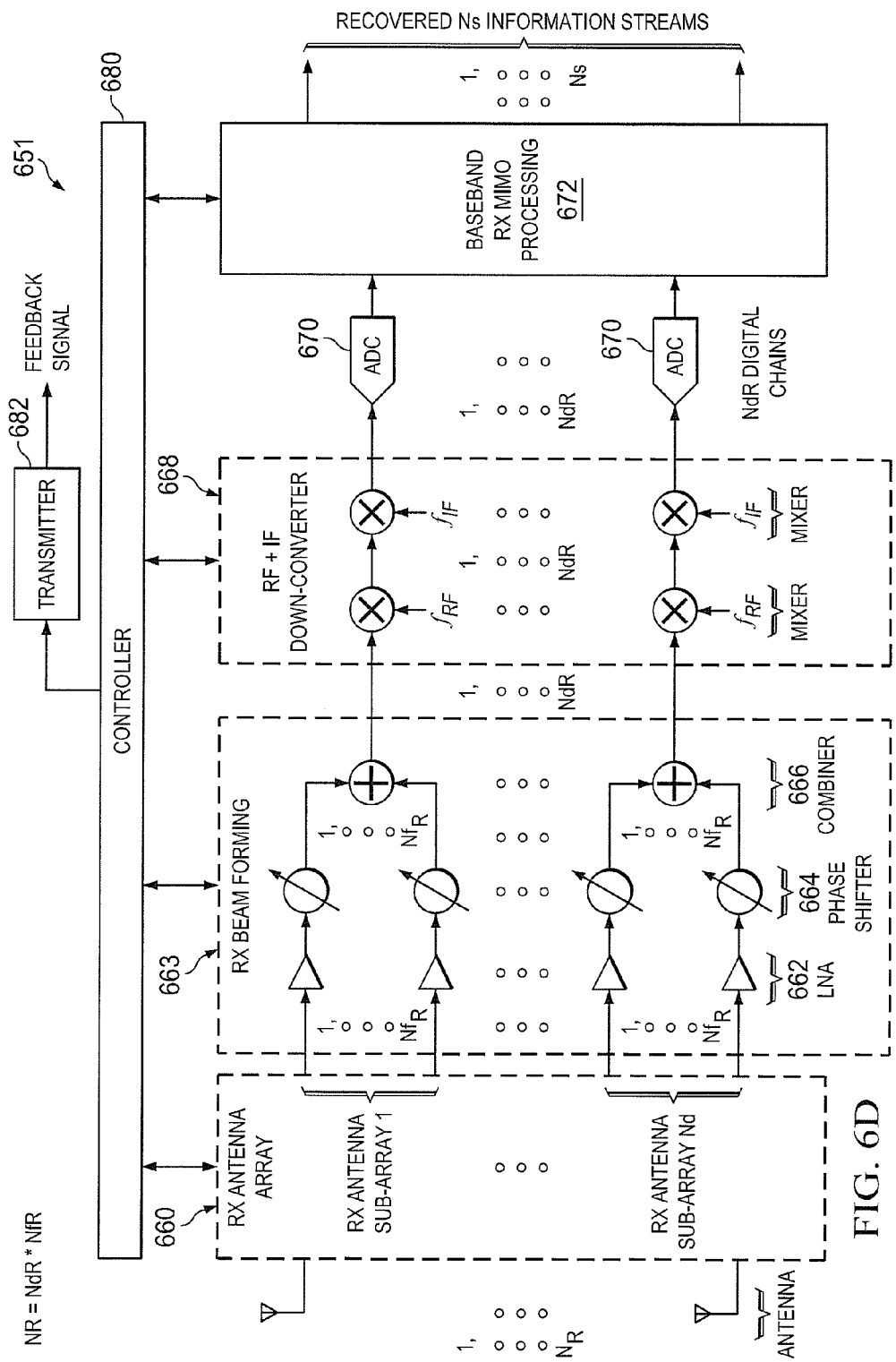
FIG. 6D illustrates another receive path for MIMO baseband processing and analog beam forming with a large number of antennas, according to various embodiments of the present disclosure.

FIG. 6D illustrates another receive path for MIMO baseband processing and analog beam forming with a large number of antennas, according to embodiments of this disclosure. The receive path 651 includes a beam forming architecture in which the signals received by a sub-array of the antenna array can be processed by amplifiers and phase shifters to form an analog stream that can be converted and processed in the baseband. The receive path 651 is similar to the receive path 650 of FIG. 6C, except for differences in the beam forming module 663.

As shown in FIG. 6D, the signals received by NfR antennas of a sub-array of the RX antenna array 660 are processed by the LNAs 662 and phase shifters 664, and are combined at combiners 666 to form an analog stream. There can be NdR sub-arrays (NdR=NR/NFR) with each sub-array forming one analog stream. Hence, in total, NdR analog streams can be formed. Each analog stream can be converted to the baseband signal via an RF and IF down-converter 668 and an ADC 670. The NdR digital signals are processed in the baseband module 672 to recover the Ns information streams. The receive path 651 includes an equal number of antennas for each sub-array. However, the disclosure is not limited thereto. Rather, the number of antennas for each sub-array need not be equal across all sub-arrays.

The receive path 651 includes one output signal from the RF processing with one sub-array of antennas, as one of the inputs to the baseband processing. However, this disclosure is not limited thereto. Rather, one or multiple output signals from the RF processing with one sub-array of antennas can be the inputs to the baseband processing. When multiple output signals from the RF processing with one sub-array of antennas are the inputs, each of the multiple output signals from the RF processing with one sub-array of antennas can be connected to part of or all of the antennas of the sub-array. For example, the RF and IF signal processing with each of the sub-array of antennas can be the same as the processing with the array of antennas as in FIG. 6C, or any type of the RF and IF signal processing with an array of antennas. The process related to one sub-array of the antennas can be referred to as one "RF processing chain".

In other embodiments, there can be other transmit and receive paths which are similar to the paths in FIGS. 6A through 6D, but with different beam forming structures. For example, the power amplifier 620 can be after the combiner 622, so the number of amplifiers can be reduced.

Figure 7:
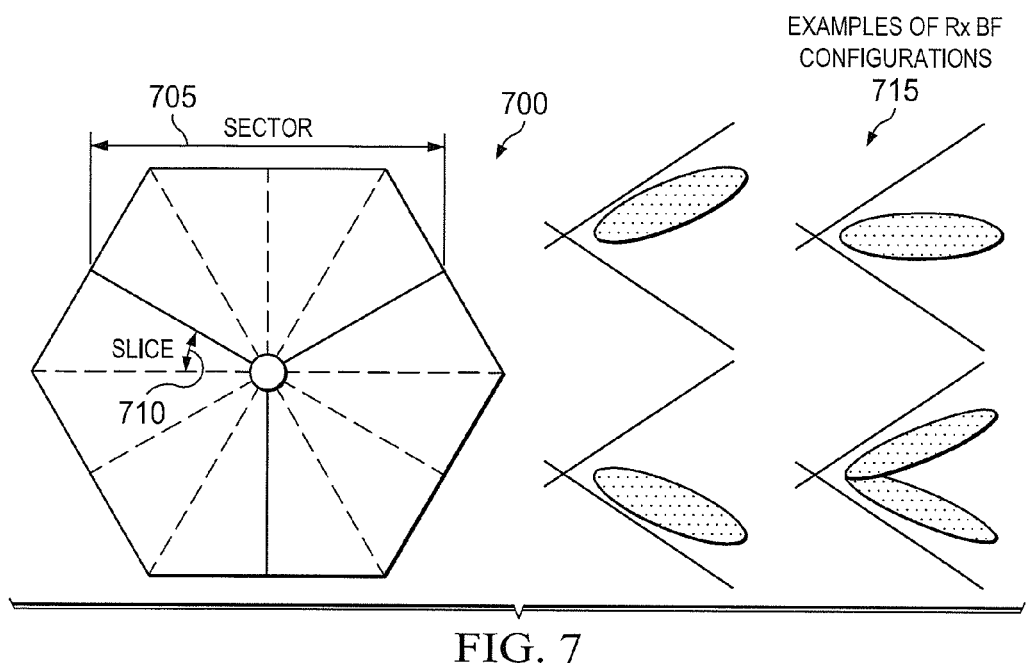
FIG. 7 illustrates a cell that is divided into 3 sectors, each covering 120° in the azimuth.

FIG. 7 illustrates a cell 700 that is divided into 3 sectors, each covering 120° in the azimuth. The embodiment of the cell 700 shown in FIG. 7 is for illustration only. Other embodiments could be used without departing from the scope of the present disclosure.

Figure 8:
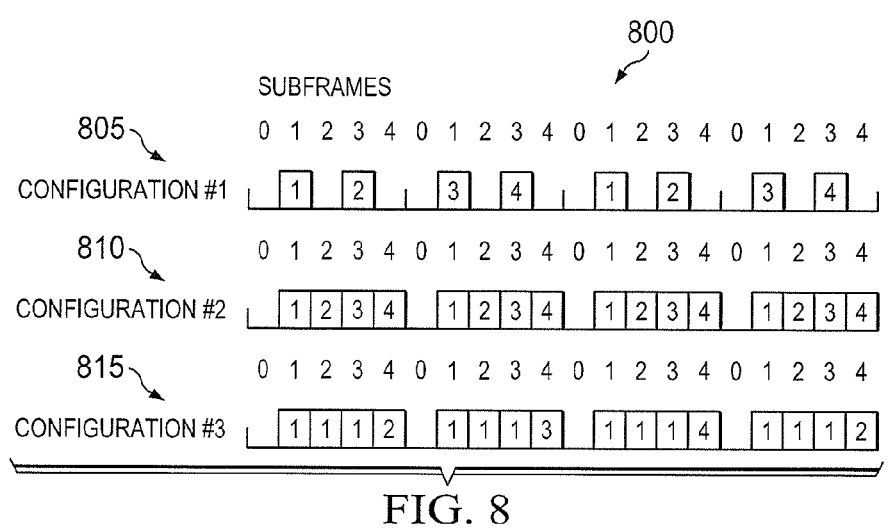
FIG. 8 illustrates three examples of distribution of Random Access CHannel (RACH) opportunities over time according to the embodiments of the present disclosure.

A sector 705 can be further subdivided into slices 710 to manage intra-sector mobility. A BS can be configured to receive random access messages on a cell, sector, or slice level. A BS can employ multiple Rx beamforming configurations to receive random access messages as shown in FIG. 8 below. An Rx beamforming configuration can involve receiving signals in one or more directions and involve a particular selection of beamwidth. A particular Rx beamforming configuration can involve one or more digital chains.

The random access configuration of the system includes the specification of Rx beamforming configuration at the BS and uplink time and frequency resources to be used by the UE, for each random access opportunity. The system will utilize an indexed set of random access configurations and the BS will broadcast the index of the random access configuration being applied.

FIG. 8 illustrates three examples of distribution of Random Access CHannel (RACH) opportunities 805 to 815 over time according to the embodiments of the present disclosure. The embodiment of distribution of RACH opportunities illustrated in FIG. 8 is for illustration only. Other embodiments of distribution of RACH opportunities could be used without departing from the scope of this disclosure.

In these examples, there are 3 possible BS Rx beamforming configurations 805, 810, 815 and each random access opportunity is labeled with the index of the BS Rx beamforming configuration deployed for that opportunity. In FIG. 8, each RACH opportunity is shown as lasting a single sub-frame. It should certainly be possible to design RACH opportunities that span several subframes or span only part of a subframe. In each RACH opportunity, a UE can transmit random access messages. In this disclosure, the term RACH burst is used to describe a single transmission of a random message by a UE. Note that during a single RACH opportunity, a UE can transmit one or more RACH bursts.

If the BS is able to successfully decode a RACH burst from a UE, then the BS is also able to figure out the Tx beam or spatial configuration employed by the UE to transmit the corresponding RACH burst. For example, this can be achieved by including a payload in the RACH message carrying the necessary or identity or by employing distinct preamble sequences for each Tx beam.

The UE needs to select a Tx power and Tx beamwidth for sending random access messages. It is possible that different UEs vary in their ability to form beams of different widths. In any case, each UE will determine a valid set of Tx power and Tx beamwidth pairs that can be used to ensure sufficient coverage.

Figure 9A:
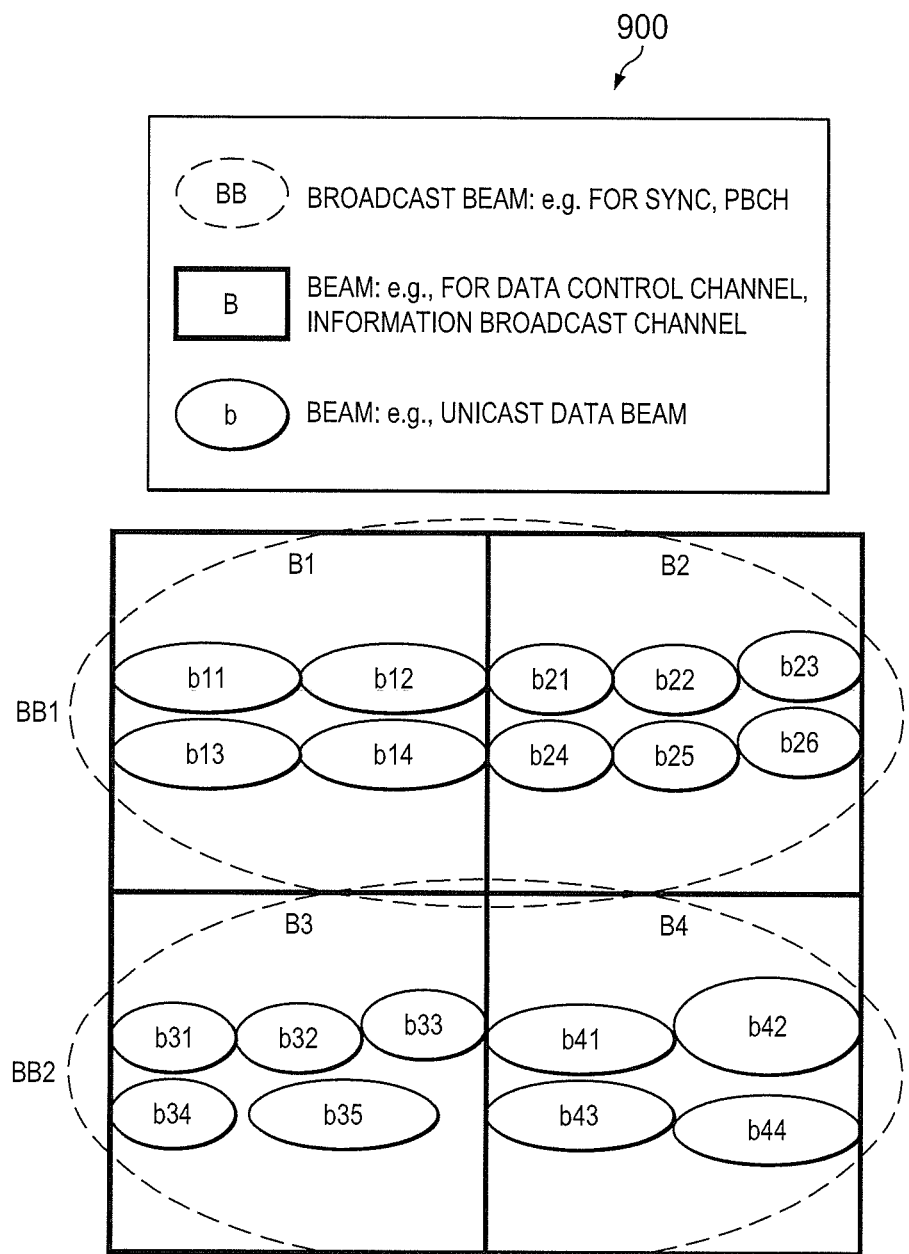
FIGS. 9A, 9B and 9C illustrate example beams in different shapes for different purposes in either a sector or a cell according to the present disclosure.
Figure 9B:
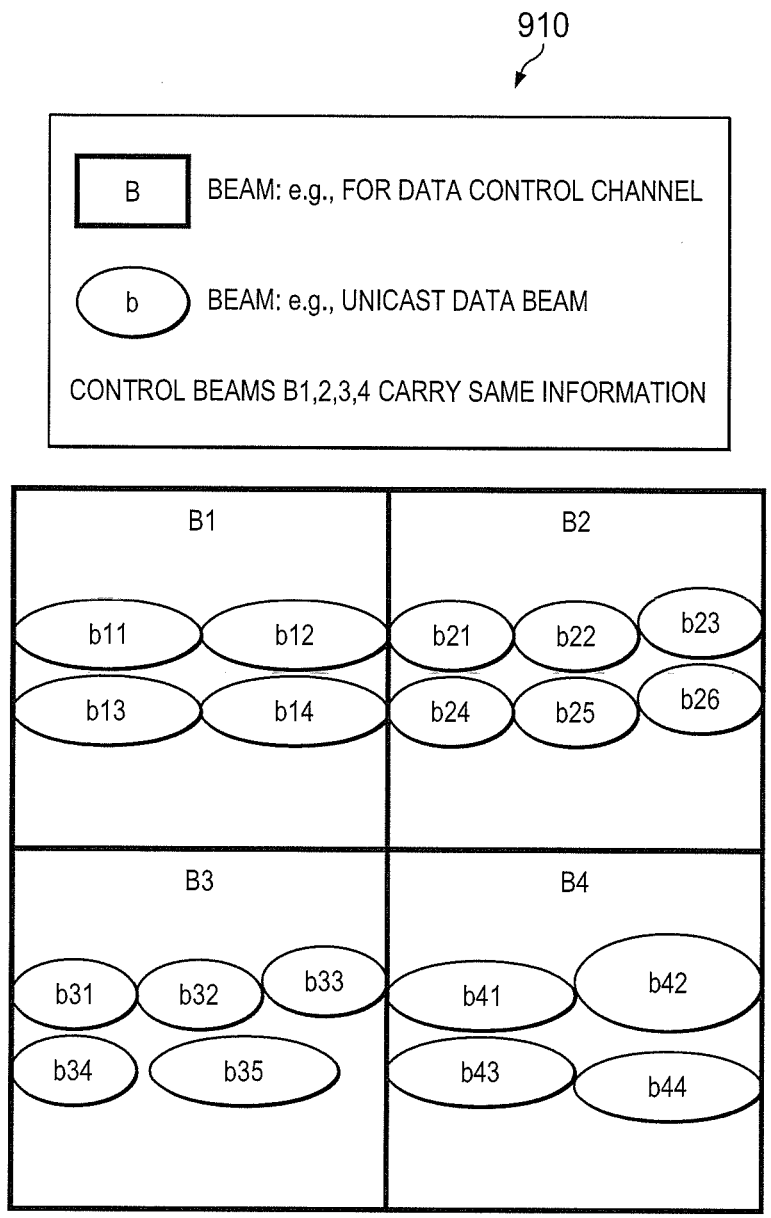
Figure 9C:
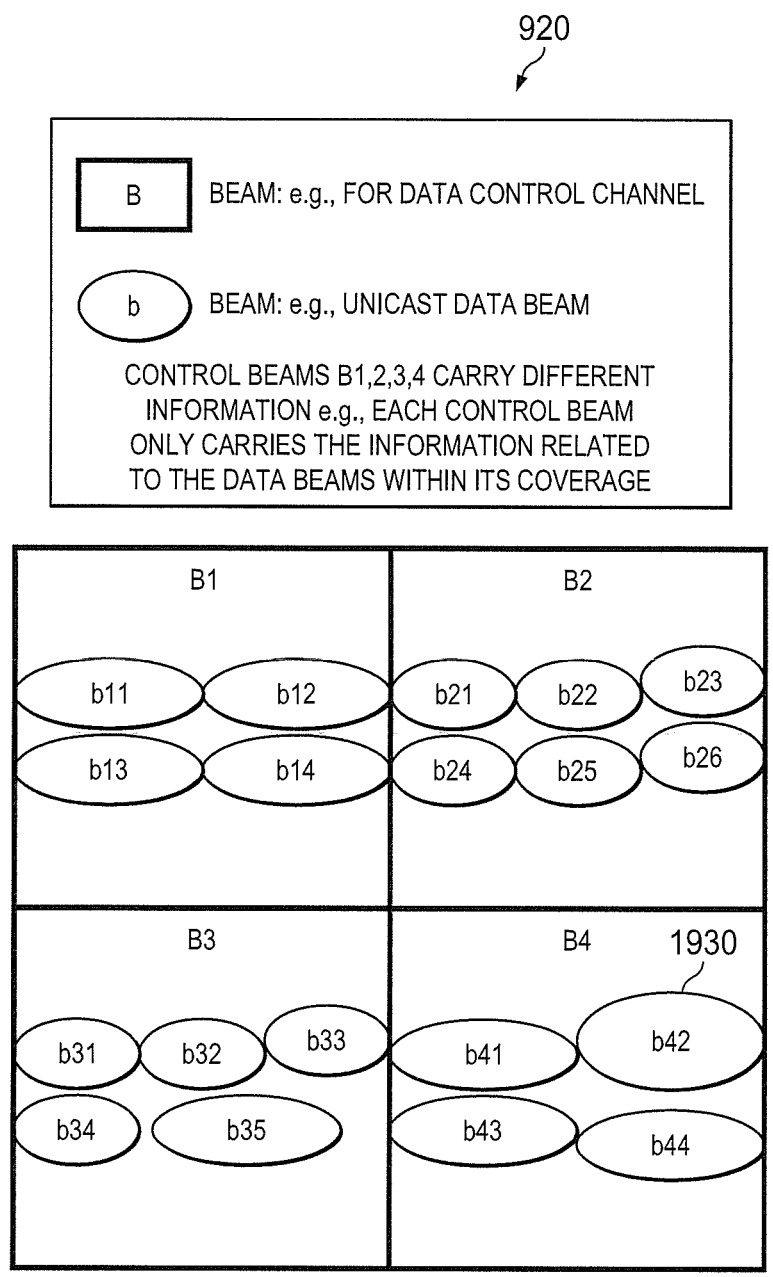

FIGS. 9A to 9C illustrate example beams 900 to 920 in different shapes for different purposes in either a sector or a cell according to the present disclosure. The embodiment of the beams in either a sector or a cell illustrated in FIGS. 9A to 9C are for illustration only. Other embodiments of the beams could be used without departing from the scope of this disclosure.

A wide beam (typically beam for broadcast) BB, such as BB1 and BB2, can be used for synchronization, or for providing a physical broadcast channel, or for physical configuration indication channel which indicates where the physical data control channel is located, the like. The BB beams, such as BB1 and BB2, can carry the same information for the cell. Another type of a wide beam B, such as B1-B4, can be used for some control channels. The wide beams BB and B may or may not be using the same beamwidth. Wide beam B is particularly useful for a broadcast/multicast to a group of UEs, as well as some control information for certain UE, such as UE specific control information, e.g., the resource allocation for an UE.

There can be one or multiple BBs and Bs in a cell. The beam BB and beam B may or may not use the same reference signals for the UE to measure and monitor. When there are multiple BBs and Bs in a cell, these can be differentiated by means of an implicit or an explicit identifier and the identifier can be used by the UE to monitor and report the quality of the BBs. The BB beams can be swept and/or repeated in time. The repetition of the information on BB beams can be depend on the number of receive beams at the UE available to receive the BB beam. A UE may or may not search for a beam B by using the information on a beam BB.

A beam b, such as b11-b14, b21-b26, b31-b35, and b41-b44, can be used for data communication. A beam b may have an adaptive beamwidth. For some UEs, e.g., a UE with a low speed, a narrower beam can be used, while for some other UEs, a wider beam can be used. Reference signals can be carried by the beam bs. One or multiple beam bs can exist in a cell. When there are multiple beam bs in a cell, the bs can be differentiated by implicit or explicit identifier, and the identifier can be used by the UE to monitor and report b beams. The b beams can be repeated. The repetition of the information on b beams can be depending on UEs' number of RX beams to receive b beam. The number of repetitions of the information on b beams can be no less than the number of UEs' number of RX beams to receive b beam. A TX beam b can be locked with RX beam after UE monitoring the beams, and if the data information is sent over a locked RX beam, the repetition of the information on b beam may not be needed.

A beam B can be used for control channels, such as control information broadcast/multicast to a group of devices, as well as control information targeted for a certain UE or BS e.g., the resource allocation for a UE. The control channel can be, e.g., a physical DL control channel (PDCCH), which provides information such as resource allocation (e.g., resource blocks, power control, and the like) to all the UEs in the cell, and UE specific resource allocation targeted to a certain UE.

FIG. 9B illustrates another embodiment 910 where the beam B sends the same information to UEs and BSs in a cell. All of the B beams, B1 to B4, in a cell can send the same information to all the UEs in a cell. These B beams can explicitly or implicitly carry identifiers for the UE to identify them, for the monitoring and reporting purpose. These B beams may also not carry any identifier information, then the UE may not be able to identify them, and these B beams are working like a wide beam which has a coverage of all these B beams in the cell.

FIG. 9C illustrates another example where the beam B sends the different information to UEs and BSs in a cell. The B beams, B1 to B4, in a cell can send the different information to UEs in a cell. These B beams can explicitly or implicitly carry identifiers for the UE to identify them, for the monitoring and reporting purpose. The B beam can send information related to the UEs in its coverage, e.g., the resource allocation (e.g., resource block, power control, and the like) for the data beams to the UEs in its coverage.

A combination of the above can also be applicable. For example, the control information can be split to two categories, e.g., one is common information which is common to all UEs in the cell, and the other can be the information related only to a group of UEs within each B beam's coverage. The common information for the entire group of UEs in the cell can be sent over all B beams, while the information only related to the UEs in B beam coverage can be sent over the said B beam.

In a sector, or a cell, one or multiple arrays with one or multiple RF chains can generate beams in different shape for different purposes. One RF chain can be for one or multiple antenna sub-arrays. One antenna sub-array can form one or multiple beams and both digital beamforming and analog beamforming can be applied.

The B beams can also include the information of b beams in the other B beams coverage. For example, the data control beam B1, can include information about the data beams b21 if the base station decides that the data beam b21 will be used for the data communication. The UE receives beam B1, and it decode B1 and find that b21 is scheduled to be for the data communication.

One RF chain can be for one or multiple antenna sub-arrays. One antenna subarray can form one or multiple beams. The digital beamforming can be carried out on the baseband MIMO processing. The analog beam forming can be carried out by adjusting the phase shifter, the power amplifier (PA) and the low noise amplifier (LNA).

The wide beams BB and B can be formed by the analog beamforming, or both the analog and digital beamforming. The narrow beams can be formed by both the analog and digital beamforming.

A base station (BS) can transmit common reference signals or cell specific reference signals (CRS) over DL beams or beam patterns.

The CRS can be used by the UE to measure the signal strength (e.g., the reference signal received power, the reference signal received quality, signal to interference ratio, signal to interference and noise ratio, signal to noise ratio, the like) of each different DL beams or beam patterns. The CRS can be carried on the beams for DL control, such as the physical DL control channel (PDCCH). The CRS can also be carried in resources different from the DL control channel.

The CRS can also be used for the channel estimation, to decode the information on the beams which have CRS. For example, the PBCH (physical broadcast channel) and the CRS can on the same beams or beam patterns (the CRS can be sent at the same time or a different time as PBCH), and the PBCH can be decoded by estimating the channel via CRS. For example, PBCH on the first beam or beam pattern can be decoded by estimating the channel via CRS on the first beam or beam pattern.

The BS sends DL synchronization (sync) channel. The sync channel can be steered at one or multiple DL beams. Each DL beam can carry its beam identifier. The sync channel can carry DL preambles, or the cell identifier. The DL beams can be steered for one round, then repeated for another round, until a certain number of rounds are achieved, for the support of UE's with multiple RX beams. As an alternative, the DL beams can repeat the information it delivers first at one beam, then steer to a second beam and repeat the information, then move on to another beam until all the beams for DL sync have transmitted. A User equipment (UE) can monitor and decode the DL sync channel when needed, such as when the UE performs initial network entry or network re-entry, or monitoring neighboring cells, coming back to the system after sleeping in idle mode, coming back from the link failure. Once the UE decodes DL sync, the UE can know the DL beam identifiers, DL timing, for frames and subframes, cell identifier of the BS. Until now, the UE can know when and where to get the cell specific reference signal (CRS). The DL reference signal can be using sequence, such as the cell ID, or cell ID and the DL beam identifier together. The UE can measure or estimate the channel using CRS.

A physical secondary broadcast channel (PSBCH) can be used to indicate the PDCCH resource location. The PSBCH can indicate whether the PDCCH for each beam is scheduled or exists in the current subframe, and if it exists, where is the resource allocation, or the zone for the PDCCH of the beam.

When a UE decodes the PSBCH, it can find whether the PDCCH for each beam exists in the current subframe. Not all of the PDCCH can exist in the same subframe. If the PDCCH, e.g., for the unicast data to certain UEs, is not scheduled in the current subframe, the PSBCH will indicate that the PDCCH for that beam does not exist in the current subframe, hence the UE does not need to proceed to go to decode the PDCCH, if the UE has a current association to the said PDCCH on the said beam. Otherwise, if the UE finds that the PDCCH that it currently associates is scheduled in the current subframe, the UE further go to the PDCCH to decode it, to find out whether its data is scheduled.

Note that a UE can be associated with one or multiple of the PDCCHs on one or multiple of the beams. When a UE is associated with a PDCCH beam, it means that the PDCCH can carry the information for the UE's data resource allocation and so on, or the PDCCH can carry the information for the UE's unicast data, if the UE is scheduled.

The PSBCH can have a common region to point to one or multiple of the zones for the PDCCHs. The PSBCH can also have a separate region for each of the PDCCH zone. The PSBCH can have predefined resources, as a predefined physical channel, for example. The UE can know it beforehand. If there are multiple of the regions for PSBCH, each of the regions can be predefined for the resources and the UE can know the resource allocation beforehand, hence the UE may not need to go to the regions that it does not have association with the PDCCHs. Alternatively, the UE can have blind decoding to find out the region for each of the beams.

PSBCH can provide information to the UE, about whether the PDCCH on particular slice is in the subframe, and where to find the PDCCH. For example, a bit map can be used, and the bit map size is the number of PDCCH beams, where each bit can tell whether the beam is carried in this subframe. For broadcast information, all of the beams can be used hence the bit map will be all ones. For multicast or unicast, some of the beams can be used, hence the bit map will be some ones and some zeros.

There can be many other designs achieving the similar purpose. When there are multiple RF chains or digital chains, the beams can have frequency division multiplexing (FDM), such that, e.g., one beam can be in a frequency region, and another beam can be in another frequency region. Note that the terms 'frame', 'subframe', superframe, or slot can be used interchangeably to indicate a short duration of time.

FIGS. 10A to 10D illustrate the frame structures 1000, 1010, 1020, 1030 used for DL channels according to embodiments of the present disclosure. The embodiments of the frame structures used for DL channels illustrated in FIGS. 10A to 10D are for illustration only. Other embodiments of the millimeter wave system could be used without departing from the scope of this disclosure.

Figure 10A:
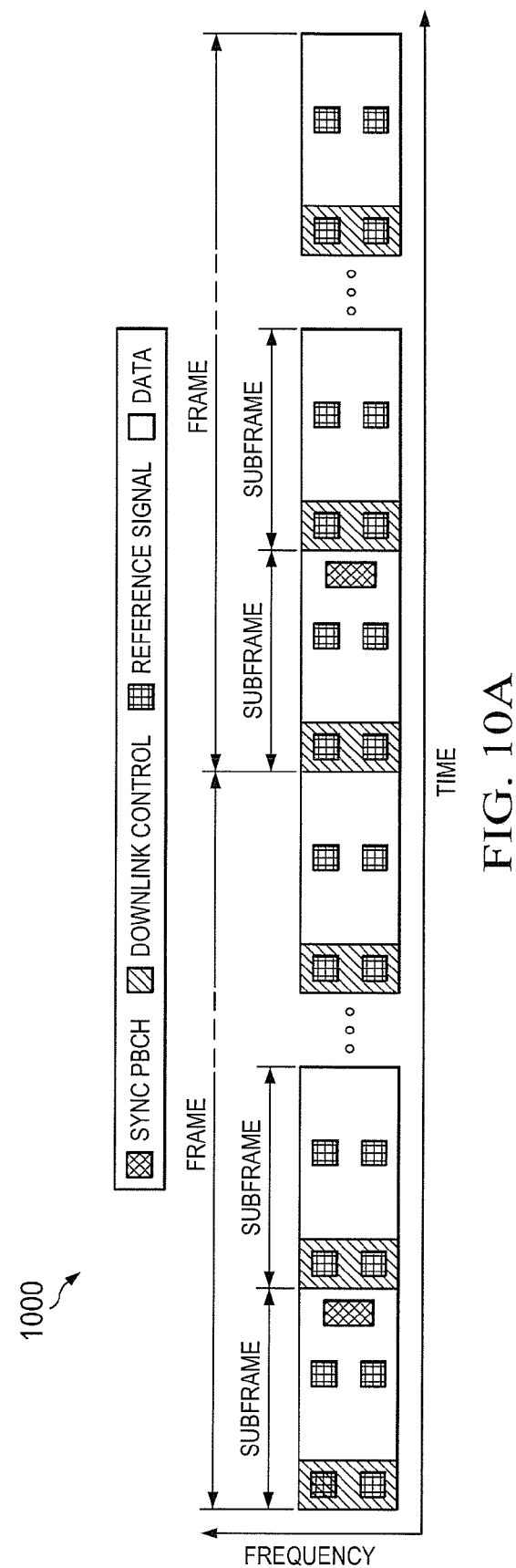
FIGS. 10A, 10B, 10C and 10D illustrate the frame structures used for DL channels according to embodiments of the present disclosure.

FIG. 10A illustrates an example frame structure 1000 used for DL. For the time division duplex (TDD) systems, the UL portion can occur in the same interval (e.g., same DL subframe or DL frame).

Figure 10B:
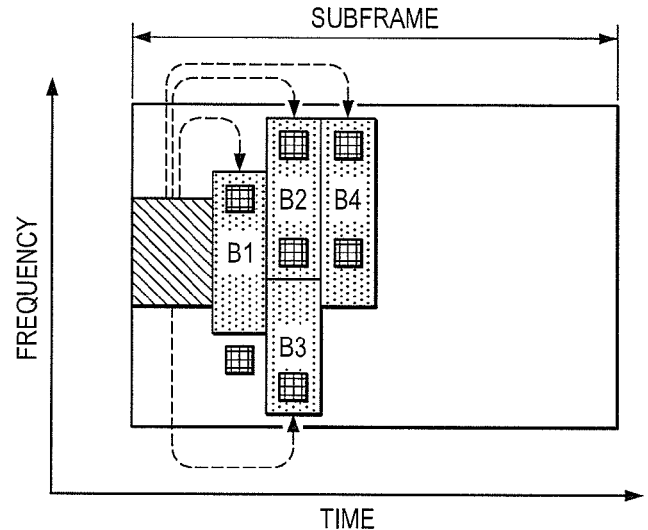
Figure 10C:
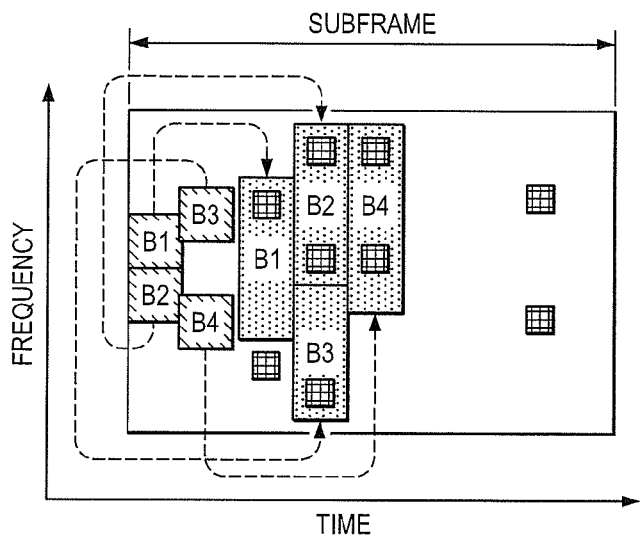

FIG. 10B illustrates a common PSBCH channel 1010 indicating different zones of the PDCCH, while FIG. 10C illustrates a separate PSBCH region 1020 indicating a different PDCCH zone. If the PDCCH are not indicated on certain beams, then the PSBCH can indicate so. (e.g., if the PSBCH indicates that the PDCCH on B4 is not scheduled, then the PDCCH on B4 may not show in the figure).

Figure 10D:
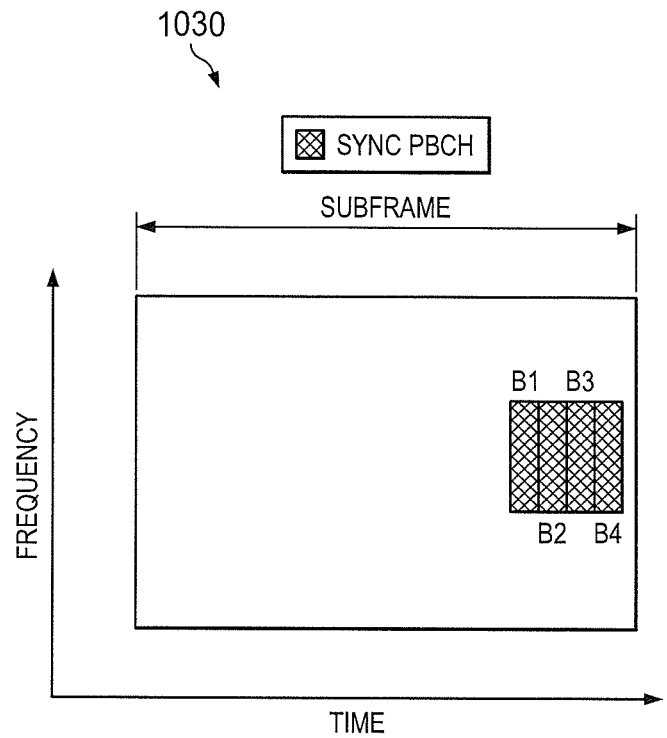

FIG. 10D illustrates sync channel beams 1030. In the example shown in FIG. 10D, the sync beams are steered for one round, and in each beam, the information (e.g., the beam identifier, the cell ID) can be repeated multiple times to support the UE with multiple RX beams. It can be also another configuration, where the sync beams are steered for multiple rounds, and within one round, the information can be sent once.

In certain embodiments, for a typical uplink communication with multiple antennas or with antenna array(s), user equipment (UE) sends transmission (TX) beam to the base station (BS), and the BS uses receive (RX) beam to receive the signal from the UE. For the communication to take place, UE's TX power plus UE's TX antenna gain minus the path loss plus the BS RX antenna gain should be no less than some threshold (e.g., based on requirement), UL_Threshold, with units for all the power or gain or loss being logarithm, e.g., dB, or dBm, or the like, as shown in the following equation:

$$\text{UE TX power} + \text{UE TX antenna gain(function of UE TX BeamWidth)} - \text{Path loss} + \text{BS RX antenna gain(BS RX BeamWidth)} \geq \text{UL\_Threshold(Requirement)} \quad (1)$$

The threshold based on requirement, UL_Threshold, can be, e.g., the least needed value such that the BS can hear from the UE, or the BS can detect and decode the signal from the UE. The UL_Threshold can also take into account of noise. For the antenna gain, it can also be called as antenna array gain if antenna array is used to form the beams. The antenna (array) gain can take into account the antenna form factor as well as gain from antenna elements. Typically when the antenna (array) gain is larger, the beamwidth of the beam formed should be narrower. When the antenna (array) gain is smaller, the beamwidth of the beam formed should be wider. The antenna (array) gain can be a function of the beamwidth, or in a normalized term, the half power beamwidth (HPBW). From another point of view, the beamwidth of the UE TX beam can also be a function of the UE TX antenna gain or antenna array. The two functions can be inverse function to each other.

Figure 11:
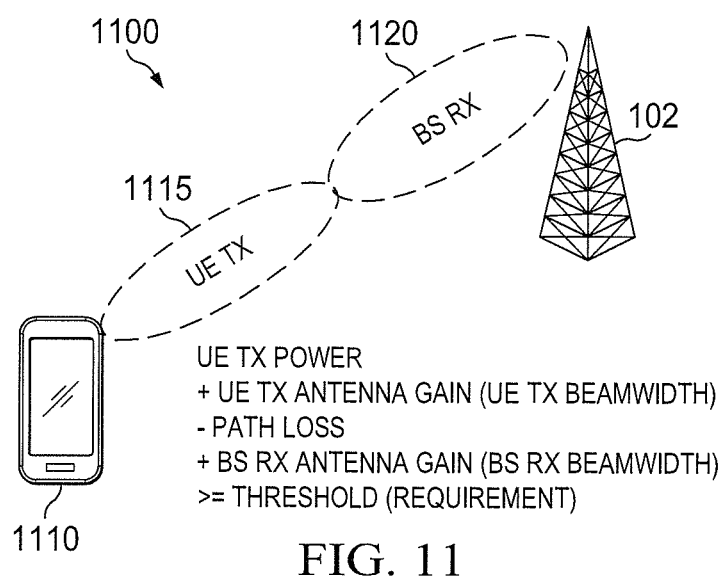
FIG. 11 illustrates an example of uplink communication in the millimeter-wave mobile broadband (MMB) system.

FIG. 11 shows an example of uplink communication 1100 in the millimeter-wave mobile broadband (MMB) system. In the example shown in FIG. 11, a UE sends a transmission (TX) beam 1115 to the base station (BS), and the BS uses a receive (RX) beam 1120 to receive the signal from the UE. For the communication to take place, UE's TX power plus UE's TX antenna gain minus the path loss plus the BS RX antenna gain should be no less than some threshold (e.g., based on requirement), with units for all the power or gain or loss being dB, or dBm, or the like. The antenna (array) gain can be a function of the beamwidth, or in a normalized term, the half power beamwidth (HPBW). Typically when the antenna (array) gain is larger, the beamwidth of the beam formed should be narrower. When the antenna (array) gain is smaller, the beamwidth of the beam formed should be wider.

In certain embodiments, for uplink, the UE TX beam Effective Isotropic Radiation Power (EIRP) can overcome the path loss, and reach the BS RX beam. For the communication to take place, UE's EIRP minus the path loss plus the BS RX antenna gain should be no less than some threshold (e.g., based on requirement), with units for all the power or gain or loss being logarithm, e.g., dB, or dBm, or the like, as expressed by the following equation:

$$\text{UE TX EIRP}-\text{Path loss}+\text{BS RX antenna gain(function of BS RX BeamWidth)} \geq \text{UL\_Threshold (Requirement)} \quad (2)$$

The EIRP can be the production of the UE Tx power and the UE TX antenna gain or antenna array gain, which is expressed by Equation 3. The power production is the addition of powers in logarithm units (in dB, or dBm, and the like).

$$\text{UE TX EIRP}=\text{UE TX power}+\text{UE TX antenna(array) gain(function of UE TX BeamWidth)} \quad (3)$$

The UE TX antenna gain or antenna array gain can be a function of the beamwidth of the UE TX beam. From another point of view, the beamwidth of the UE TX beam can also be a function of the UE TX antenna gain or antenna array. The two functions can be inverse function to each other.

In certain embodiments, for uplink, the UE TX beam Net Radiation Power (NRP), which is UE TX EIRP deducted by the pass loss, can be large enough so as to reach the BS RX beam. For the communication to take place, the UE's NRP plus the BS RX antenna gain should be no less than some threshold (e.g., based on requirement), with units for all the power or gain or loss being logarithm, e.g., dB, or dBm, or the like, which is shown in the following equation:

$$\text{UE TX NRP}+\text{BS RX antenna gain(function of BS RX BeamWidth)} \geq \text{UL\_Threshold(Requirement)} \quad (4)$$

where UE TX NRP=UE TX EIRP−Path Loss, and UE TX EIRP=UE TX power+UE TX antenna (array) gain (function of UE TX BeamWidth).

The UE TX antenna gain or antenna array gain can be a function of the beamwidth of the UE TX beam. From another point of view, the beamwidth of the UE TX beam can also be a function of the UE TX antenna gain or antenna array. The two functions can be inverse function to each other.

In certain embodiments, for uplink, the UE TX beam Net Radiation Power (NRP), which is UE TX EIRP deducted by the pass loss, can be large enough so as to reach the BS RX beam. For the communication to take place, UE's NRP should be no less than some threshold, TX_NRP_Threshold, which is the threshold for the uplink total link budget UL_Threshold (e.g., based on requirement) minus BS RX antenna gain, with units for all the power or gain or loss being logarithm, e.g., dB, or dBm, or the like, which is shown in the following equation:

$$\text{UE TX NRP} \geq \text{TX\_NRP\_Threshold}=\text{UL\_Threshold (Requirement)}-\text{BS RX antenna gain(function of BS RX BeamWidth)} \quad (5)$$

where UE TX NRP=UE TX EIRP−Path Loss and UE TX EIRP=UE TX power+UE TX antenna (array) gain (function of UE TX BeamWidth).

The UE TX antenna gain or antenna array gain can be a function of the beamwidth of the UE TX beam. From another point of view, the beamwidth of the UE TX beam also can be a function of the UE TX antenna gain or antenna array. The two functions can be inverse function to each other.

In certain embodiments, the BS can send the required threshold for the UE TX beam Net Radiation Power, TX_NRP_Threshold, to the UE. The information can be sent by broadcast, unicast, multicast, and the like.

The UE can measure the pass loss from the UE to the BS. After the UE receives the configuration of TX_NRP_threshold, the UE should adjust its TX power, its TX antenna gain or antenna array gain (or the UE TX beamWidth), as shown in the following equation:

$$\text{UE TX power}+\text{UE TX antenna(array)gain(function of UE TX BeamWidth)}-\text{Path loss} \geq \text{TX\_NRP\_Threshold.} \quad (6)$$

For example, for the initial RACH, it can have the TX power and TX antenna (array) gain (or the UE TX beamwidth), such that TX_NRP_Threshold is achieved, as shown in the following equation:

$$\text{UE TX power}+\text{UE TX antenna(array)gain(function of UE TX BeamWidth)}-\text{Path loss}=\text{TX\_NRP\_Threshold} \quad (7)$$

or the least achievable value of TX_NRP by the adjustment of TX power and/or the TX antenna (array) gain (or the UE TX beamWidth) that satisfy Equation 6.

For another example, for the retransmission of RACH signal if the initial RACH signal fails, the UE TX power and or the UE TX antenna (array) gain (or the UE TX beamWidth) can be adjusted such that the TX_NRP_Threshold can be exceeded.

The BS can also send the step of the adjustment of TX_NRP to the UE. Then the UE can use the step of the adjustment to make the adjustment. For example, for the retransmission of RACH signal if the previous RACH signal fails, the UE TX power and or the UE TX antenna (array) gain (or the UE TX beamWidth) can be adjusted such that the TX_NRP is increased by $\Delta\text{TX\_NRP}$. The following TABLES 1A and 1B show example tables used by the UE to determine Tx-Net-radiation-power (NRP)(=EIRP−Path Loss).

TABLE 1A

| Initial Tx Net Radiation Power |
| --- |
| TX_NRP_Threshold |

TABLE 1B

| Retransmission Tx Net Radiation Power |
| --- |
| $\Delta$TX_NRP (can be positive or negative) |
| Here, $\Delta$TX_NRP can be coded into codes, such as |
| 0000: Increase NRP by $\Delta NRP_1$ |
| 0001: Increase NRP by $\Delta NRP_2$ |
| 0010: Increase NRP by $\Delta NRP_3$ |
| 0011-0111 reserved |
| 1000: Decrease NRP by $\Delta NRP_1$ |
| 1001: Decrease NRP by $\Delta NRP_2$ |
| 1010: Decrease NRP by $\Delta NRP_3$ |
| 1011-1111 reserved |

In certain embodiments, BS can set different UE TX Net Radiation Power (NRP) for different call or service priority for the initial RACH. For example, for the higher priority calls or services, the UE TX NRP can be set higher in initial RACH, so as the chance to reach BS can be higher or more reliable.

The BS can send the configuration of NRP for different calls or services with different priority to the UE. After the UE has the configuration, the UE can apply the configuration based on their call's priority. The following TABLE 2 shows an example for UE TX Net Radiation Power for calls with different priorities.

TABLE 2

| Call priority | Initial Tx Net Radiation Power |
| --- | --- |
| Priority 1 | $NRP_0$ |
| Priority 2 | $NRP_1$ |
| Priority 3 | $NRP_2$ |
| . | . |
| . | . |
| . | . |
| Priority P | $NRP_P$ |

In certain embodiments, the BS can set different UE TX Net Radiation Power (NRP) steps $\Delta$TX_NRP for different call or service priority for the initial RACH. For example, for the higher priority calls or services, the UE $\Delta$TX_NRP can be set higher, so as the chance to reach BS can be higher. The BS can send the configuration of $\Delta$TX_NRP for different calls or services with different priority to the UE. After the UE has the configuration, the UE can apply the configuration based on their call's priority.

In certain embodiments, the BS can send the required threshold for the UE TX EIRP, EIRP_Threshold, to the UE. The EIRP_Threshold can be a mapping from the path loss in between the UE and the BS. Different path loss or pass loss region can have different EIRP_Threshold. The information can be sent by e.g., broadcast, unicast, multicast, and the like.

The UE can measure the pass loss from the UE to the BS. After the UE receives the configuration of EIRP_threshold with respect to the path loss, the UE should adjust its TX power, its TX antenna gain or antenna array gain (or the UE TX beamWidth), as shown in the following equation:

$$\text{UE TX power} + \text{UE TX antenna(array)gain(function of UE TX BeamWidth)} \geq \text{EIRP\_Threshold} \quad (8)$$

where the EIRP_Threshold is the one which corresponds to the measured path loss.

For example, for the initial RACH, it can have the TX power and TX antenna (array) gain (or the UE TX beamwidth), such that EIRP_Threshold (according to the path loss) is achieved as shown in the following equation:

$$\text{UE TX power} + \text{UE TX antenna(array)gain(function of UE TX BeamWidth)} = \text{EIRP\_Threshold} \quad (9)$$

or the least achievable value of EIRP by the adjustment of TX power and/or the TX antenna (array) gain (or the UE TX beamWidth) that satisfies Equation 8.

For example, for the retransmission of RACH signal if the initial RACH signal fails, the UE TX power and or the UE TX antenna (array) gain (or the UE TX beamWidth) can be adjusted such that the EIRP_Threshold can be exceeded. The BS can also send the step size of the adjustment of EIRP to the UE. Then UE can use the step size of the adjustment to perform the adjustment.

For example, for the retransmission of RACH signal if the previous RACH signal fails, the UE TX power and or the UE TX antenna (array) gain (or the UE TX beamWidth) can be adjusted such that the EIRP is increased by $\Delta$EIRP. The following TABLES 3A and 3B show example tables used by the UE to determine an EIRP threshold.

TABLE 3A

| Pathloss | EIRP required, or EIRP_Threshold |
| --- | --- |
| $PL \leq PL_0$ | $EIRP_0$ |
| $PL_0 < PL \leq PL_1$ | $EIRP_1$ |
| $PL_1 < PL \leq PL_2$ | $EIRP_2$ |
| . | . |
| . | . |
| . | . |
| $PL_{N-1} \leq PL$ | $EIRP_N$ |

TABLE 3B

| Retransmission Tx EIRP |
| --- |
| $\Delta$EIRP (can be positive or negative) |
| Here, $\Delta$EIRP can be coded into codes, such as |
| 0000: Increase EIRP by $\Delta EIRP_1$ |
| 0001: Increase EIRP by $\Delta EIRP_2$ |
| 0010: Increase EIRP by $\Delta EIRP_3$ |
| 0011-0111 reserved |
| 1000: Decrease EIRP by $\Delta NRP_1$ |
| 1001: Decrease EIRP by $\Delta NRP_2$ |
| 1010: Decrease EIRP by $\Delta NRP_3$ |
| 1011-1111 reserved |

In certain embodiments, BS can set different UE TX EIRP for different call or service priority for the initial RACH. For example, for the higher priority calls or services, the UE TX EIRP can be set higher in initial RACH, so as the chance to reach BS can be higher or more reliable.

The BS can send the configuration of EIRP for different calls or services with different priority to the UE. After the UE has the configuration, the UE can apply the configuration based on their call's priority. TABLE 4 shows an example table for the UE TX EIRP for calls with different priorities.

TABLE 4

| Pathloss | Call priority | Initial EIRP, or the EIRP_Threshold |
|---|---|---|
| $PL \leq PL_0$ | Priority 1 | $EIRP_{0,0}$ |
| | Priority 2 | $EIRP_{0,1}$ |
| | Priority 3 | $EIRP_{0,2}$ |
| | . | . |
| | . | . |
| | . | . |
| | Priority P | $EIRP_{0,P}$ |
| $PL_0 < PL \leq PL_1$ | Priority 1 | $EIRP_{1,0}$ |
| | Priority 2 | $EIRP_{1,1}$ |
| | Priority 3 | $EIRP_{1,2}$ |
| | . | . |
| | . | . |
| | . | . |
| | Priority P | $EIRP_{1,P}$ |
| . | | |
| . | | |
| . | | |
| $PL_{N-1} \leq PL$ | Priority 1 | $EIRP_{N,0}$ |
| | Priority 2 | $EIRP_{N,1}$ |
| | Priority 3 | $EIRP_{N,2}$ |
| | . | . |
| | . | . |
| | . | . |
| | Priority P | $EIRP_{N,P}$ |

In certain embodiments, a BS can set different UE TX EIRP steps ΔEIRP for a different call or service priority for the initial RACH. For example, for the higher priority calls or services, the UE ΔEIRP can be set higher, so as the chance to reach the BS can be higher. The BS can send the configuration of ΔEIRP for different calls or services with different priority to the UE. After the UE has the configuration, the UE can apply the configuration based on their call's priority.

In certain embodiments, for a certain path loss, given NRP threshold, and a TX power (P_TX) ramping policy or TX power adjustment policy, the UE can determine the TX antenna gain (AG) by the following equation:

$$AG = NRP\_threshold(dB \text{ or } dBm) - P\_TX(dB \text{ or } dBm) + Pass\ loss(dB \text{ or } dBm) \quad (10)$$

For a certain path loss, given NRP threshold, and a TX antenna gain (AG) adjustment policy, the UE can determine the TX power by the following equation:

$$P\_TX = NRP\_threshold(dB \text{ or } dBm) - AG(dB \text{ or } dBm) + Pass\ loss(dB \text{ or } dBm) \quad (11)$$

If NRP_threshold is the same, then the adjustment of P_TX is the opposite of the antenna gain's adjustment, i.e., ΔP_TX=−ΔAG (dB or dBm), that is, the amount that P_TX increases is the amount that antenna gain decreases, or the amount that P_TX decreases is the amount that antenna gain increases.

Note that UE TX antenna gain (AG) can be a function of UE TX beamwidth. For a determined AG, the UE can come up with a beam pattern (e.g., by adjusting the beam forming factor, the phase shifter, and the like), so that the beam with certain beamwidth can achieve the required TX antenna gain.

In certain embodiments, for a certain path loss, given EIRP threshold, and a TX power (P_TX) ramping policy or TX power adjustment policy, the UE can determine the TX antenna gain (AG), which is, AG=EIRP_threshold (dB or dBm)−P_TX (dB or dBm).

For a certain path loss, given the EIRP threshold, and a TX antenna gain (AG) adjustment policy, the UE can determine the TX power, which is, P_TX=EIRP_threshold (dB or dBm)−AG (dB or dBm).

If the EIRP_threshold is the same, then the adjustment of P_TX is the opposite of the antenna gain's adjustment, i.e., ΔP_TX=−ΔAG (dB or dBm), that is, the amount that P_TX increases is the amount that antenna gain decreases, or the amount that P_TX decreases is the amount that antenna gain increases.

Note that a UE TX antenna gain (AG) can be a function of a UE TX beamwidth. For a determined AG, the UE can come up with a beam pattern (e.g., by adjusting the beam forming factor, the phase shifter, and the like), so that the beam with certain beamwidth can achieve the required TX antenna gain.

In certain embodiments, a BS can send the required threshold for the UE TX antenna (array) gain, AG_Threshold, to the UE. The AG_Threshold can be a mapping from the path loss in-between the UE and the BS. Different path loss or pass loss region can have different AG_Threshold. The information can be sent by e.g., broadcast, unicast, multicast, and the like.

The UE can measure the pass loss from the UE to the BS. After UE receives the configuration of AG_threshold with respect to the path loss, the UE should adjust its TX beamwidth, such that the TX beamwidth can be the one which gives a TX AG, as shown in the following equation:

$$TX\ AG(\text{function of UE TX BeamWidth}) \geq AG\_Threshold \quad (12)$$

For example, for the initial RACH, it can have the TX antenna (array) gain (or the UE TX beamwidth), such that AG_Threshold (according to the path loss) is achieved, UE TX antenna (array) gain (function of UE TX BeamWidth)=AG_Threshold, or the least achievable value of AG by the adjustment of the TX antenna (array) gain (or the UE TX beamWidth) that satisfies Equation 12.

For example, for the retransmission of RACH signal if the initial RACH signal fails, the UE TX antenna (array) gain (or the UE TX beamWidth) can be adjusted such that the AG_Threshold can be exceeded. The BS can also send the step size of the adjustment of the AG to the UE. Then UE can use the step size of the adjustment to make the adjustment.

For example, for the retransmission of a RACH signal if the previous RACH signal fails, the UE TX antenna (array) gain (or the UE TX beamWidth) can be adjusted such that the AG is increased by ΔAG. The following TABLES 5A and 5B show example tables used by the UE to determine a Tx antenna gain (AG).

TABLE 5A

| Pathloss | AG required, or AG_Threshold |
|---|---|
| $PL \leq PL_0$ | $AG_0$ |
| $PL_0 < PL \leq PL_1$ | $AG_1$ |
| $PL_1 < PL \leq PL_2$ | $AG_2$ |
| • | • |
| • | • |
| • | • |
| $PL_{N-1} \leq PL$ | $AG_N$ |

TABLE 5B

| Retransmission Tx AG |
|---|
| ΔAG (can be positive or negative) Here, ΔAG can be coded into codes, such as 0000: Increase AG by $ΔAG_1$ 0001: Increase AG by $ΔAG_2$ |

TABLE 5B-continued

| Retransmission Tx AG |
| --- |
| 0010: Increase AG by $\Delta AG_3$ |
| 0011-0111 reserved |
| 1000: Decrease AG by $\Delta AG_1$ |
| 1001: Decrease AG by $\Delta AG_2$ |
| 1010: Decrease AG by $\Delta AG_3$ |
| 1011-1111 reserved |

In certain embodiments, as an alternative, the retransmission can be for the increase or decrease to a level or certain levels, rather than the absolute value, where the level of AG can be related to the beamwidth, or the number of beams, as shown in the following table:

TABLE 5C

| Retransmission Tx AG |
| --- |
| $\Delta AG$ (can be positive or negative) |
| Here, $\Delta AG$ can be coded into codes, such as |
| 0000: Increase AG by one level |
| 0001: Increase AG by two levels |
| 0010: Increase AG by three levels |
| 0011-0111 reserved |
| 1000: Decrease AG by one level |
| 1001: Decrease AG by two levels |
| 1010: Decrease AG by three levels |
| 1011-1111 reserved |

In certain embodiments, the level of the antenna gain, or antenna array gain can be, corresponding to the number of beams, or the beamwidth, or the configuration of the number of beams and the beamwidth, e.g., as shown in the following table:

TABLE 6

| Number of beams | Beamwidth | Antenna gain |
| --- | --- | --- |
| 1 | Azimuth: 360°<br>Elevation: 180° | AG1, level 1 |
| 2 | Azimuth: 180°<br>Elevation: 180° | AG2, level 2 |
| 4 | Azimuth: 180°<br>Elevation: 90° | AG3, level 3 |
| 6 | Azimuth: 120°<br>Elevation: 90° | AG4, level 4 |
| 8 | Azimuth: 90°<br>Elevation: 90° | AG5, level 5 |

It is noted that for the same number of beams, for different beamwidth configuration, the antenna gain can be different. The AG levels can be predefined or configured.

In certain embodiments, a BS can set different UE TX antenna (array) gain AG for different calls or service priorities for the initial RACH. For example, for the higher priority calls or services, the UE TX AG can be set higher in the initial RACH, so as the chance to reach BS can be higher or more reliable. The BS can send the configuration of TX AG for different calls or services with different priority to the UE. After the UE has the configuration, the UE can apply the configuration based on their call's priorities.

The UE can measure the pass loss from the UE to the BS. After the UE receives the configuration of the AG_threshold with respect to the path loss, the UE should adjust its TX beamwidth, such that the TX beamwidth can be the one which gives a TX AG, such that Equation 12 is satisfied.

For example, for the initial RACH, it can have the TX antenna (array) gain (or the UE TX beamWidth), such that AG_Threshold (according to the path loss) is achieved, UE TX antenna (array) gain (function of UE TX Beam-Width)=AG_Threshold, or the least achievable value of AG by the adjustment of the TX antenna (array) gain (or the UE TX beamWidth) that satisfies Equation 12. The following TABLE 7 shows an example table for a UE TX antenna gain (AG) for calls with different priorities.

TABLE 7

| Pathloss | Call priority | Initial AG, or the AG_Threshold |
| --- | --- | --- |
| $PL \leq PL_0$ | Priority 1 | $AG_{0,0}$ |
| | Priority 2 | $AG_{0,1}$ |
| | Priority 3 | $AG_{0,2}$ |
| | . | . |
| | . | . |
| | . | . |
| | Priority P | $AG_{0,P}$ |
| $PL_0 < PL \leq PL_1$ | Priority 1 | $AG_{1,0}$ |
| | Priority 2 | $AG_{1,1}$ |
| | Priority 3 | $AG_{1,2}$ |
| | . | . |
| | . | . |
| | . | . |
| | Priority P | $AG_{1,P}$ |
| . | | |
| . | | |
| . | | |
| $PL_{N-1} \leq PL$ | Priority 1 | $AG_{N,0}$ |
| | Priority 2 | $AG_{N,1}$ |
| | Priority 3 | $AG_{N,2}$ |
| | . | . |
| | . | . |
| | . | . |
| | Priority P | $AG_{N,P}$ |

In certain embodiments, a BS can set different UE TX antenna (array) gain AG steps $\Delta AG$ for different call or service priority for the initial RACH. For example, for the higher priority calls or services, the UE $\Delta AG$ can be set higher, so as the chance to reach BS can be higher. The BS can send the configuration of $\Delta AG$ for different calls or services with different priority to the UE. After the UE has the configuration, the UE can apply the configuration based on their call's priorities.

In certain embodiments, the BS can send the required threshold for the UE TX beamwidth (BW) (e.g., half power beamwidth (HPBW)), to the UE. The BW_Threshold can be a mapping from the path loss in-between the UE and the BS. Different path loss or pass loss region can have different BW_Threshold. The information can be sent by e.g., broadcast, unicast, multicast, and the like.

The UE can measure the pass loss from the UE to the BS. After the UE receives the configuration of BW_threshold with respect to the path loss, the UE should adjust its TX beamwidth, such that the TX beamwidth can be the one which gives a TX antenna gain (AG), such that Equations 1, 6, 8, or 12 is satisfied.

For example, for the initial RACH, it can have the UE TX beamwidth, such that AG_Threshold (according to the path loss) is achieved, UE TX antenna (array) gain (function of UE TX BeamWidth)=AG_Threshold, or the least achievable value of AG by the adjustment of the TX antenna (array) gain (or the UE TX beamWidth) that satisfies Equation 12.

For another example, for the initial RACH, it can have the UE TX beamwidth, as the one equal to the BW_Threshold or the largest beamwidth that satisfies the following equation:

$$BW \leq BW\_Threshold \qquad (13)$$

For example, for the retransmission of RACH signal if the initial RACH signal fails, the UE TX beamWidth can be adjusted such that the AG_Threshold can be exceeded.

For another example, for the retransmission of RACh signal, the UE TX beamwidth can be the one satisfying Equation 13.

The BS can also send the step size of the adjustment of BW to the UE. Then UE can use the step size of the adjustment to make the adjustment.

For example, for the retransmission of RACH signal if the previous RACH signal fails, the UE TX beamWidth can be adjusted to a lower level by $\Delta BW$. TABLE 8A shows an example table used by the UE to determine a Tx beamwidth (BW).

TABLE 8A

| Path loss | BW required, or BW_Threshold |
|---|---|
| $PL \leq PL_0$ | $BW_0$ |
| $PL_0 < PL \leq PL_1$ | $BW_1$ |
| $PL_1 < PL \leq PL_2$ | $BW_2$ |
| • | • |
| • | • |
| • | • |
| $PL_{N-1} \leq PL$ | $BW_N$ |

The following TABLE 9A shows an example table for beamwidth adjustment for the Tx beamwidth (BW).

TABLE 9A

| Signal | Notes |
|---|---|
| Beamwidth adjustment | 0000: Increase beamwidth $\Delta w_1$<br>0001: Increase beamwidth $\Delta w_2$<br>0010: Increase beamwidth $\Delta w_3$<br>0011-0111 reserved<br>1000: Decrease beamwidth $\Delta w_1$<br>1001: Decrease beamwidth $\Delta w_2$<br>1010: Decrease beamwidth $\Delta w_3$<br>1011-1111 reserved |

In certain embodiments, the beamwidth adjustment can also be the beamwidth level adjustment. For example, there can be certain levels of the beamwidth, such as 45°, 90°, 180°, 360°, for level 1, 2, 3, 4, respectively, as shown in the following table:

TABLE 9B

| Signal | Notes |
|---|---|
| Beamwidth adjustment | 00: no change<br>01: beamwidth go up by one level<br>10: beamwidth go down by one level<br>11: reserved |

In certain embodiments, the retransmission can be for the increase or decrease to a level or certain levels, rather than the absolute value, where the level of beamwidth can be related to the beamwidth in azimuth and elevation, or the number of beams, as shown in the following table:

TABLE 9C

| Retransmission Tx beamwidth (BW) |
|---|
| $\Delta BW$ (can be positive or negative)<br>Here, $\Delta BW$ can be coded into codes, such as |

TABLE 9C-continued

| Retransmission Tx beamwidth (BW) |
|---|
| 0000: Increase BW by one level<br>0001: Increase BW by two levels<br>0010: Increase BW by three levels<br>0011-0111 reserved<br>1000: Decrease BW by one level<br>1001: Decrease BW by two levels<br>1010: Decrease BW by three levels<br>1011-1111 reserved |

In certain embodiments, the level of the antenna gain, or antenna array gain can be listed, corresponding to the number of beams, or the beamwidth, or the configuration of the number of beams and the beamwidth, e.g., as shown in the following table:

TABLE 10

| Number of beams | Beamwidth | Level |
|---|---|---|
| 1 | Azimuth: 360°<br>Elevation: 180° | level 1 |
| 2 | Azimuth: 180°<br>Elevation: 180° | level 2 |
| 4 | Azimuth: 180°<br>Elevation: 90° | level 3 |
| 6 | Azimuth: 120°<br>Elevation: 90° | level 4 |
| 8 | Azimuth: 90°<br>Elevation: 90° | level 5 |

It is noted that for the same number of beams, for different beamwidth configuration, the beamwidth can be different. The beamwidth levels can be predefined or configured.

In certain embodiments, the BS can set different UE TX beamwidth (BW) for different call or service priority for the initial RACH. For example, for the higher priority calls or services, the UE TX BW can be set smaller in initial RACH, so as the chance to reach BS can be higher or more reliable. The BS can send the configuration of TX BW for different calls or services with different priority to the UE. After UE has the configuration, the UE can apply the configuration based on their call's priority.

The UE can measure the pass loss from the UE to the BS. After the UE receives the configuration of BW_threshold with respect to the path loss, the UE should adjust its TX beamwidth, such that the TX beamwidth can be the one which satisfies (4), or the TX beamwidth that gives antenna gain satisfying Equation 12.

For example, for the initial RACH, it can have the TX antenna (array) gain (or the UE TX beamwidth), such that AG_Threshold (according to the path loss) is achieved, UE TX antenna (array) gain (function of UE TX Beam-Width)=AG_Threshold, or the least achievable value of AG by the adjustment of the TX antenna (array) gain (or the UE TX beamWidth) that satisfies Equation 12.

For another example, for the initial RACH, it can have the UE TX beamwidth, as the one equal to the BW_Threshold or the largest beamwidth that satisfies Equation 13.

The following TABLE 10 shows an example table for UE TX Net Radiation Power for calls with different priority.

TABLE 10

| Pathloss | Call priority | Initial BW, or the BW_Threshold |
|---|---|---|
| $PL \leq PL_0$ | Priority 1 | $BW_{0,0}$ |
| | Priority 2 | $BW_{0,1}$ |
| | Priority 3 | $BW_{0,2}$ |
| | . | . |
| | . | . |
| | . | . |
| | Priority P | $BW_{0,P}$ |
| $PL_0 < PL \leq PL_1$ | Priority 1 | $BW_{1,0}$ |
| | Priority 2 | $BW_{1,1}$ |
| | Priority 3 | $BW_{1,2}$ |
| | . | . |
| | . | . |
| | . | . |
| | Priority P | $BW_{1,P}$ |
| . | . | . |
| . | . | . |
| . | . | . |
| $PL_{N-1} \leq PL$ | Priority 1 | $BW_{N,0}$ |
| | Priority 2 | $BW_{N,1}$ |
| | Priority 3 | $BW_{N,2}$ |
| | . | . |
| | . | . |
| | . | . |
| | Priority P | $BW_{N,P}$ |

In certain embodiments, the BS can set different UE UE TX antenna beamwidth steps ΔBW for different call or service priority for the initial RACH. For example, for the higher priority calls or services, the UE ΔBW can be set higher, so as the chance to reach BS can be higher. The BS can send the configuration of ΔBW for different calls or services with different priority to the UE. After the UE has the configuration, the UE can apply the configuration based on their call's priority.

In certain embodiments of the present disclosure, the initial beamwidth to use for a UE to send RACH signal to a BS can be a function of UE's mobility and other factors such as the initial Tx power, BS RX beam gain, path loss, and the like. The threshold of beamwidth (e.g., for the threshold for initial RACH, or RACH retransmission, and the like) to use for a UE to send RACH signal to a BS can be a function of UE's mobility and other factors such as the initial Tx power, BS RX beam gain, path loss, and the like. The following TABLE 11 shows an example table used by the UE to determine beamwidth.

TABLE 11

| UE velocity | Initial Beamwidth, or BW_Threshold |
|---|---|
| $V \leq V_0$ | $BW_0$ |
| $V_0 < V \leq V_1$ | $BW_1$ |
| $V_1 < V \leq V_2$ | $BW_2$ |
| . | . |
| . | . |
| . | . |
| $V_{N-1} \leq V$ | $BW_N$ |

The table can be sent to the UE by the BS, such as in the broadcast channel, or the table can be preconfigured or pregiven.

The UE's velocity can be the absolute value to measure the velocity, such as the value in unit of e.g., kilo meters per hour, meters per minute, and the like. The UE can measure its speed such as by using GPS, or by using estimation on Doppler, and the like.

The UE's velocity can also be categorized by using other metric, such as zero/low mobility, medium mobility, high mobility, where the metric of the mobility can be, e.g., by counting the number of handovers during certain time duration, or by using GPS, or by using estimation on Doppler, and the like.

The base station or network can also measure the velocity of the UE. For the RACH for network re-entry, such as, the base station or the network can know the velocity of the UE, and tells the UE which beamwidth to use, or which TX antenna gain to use, e.g., from the serving base station.

In certain embodiments of the present disclosure, the initial TX antenna (array) gain to use for a UE to send RACH signal to a BS can be a function of UE's mobility and other factors such as the initial Tx power, BS RX beam gain, path loss, and the like.

The threshold of TX antenna (array) gain (e.g., for the threshold for initial RACH, or RACH retransmission, the like) to use for a UE to send RACH signal to a BS can be a function of UE's mobility and other factors such as the initial Tx power, BS RX beam gain, path loss, the like. The following TABLE 12 shows an example table used by the UE to determine TX antenna gain (AG) threshold.

TABLE 12

| UE velocity | Antenna gain (AG) |
|---|---|
| $V \leq V_0$ | $AG_0$ |
| $V_0 < V \leq V_1$ | $AG_1$ |
| $V_1 < V \leq V_2$ | $AG_2$ |
| . | . |
| . | . |
| . | . |
| $V_{N-1} \leq V$ | $AG_N$ |

The table can be sent to the UE by BS, such as in broadcast channel. Alternatively, the table can be preconfigured or pre-stored.

In certain embodiments of the present disclosure, the initial TX beamwidth to use for a UE to send RACH signal to a BS can be a function of UE's mobility and other factors such as the initial Tx power, BS RX beam gain, path loss, the like. For the same mobility, depending on call's priority, UE with different priority can use different beamwidth. For example, the higher priority call can use wider beamwidth, or the threshold for the beamwidth can be set larger.

The threshold of TX beamwidth (e.g., for the threshold for initial RACH, or RACH retransmission, and the like) to use for a UE to send RACH signal to a BS can be a function of UE's mobility and other factors such as the initial Tx power, BS RX beam gain, path loss, priority of the call of the UE, priority of the UE, and the like. The following TABLE 13 shows an example table for UE TX Net Radiation Power for calls with different priority.

TABLE 13

| Velocity | Call priority | Initial BW, or the BW_Threshold |
|---|---|---|
| $V \leq V_0$ | Priority 1 | $BW_{0,0}$ |
| | Priority 2 | $BW_{0,1}$ |
| | Priority 3 | $BW_{0,2}$ |
| | . | . |
| | . | . |
| | . | . |
| | Priority P | $BW_{0,P}$ |

TABLE 13-continued

| Velocity | Call priority | Initial BW, or the BW_Threshold |
|---|---|---|
| $V_0 < V \leq V_1$ | Priority 1 | $BW_{1,0}$ |
| | Priority 2 | $BW_{1,1}$ |
| | Priority 3 | $BW_{1,2}$ |
| | . | . |
| | . | . |
| | . | . |
| | Priority P | $BW_{1,P}$ |
| . | . | . |
| . | . | . |
| . | . | . |
| $V_{N-1} \leq V$ | Priority 1 | $BW_{N,0}$ |
| | Priority 2 | $BW_{N,1}$ |
| | Priority 3 | $BW_{N,2}$ |
| | . | . |
| | . | . |
| | . | . |
| | Priority P | $BW_{N,P}$ |

The table can be sent to the UE by the BS, such as in broadcast channel. Alternatively, the table can be preconfigured or pregiven.

In certain embodiments of the present disclosure, the initial TX antenna gain to use for a UE to send a RACH signal to a BS can be a function of UE's mobility and other factors such as the initial Tx power, BS RX beam gain, path loss, the like. For the same mobility, depending on call's priority, UE with different priority can use different antenna gain. For example, the higher priority call can use smaller antenna gain, or the threshold for the antenna gain can be set smaller, as long as the link budget allows (e.g., Equation 1, 6, 8, 12, or 13 satisfies).

The threshold of TX antenna gain (e.g., for the threshold for initial RACH, or RACH retransmission, and the like) to use for a UE to send a RACH signal to a BS can be a function of UE's mobility and other factors such as the initial Tx power, BS RX beam gain, path loss, priority of the call of the UE, priority of the UE, and the like. The following TABLE 14 shows an example table for UE TX antenna gains (AG) for calls with different priorities.

TABLE 14

| Velocity | Call priority | Initial AG, or the AG_Threshold |
|---|---|---|
| $V \leq V_0$ | Priority 1 | $AG_{0,0}$ |
| | Priority 2 | $AG_{0,1}$ |
| | Priority 3 | $AG_{0,2}$ |
| | . | . |
| | . | . |
| | . | . |
| | Priority P | $AG_{0,P}$ |
| $V_0 < V \leq V_1$ | Priority 1 | $AG_{1,0}$ |
| | Priority 2 | $AG_{1,1}$ |
| | Priority 3 | $AG_{1,2}$ |
| | . | . |
| | . | . |
| | . | . |
| | Priority P | $AG_{1,P}$ |
| . | . | . |
| . | . | . |
| . | . | . |
| $V_{N-1} \leq V$ | Priority 1 | $AG_{N,0}$ |
| | Priority 2 | $AG_{N,1}$ |
| | Priority 3 | $AG_{N,2}$ |
| | . | . |
| | . | . |
| | . | . |
| | Priority P | $AG_{N,P}$ |

The table can be sent to the UE by BS, such as in broadcast channel. Alternatively, the table can be preconfigured or pre-stored.

In certain embodiments of the present disclosure, the initial beamwidth to use for a UE to send RACH signal to a BS can be a function of UE's mobility and other factors such as the initial Tx power, BS RX beam gain, path loss, and the like. The threshold of TX beamwidth (e.g., for the threshold for initial RACH, or RACH retransmission, and the like) to use for a UE to send RACH signal to a BS can be a function of UE's mobility and other factors such as the initial Tx power, BS RX beam gain, path loss, and the like. The following TABLE 15 shows an example table used by the UE to determine the beamwidth.

TABLE 15

| Path loss | UE velocity | TX beamwidth (BW), TX beamwidth threshold |
|---|---|---|
| $PL \leq PL_0$ | $V \leq V_0$ | $BW_{0,0}$ |
| | $V_0 < V \leq V_1$ | $BW_{0,1}$ |
| | $V_1 < V \leq V_2$ | $BW_{0,2}$ |
| | . | . |
| | . | . |
| | . | . |
| | $V_{N-1} \leq V$ | $BW_{0,N}$ |
| $PL_0 < PL \leq PL_1$ | $V \leq V_0$ | $BW_{1,0}$ |
| | $V_0 < V \leq V_1$ | $BW_{1,1}$ |
| | $V_1 < V \leq V_2$ | $BW_{1,2}$ |
| | . | . |
| | . | . |
| | . | . |
| | $V_{N-1} \leq V$ | $BW_{1,N}$ |
| . | . | . |
| . | . | . |
| . | . | . |
| $PL_{M-1} \leq PL$ | $V \leq V_0$ | $BW_{M,0}$ |
| | $V_0 < V \leq V_1$ | $BW_{M,1}$ |
| | $V_1 < V \leq V_2$ | $BW_{M,2}$ |
| | . | . |
| | . | . |
| | . | . |
| | $V_{N-1} \leq V$ | $BW_{M,N}$ |

The table can be sent to the UE by BS, such as in broadcast channel. Alternatively, the table can be preconfigured or pregiven.

In certain embodiments of the present disclosure, the initial TX antenna (array) gain to use for a UE to send RACH signal to a BS can be a function of UE's mobility and other factors such as the initial Tx power, BS RX beam gain, path loss, and the like. The threshold of TX antenna (array) gain (e.g., for the threshold for initial RACH, or RACH retransmission, and the like) to use for a UE to send RACH signal to a BS can be a function of UE's mobility and other factors such as the initial Tx power, BS RX beam gain, path loss, the like. The following TABLE 16 shows an example table used by the UE to determine the beamwidth.

TABLE 16

| Pathloss | UE velocity | Antenna (array) Gain, TX antenna gain threshold |
|---|---|---|
| $PL \leq PL_0$ | $V \leq V_0$ | $AG_{0,0}$ |
| | $V_0 < V \leq V_1$ | $AG_{0,1}$ |
| | $V_1 < V \leq V_2$ | $AG_{0,2}$ |
| | . | . |
| | . | . |
| | . | . |
| | $V_{N-1} \leq V$ | $AG_{0,N}$ |
| $PL_0 < PL \leq PL_1$ | $V \leq V_0$ | $AG_{1,0}$ |
| | $V_0 < V \leq V_1$ | $AG_{1,1}$ |
| | $V_1 < V \leq V_2$ | $AG_{1,2}$ |
| | . | . |

TABLE 16-continued

| Pathloss | UE velocity | Antenna (array) Gain, TX antenna gain threshold |
|---|---|---|
|  | $V_{N-1} \leq V$ | $AG_{1,N}$ |
| . | . | . |
| . | . | . |
| . | . | . |
| $PL_{M-1} \leq PL$ | $V \leq V_0$ | $AG_{M,0}$ |
|  | $V_0 < V \leq V_1$ | $AG_{M,1}$ |
|  | $V_1 < V \leq V_2$ | $AG_{M,2}$ |
| . | . | . |
| . | . | . |
| . | . | . |
|  | $V_{N-1} \leq V$ | $AG_{M,N}$ |

The table can be sent to the UE by BS, such as in broadcast channel. Alternatively, the table can be preconfigured or pre-stored.

In certain embodiments of the present disclosure, the priority of the call can be used as an additional factor to determine the initial beamwidth and initial power. For example, in previous tables, for a certain path loss, and a certain mobility, the UE TX antenna gain or UE TX beamwidth can be different for different priority of the call, or different priority of the UE's access, or different access level of the UE.

For another example, for a certain path loss, and a certain mobility, the UE with higher priority can have wider beam, or smaller TX antenna gain, and accordingly, the UE's TX power can need to be more, as long as they are within the coverage feasibility region. The UE with lower priority can have narrower beam, or higher TX antenna gain, and accordingly, the UE's TX power can need to be less, as long as they are within the coverage feasibility region.

In certain embodiments of the present disclosure, there can be a feasibility region or feasible region for UE's TX power and UE's TX beam gain (or UE's TX beamwidth). The feasibility region means that any point of UE's TX power and UE's TX beam gain (or UE's TX beamwidth) in the feasibility region can satisfy the coverage requirement such as in Equation 1, 6, 8, 12, or 13.

The feasible region, or the feasibility region can be based on the path loss, UE's mobility, base station's RX beam gain, required coverage threshold in a RACH, or quality of service in a RACH, and the like.

Figures 12A, 12B:
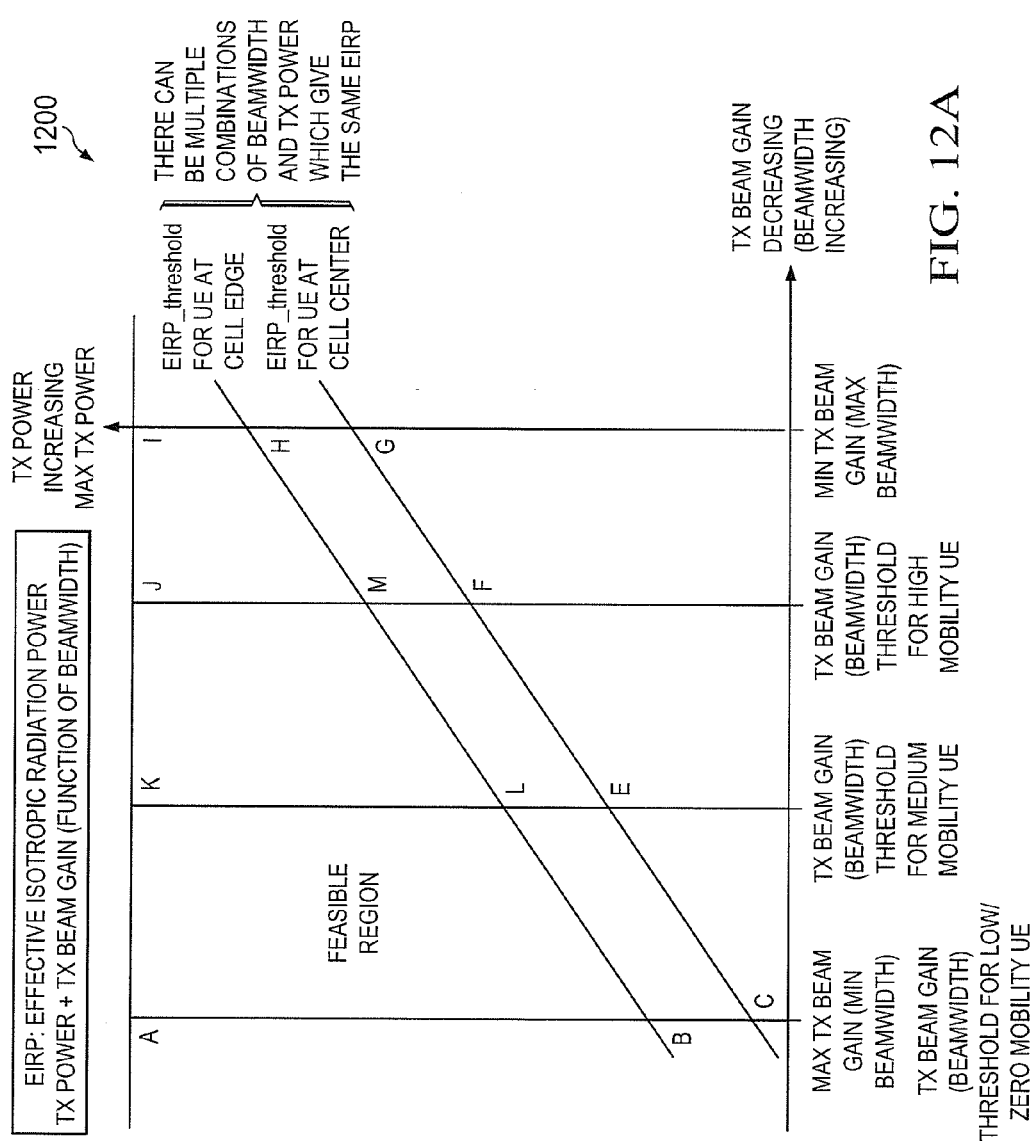
FIGS. 12A and 12B illustrate an example of feasible regions for different parameters according to embodiments of the present disclosure.

FIGS. 12A and 12B illustrate feasible regions 1200, 1210 for different parameters according to embodiments of the present disclosure. The embodiment of the feasible region illustrated in FIGS. 12A to 12B are for illustration only. Other embodiments of the feasible region could be used without departing from the scope of this disclosure.

In certain embodiments of the present disclosure, the UE's TX beam gain, or beamwidth can be chosen first, based on e.g., mobility, and the priority of the call, and the feasibility region. Once the TX beam gain, or TX beamwidth is chosen, the TX power can be decided, e.g., the TX power can be the least TX power, such that Equation 1, 6, 8 or 12 is satisfied.

The above can be applicable for the initial RACH and RACH retransmissions. For retransmissions, if the initial TX power is the least TX power such that Equation 1, 6, 8 or 12 is satisfied, then TX power can be ramping up. If after power ramping up, the retransmission is still not successful, it can reduce the beamwidth, but still in the feasible region.

In certain embodiments of the present disclosure, a UE measures path loss. Then the UE figures out an EIRP_threshold. If the mobility has an additional requirement on the antenna gain, or beamwidth, then the UE should use it to form the feasibility region. If the feasibility region is non-empty, then the UE can choose an antenna gain, or beamwidth within the feasibility region. If the feasibility region is empty, the UE should use the max Tx power, and the least antenna gain or the largest beamwidth such that the EIRP can be closest to the EIRP_threshold.

Figure 13:
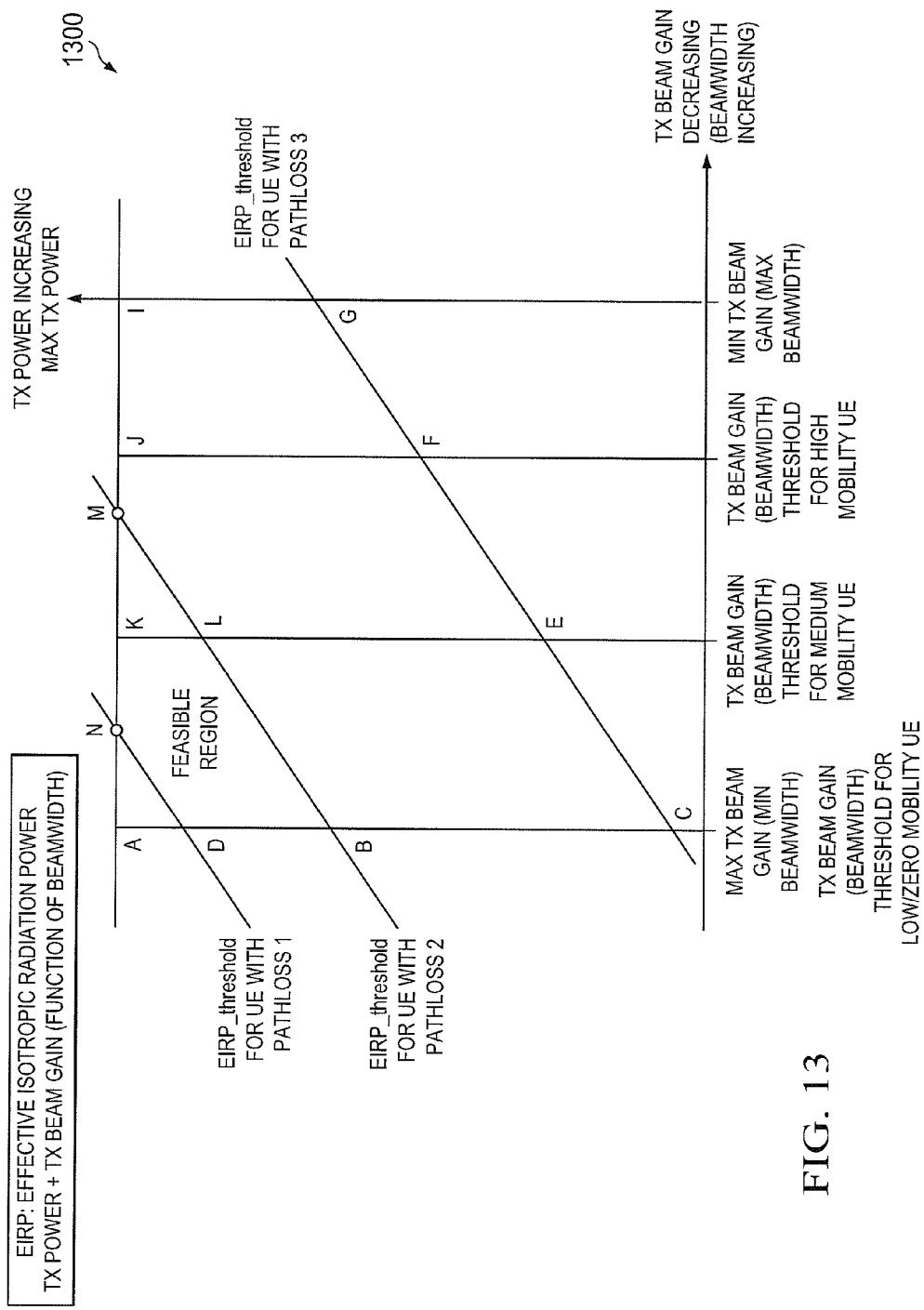
FIG. 13 illustrates another feasible region adjustment according to the embodiments of the present disclosure.

FIG. 13 illustrates a feasible region adjustment 1300 according to the embodiments of the present disclosure the present disclosure. The embodiment of the feasible region adjustment illustrated in FIG. 13 is for illustration only. Other embodiments of the feasible region adjustment could be used without departing from the scope of this disclosure.

If the feasibility region is empty, as an alternative, the requirement or the constraint on an antenna gain or a beamwidth with respect to the mobility of the UE can be relaxed.

For example, in the FIG. 13, for the UE with path loss 2, the feasibility region is inside and bounded by A-B-M-A. If in addition, there is a certain requirement for the antenna gain, or beamwidth, regarding to the mobility, as those lines in the figure for low, medium, and high mobility, then for a UE with path loss 2 and the high mobility, the feasibility region becomes empty, because for the high mobility UE the beamwidth or antenna gain should be on the right side of the line J-F. For such, the UE can use point M, or a point close to M, which has the max TX power, and the achievable widest beamwidth, or least antenna gain, to achieve the EIRP threshold due to path loss 2. The UE can use any point within and on region A-B-M-A, for retransmissions.

For another example, in the FIGS. 13A and 13B, for the UE with path loss 1, and the medium or high mobility, it can start from point N or near point N.

In certain embodiments of the present disclosure, there can be different patterns or trajectories for the initial and retransmissions of the RACH. For UE with different mobility, different calls with different priorities, or different UEs with different access levels, it can use different pattern.

Figure 14:
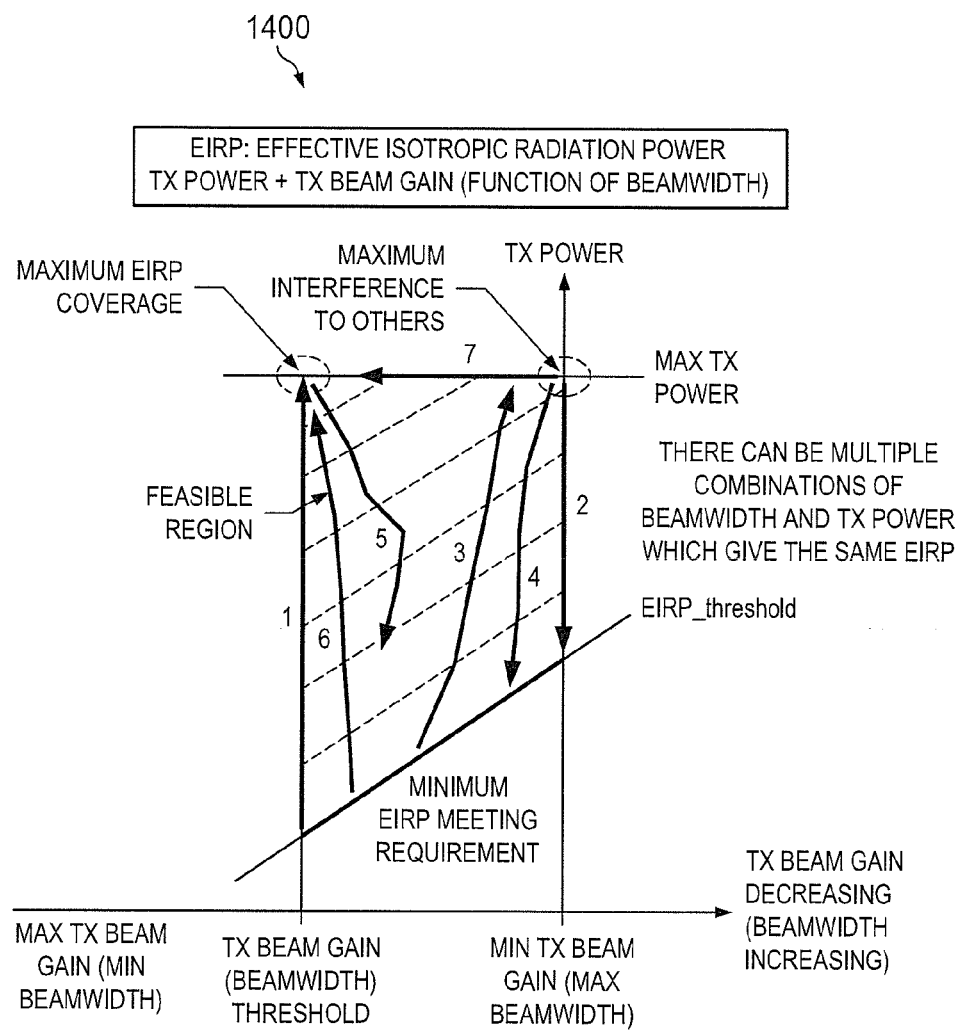
FIG. 14 illustrates example traces of UE TX power adjustment and beam adaptation according to the embodiments of the present disclosure.

FIG. 14 illustrates example traces 1400 of UE TX power adjustment and beam adaptation according to the embodiments of the present disclosure. The embodiment of example traces illustrated in FIG. 14 is for illustration only. Other embodiments of example traces could be used without departing from the scope of this disclosure.

According to trace 1, the UE keeps the minimum required beamwidth (i.e., beamwidth_threshold determined by e.g., the mobility and the beam search space) and increases the Tx power, until the RACH signal is successfully transmitted.

According to trace 6, the UE has a beamwidth wider than trace 1, due to a required stringent latency (e.g., a low latency than trace 1 due to a smaller number of beams), but with a larger Tx power to achieve the EIRP_threshold, resulting more interference. Trace 6 can reduce its beamwidth, e.g., due to the decreased velocity.

According to trace 3, the UE can increase its beamwidth due to, e.g., increased velocity, in a similar manner to trace 6.

According to trace 2, the UE starts from the max power and the max beamwidth, then reduces the Tx power after being successful. Trace 2 has a very aggressive starting, good for high priority calls such as emergency call.

According to trace 4, the UE starts from the max power and the max beamwidth, after the RACH signal transmission being successful, reduces both of power and beamwidth. Trace 4 has a very aggressive starting, good for high priority calls such as an emergency call.

According to trace 7, the UE starts from the maximum power and the max beamwidth, then reduces the beamwidth if the RACH signal transmission is not successful.

According to trace 5, the UE starts from the max power and the beamwidth_threshold, then reduces Tx power or increases beamwidth or both of the power and the beamwidth.

In certain embodiments, the traces can also have zig-zag patterns.

It can be discrete version for these trajectories, if UE Tx power has discrete multiple values, and UE TX beamwidth or TX antenna gain has discrete multiple values.

For example, if the beamwidth can only be discrete values, 45°, 90°, 180°, 360°, then the trajectories will be only having these four values as the available points.

In certain embodiments of the present disclosure, the UE with high mobility does not choose BS with low Tx power, or BS with a smaller coverage. The UE can choose a BS, which can give the UE non-empty feasible region for the random access.

In certain embodiments of the present disclosure, the initial beamwidth to use for a UE to send RACH signal to a BS can be a function of UE's mobility and other factors such as the initial Tx power, BS RX beam gain, path loss, and the like. The base station sends its RX beam radiation power or BS RX antenna gain that it will use to receive the UE's RACH signal, to the UE.

The UE can determine the path loss from DL, such as, by measurement on Sync or BCH, slices, and the like.

The UE then decides the initial beamwidth and TX power, based on the path loss, BS TX antenna gain, and requirement on RACH, such as the RACH detection probability, required SINR, or required SNR, or required power.

For example, the UE TX power, UE TX antenna gain, should be chosen such that Equation 1, 6, 8 or 12 is satisfied.

If UE Tx power has discrete multiple values, and UE TX beamwidth also has discrete multiple values, there can be multiple combinations which can satisfy the equation above, where such combinations can be referred as feasible combination.

As an example, among all the feasible combinations, the UE can choose a proper beamwidth, considering its mobility. Then, the UE's TX power can be chosen, based on the feasibility, as well as how aggressive or what the call priority is. Within the feasibility region, the UE can choose beamwidth, and initial power, as long as it can reach the base station.

The UE can choose the most aggressive one, e.g., the max power and the widest beamwidth to increase the chance. This is good for the calls with high priority. For the retransmissions, it can power down, or reduce the beamwidth.

Alternatively, the UE can choose the least aggressive one, e.g., narrowest beamwidth, min power, in the feasibility region. This can be ok for the calls with lower priority. For the retransmissions, the UE can power up or perform power ramping, or widen the beamwidth.

In certain embodiments of the present disclosure, all the above embodiments can be extended to the number of beams of the UE, in replacement of the beamwidth, or antenna gain.

For example, there can be a set of supportable number of beams of the UE, e.g., a set: {1, 2, 4, 6, 8}, which means the UE can have 1, 2, 4, 6, 8 beams. For each number of beams, there can be corresponding beamwidth, or antenna (array) gain, as shown in the following table:

TABLE 17

| Number of beams | Beamwidth | Antenna gain |
| --- | --- | --- |
| 1 | Azimuth: 360° | AG1 |
|   | Elevation: 180° |   |
| 2 | Azimuth: 180° | AG2 |
|   | Elevation: 180° |   |
| 4 | Azimuth: 180° | AG3 |
|   | Elevation: 90° |   |
| 6 | Azimuth: 120° | AG4 |
|   | Elevation: 90° |   |
| 8 | Azimuth: 90° | AG5 |
|   | Elevation: 90° |   |

In certain embodiments, a BS broadcasts the physical random access channel (PRACH) resources (e.g., a timing, a frequency, or a beam) for the UE containing information about (but not limited to): RX beams on which the BS will be listening at which times (e.g., identified by frame, subframe, slots, or symbols); at which frequency (e.g., which band, sub-band, or subcarriers); and other information such as a PRACH channel configuration, instructing the preambles (or preamable range) that the UE can use a transmit power, and a UE TX antenna gain or a UE TX beam width.

In certain embodiments, the RACH configuration sent by the BS can include (but is not limited to) whether the BS has TX/RX beam calibration for the RACH process, and the method that the UE should use for feeding back the preferred DL beams (multiple methods each indicated by a specific indicator can be used).

Figure 15:
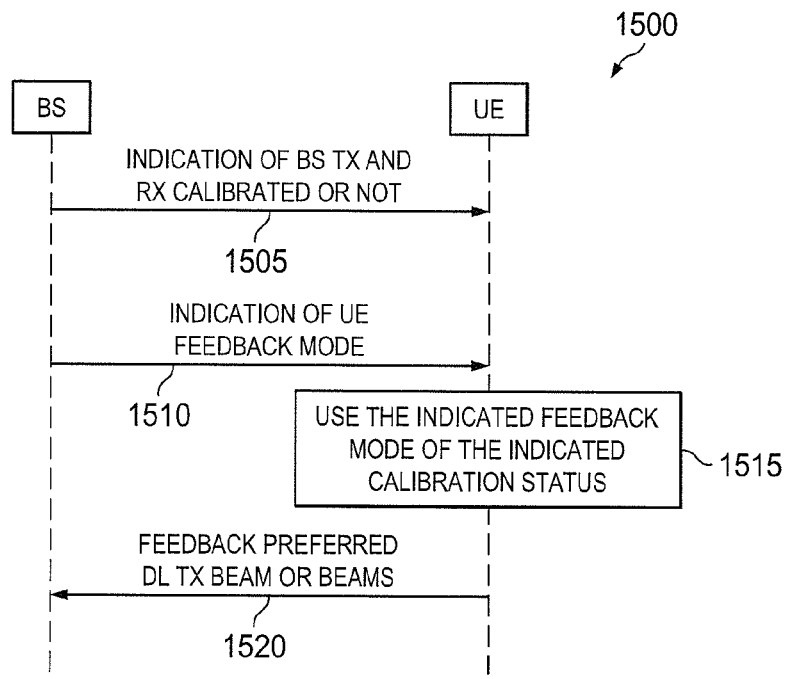
FIG. 15 illustrates a process for calibration status indication and feedback mode indication according to embodiments of the present disclosure.

FIG. 15 is a flowchart 1500 of calibration status indication and feedback mode indication according to embodiments of the present disclosure. The embodiments of the procedure 1500 for calibration status indication and feedback mode indication are for illustration only. Other embodiments of a procedure for calibration status indication and feedback mode indication could be used without departing from the scope of this disclosure.

In the embodiment, the BS transmits 1505, 1510 two separate messages for calibration indication and feedback mode to the UE. For instance, the message could be one since there is no reason to break a message in to two especially if there is no intermediate message in the other direction. Then the UE uses 1515 the indicated feedback mode of the indicated calibration status and feeds back 1520 using the preferred DL TX beam or beams.

The following TABLE 18 shows an example of the signaling for the calibration status indication and the feedback mode indication. The UE should use the indicated method to feedback.

TABLE 18

| Information field | Length | Usage |
| --- | --- | --- |
| TX and RX beam calibration indicator | 1 bit | 0: calibrated<br>1: not calibrated |
| If calibrated: {<br>Indication of mode on how the UE should feedback its | 3 bits | Denote the first subset as A, being the set of UE's preferred DL TX beam fed back using the payload of PRACH (including partitioning the |

TABLE 18-continued

| Information field | Length | Usage |
|---|---|---|
| preferred DL beam when UE sends preamble on PRACH | | preambles, additional bits, and the like) Denote the second subset as B, being the set of UE's preferred DL beam fed back implicitly, not consuming the payload of PRACH. 000: A is not used, only use B. One preferred DL TX beam 001: A is not used, only use B. Multiple preferred DL TX beams 010: Only use A, B is not used. 011: A and B both used. A and B the same (duplication). Error detection possible. 100: A and B both used. A and B can be different. The union of A and B is the whole set of UE preferred DL TX beams. 101: A and B both used. A overrule B. 110-111: reserved. |
| } If not calibrated: { Feedback mode } | 1 bit | 0: feedback using the payload of PRACH 1: reserved |

As an alternative, the BS indicates whether the BS has TX and RX beam calibration, e.g., for the RACH procedure wherein a predefined method is used, and the above method for the calibrated case and non-calibrated case can be the same or different.

TABLE 19

| Information field | Length | Usage |
|---|---|---|
| Indication of whether the BS has TX and RX beam calibration | 1 bit | 0: calibrated 1: not calibrated |

As an another alternative, the BS indicates whether the BS has TX and RX beam calibration, e.g., for the RACH procedure wherein a predefined method is used, and the above method for the calibrated case and non-calibrated case can be the same or different further characterized in that a message can be sent from the BS to the UE after the initial RACH, the said message including a reconfiguration feedback method to be used by the UE in the remaining part of the RACH procedure.

Figure 16:
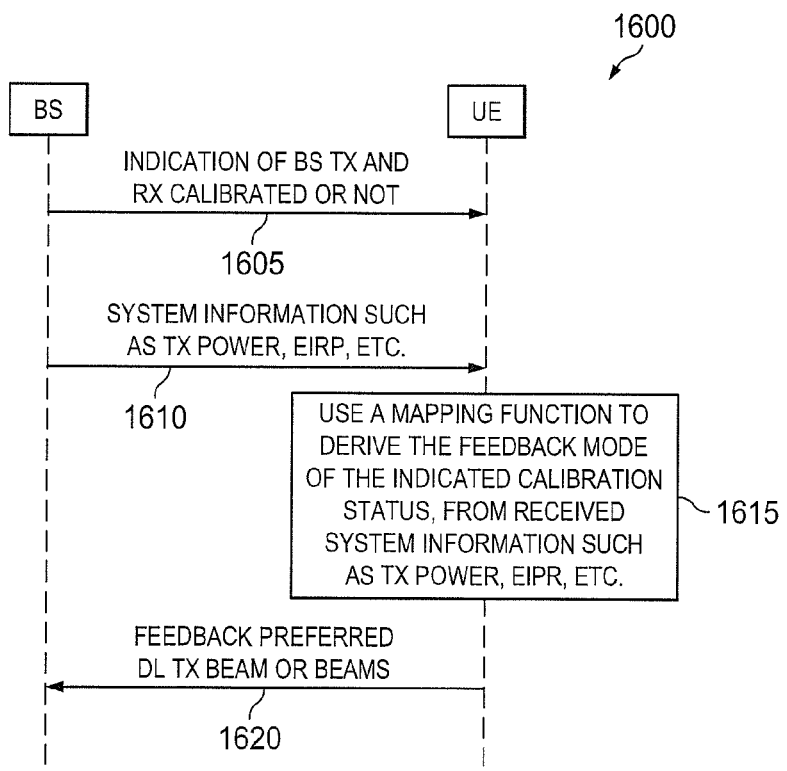
FIG. 16 illustrates another flowchart of calibration status indication and feedback mode indication according to embodiments of the present disclosure.

FIG. 16 illustrates a process 1600 for calibration status indication and feedback mode indication according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain and a receiver chain in, for example, a mobile station.

In the embodiment, the BS indicates 1605 whether the BS has TX and RX beam calibration for the RACH procedure, for instance. The BS can also send 1610 the system information to the UEs containing, e.g., BS-type, the BS TX power, EIRP (effective isotropic radiation power) and the like. A mapping function from the system information to the method that the UE should use for the feedback in random access procedure can be defined. The mapping function can be the same or different for the case that BS's RX and TX beams are calibrated and the non-calibrated case. The UE and the BS use the same mapping function.

Once receiving the system information, the UE can use 1615 the mapping function to derive the mode or method that it should use for the feedback in random access procedure. For example, if the system information from the BS indicates that the BS has a TX power or EIRP greater than a threshold, or in certain range, or BS indicates that it belongs a type of larger sized BS, the UE should use the method where multiple preferred DL TX beams should be reported, because the BS can have a larger size. If the system information from the BS indicates that the BS has a TX power or EIRP lower than a threshold, or in certain range, or the BS indicates that it belongs to a type of smaller sized BS, the UE should use the method where one preferred DL TX beams should be reported, because the BS can have a smaller size, and the UE with lower mobility would select such cell. Then, the UE feeds back 1620 the preferred DL TX beam(s).

In certain embodiments, the BS can reconfigure the RACH procedure from a calibrated mode to a non-calibrated mode or from a non-calibrated mode to a calibrated mode wherein the said reconfiguration is notified to the UEs prior to the time that the reconfiguration is effective.

Figures 17, 18:
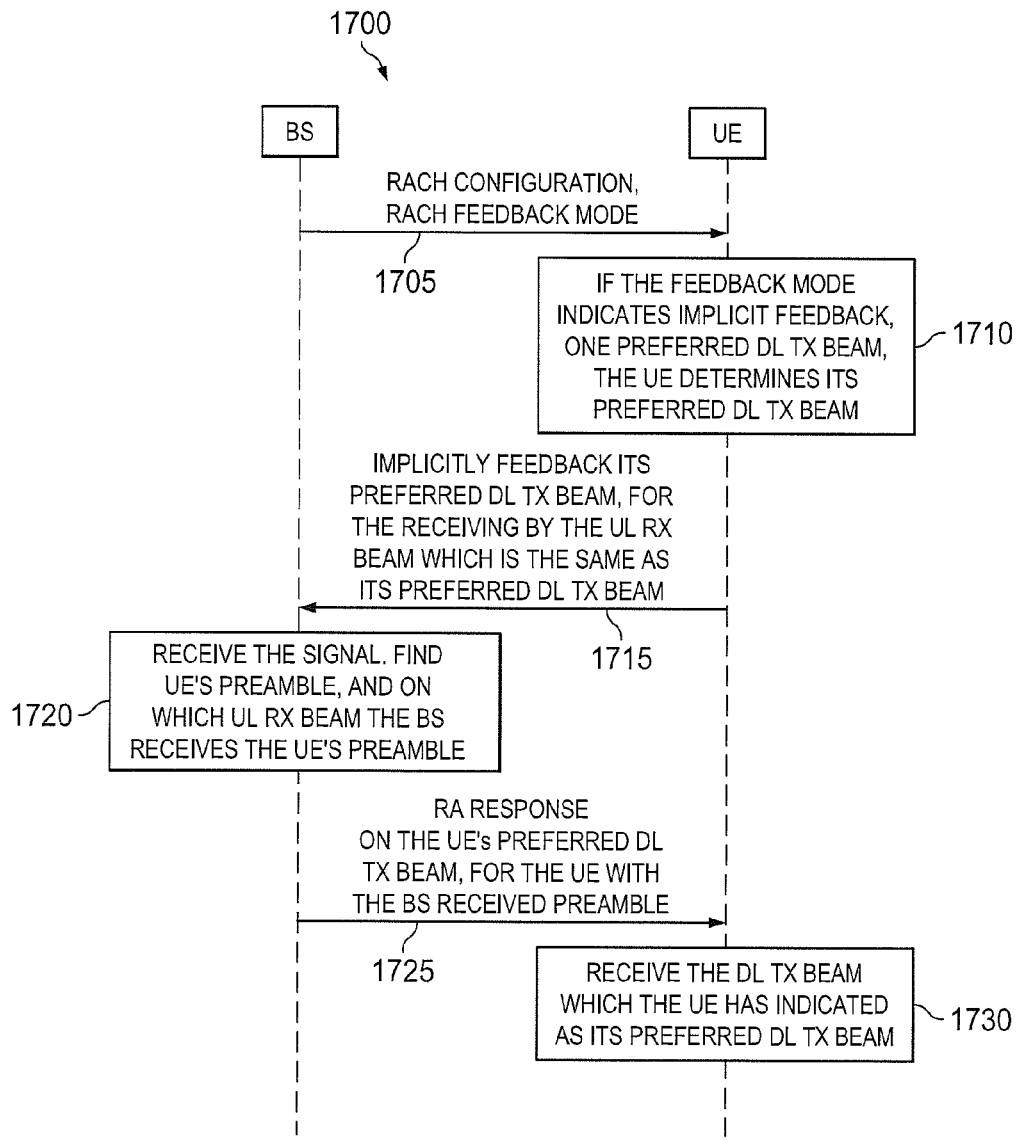
FIG. 17 illustrates an implicit feedback procedure according to embodiments of the present disclosure.
FIG. 18 illustrates an overall operation procedure for the implicit feedback procedure according to embodiments of the present disclosure.
Figure 18B:
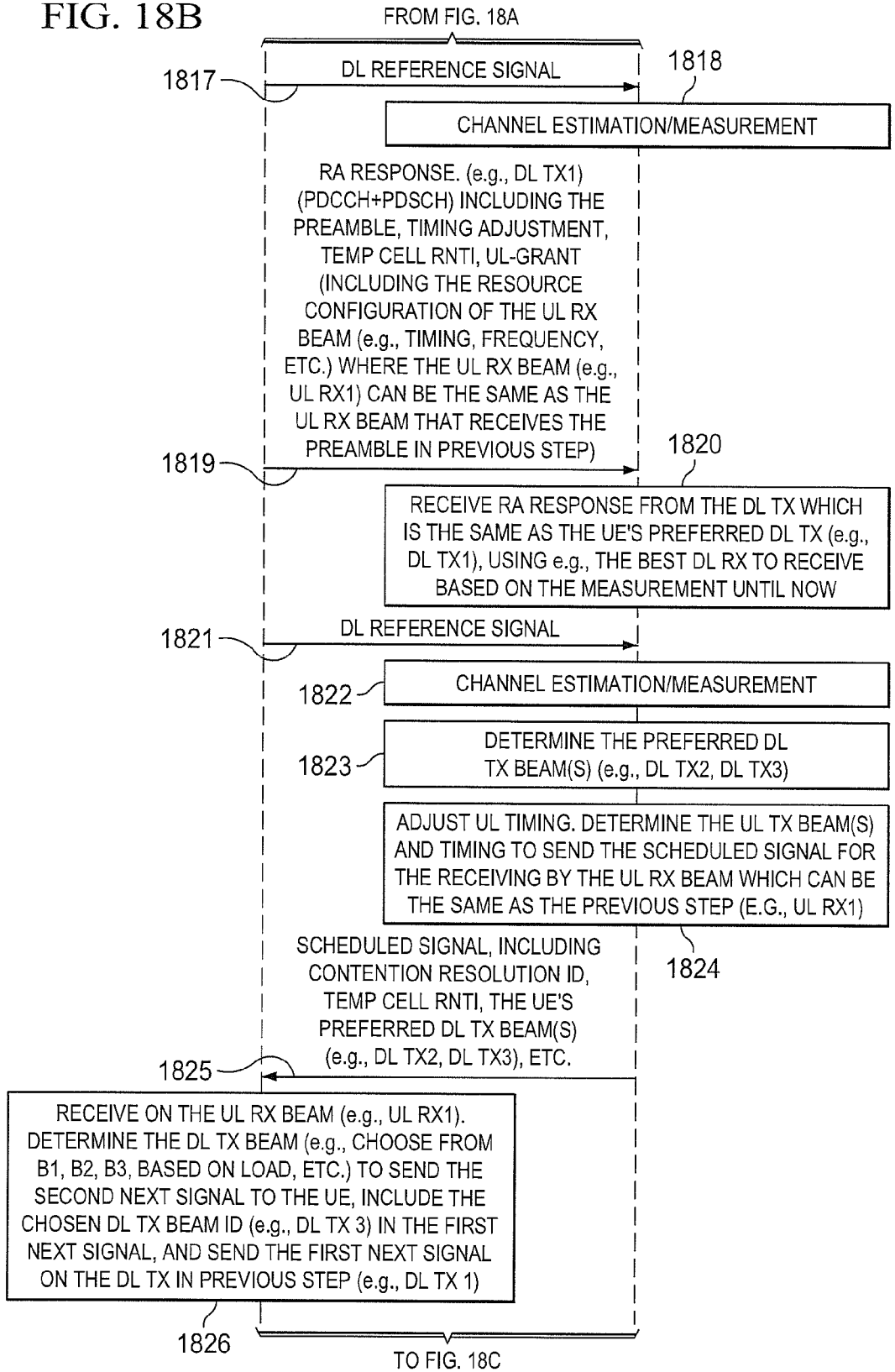
Figure 18C:
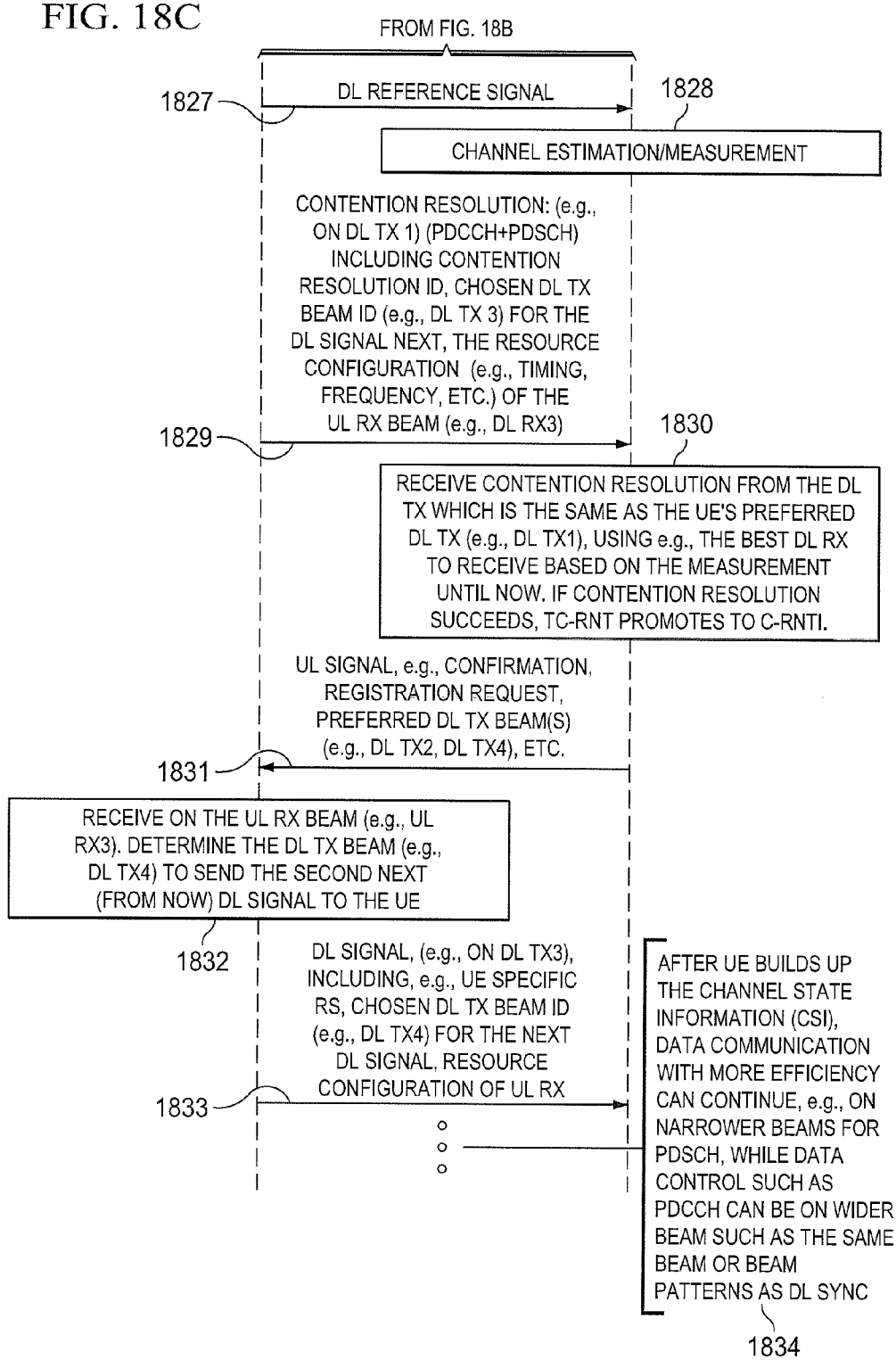

FIG. 17 illustrates an implicit feedback procedure 1700 where a UE feeds back a DL Beam implicitly, not consuming payload according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain or a receiver chain in, for example, a mobile station.

In the embodiments, the following procedure can be used by the UE in the case of implicit feedback of one preferred DL beam.

In step (i), For a BS with calibrated TX and RX beams, the UE can feed back 1715 a first set of its one preferred DL TX beam implicitly by sending the random access signal on physical random access channel (PRACH) at a resource (e.g., timing, frequency, beam, and the like) for being receiving by a BS RX beam which is the same as, i.e., being matched with the UE's preferred DL TX beam. Once the BS receives 1720 the signal from PRACH on its UL RX beams, the BS should regard the said UL RX beam as the DL TX beam that the UE prefers for the first next DL transmission (e.g., the random access response) to the UE.

In step (ii), the BS can then send 1725 the first next DL transmission or signal (e.g., the random access response) to the UE, using the UE's preferred DL TX beam. The first next DL transmission signal can include the information on the UL RX beam which receives the UE's PRACH signal will be receiving at which time (e.g., identified by which frame, subframe, slots, or symbols, and the like), at which frequency (e.g., which band, subband, subcarriers, and the like) from the UE. It is noted that in step ii, there can be multiple UEs who happen to use the same preamble in the signal on PRACH. To resolve it, the following steps (iii)-(iv) are used for contention resolution.

In step (iii), the UE receives the first next DL signal (e.g., the random access response) from the said preferred DL TX beam of the BS. The UE can then send the UL scheduled signal to be received by the BS at the UL RX beam as scheduled by the BS. The scheduled signal from the UE can include a second set of one or multiple of its preferred DL TX beams.

In step (iv), The BS receives the UE's scheduled signal using the UL RX beam which receives the UE's PRACH signal. The BS also determine the DL TX beam (e.g., choose from the received UE's preferred DL TX beams sent in the UL scheduled signal, based on load, and the like) to send the third next signal (e.g., the signal to the UE after the UE has succeeded the contention resolution) to the UE, including the chosen DL TX beam ID in the second next signal (e.g., the signal for contention resolution), and send the second next signal (e.g., the signal for contention resolution) using the DL TX beam which is the same as the one for the first next DL transmission (e.g., the random access response).

In step (v), the UE receives the second next DL signal (e.g., the contention resolution) from the DL TX beam which is the same as the one for the first next DL transmission (e.g., the random access response). If the UE passes the contention resolution, the UE gets its C-RNTI. The UE can send the follow up UL signal, such as confirmation or UL grant request, for the BS to receive at the UL RX beam which is the same as the DL TX beam for the said third next signal, or which is the same as the determined DL TX beam indicated in the second next DL signal. The UE can include a third set of one or multiple of its preferred DL TX beams or the good DL TX beams in the follow up UL signal.

In step (vi), the BS receives at the UL RX beam which is the same as the DL TX beam for the said third next signal, or which is the determined DL TX beam indicated in the second next DL signal. The BS sends the said third next DL signal (e.g., the signal to the UE after the UE has succeeded the contention resolution) to the UE). The third next DL signal can include the fourth next DL signal's DL TX beam. The communication can continue using the similar method of preferred DL TX beam indication as above steps (iii)-(iv), or (v)-(vi).

FIG. 18 illustrates an overall operation procedure for the implicit feedback procedure according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain or a receiver chain in, for example, a mobile station.

In the embodiments, the BS TX and RX are calibrated by the following: the UE feeds back one preferred DL TX beam implicitly by sending the signal on PRACH at the timing for being received by the BS RX beam which is the same as the UE preferred DL TX beam.

In step 1801, base station (BS) sends DL synchronization channel (Sync). The UE can monitor and decode the DL sync channel during initial network entry, network re-entry (e.g. from idle mode or recovery from link failure), or while monitoring neighboring cells, and the like. Once the UE decodes the DL sync (which can be transmitted in one part or two parts (primary and secondary sync signal), the UE can know the DL beam identifiers, DL timing, for frames and subframes, and the like, cell identifier of the BS. The resource allocation for the reference signal, e.g., the cell specific reference signal (CRS), can be predefined or pre-configured, or can be derived using the information that the UE acquires so far. By this time, the UE can also know when and where to get the cell specific reference signal (CRS).

In step 1802, the DL reference signal is transmitted (examples can be using sequence, such as the cell ID, or cell ID and the beam identifier together) enabling the UE to measure or estimate the channel.

In step 1803, the UE performs channel estimation and measurement on the DL TX beams using UE's receive beams. The channel estimation can be used for decoding the information carried over the beams. The channel estimation and measurement can be for pairs of the DL TX and DL RX beams or beam patterns.

In step 1804, the BS sends master information block (MIB), via PBCH (physical broadcast channel). The MIB channel can be transmitted on the same beam patterns as the DL sync channel.

In step 1805, the UE receives DL beams, to decode the MIB. Since the MIB can be broadcasted to all the UEs, the UE can use, such as, the best DL RX beam based on the measurement so far to receive the good MIB beams and decode.

In steps 1806 and 1807, the UE can perform further channel estimation and measurement, based on the DL reference signal.

In step 1808, the UE will monitor and acquire system information blocks (SIB). The system information can be on the PDSCH. Since the UE can have already known some channel measurement information, the UE can choose to use the good RX beams to receive the DL beams carrying SIB, or use the good RX beams in the good pairs of DL TX and RX beams to get the DL beams. The UE can first monitor the DL control region, i.e., PDCCH. If there is some other channel, such as a physical channel, telling about the configuration of the PDCCH, (denote such DL physical channel as PSBCH (physical secondary broadcast channel. It can be denoted as other names, such as PCFICH (physical control format indicator channel), the UE can first acquire PSBCH, typically at the beginning of subframe or slot. The PSBCH can tell where the PDCCH is located, and for which DL beams in this subframe or slot. The resource allocation of SIB can be indicated by the PDCCH marked with a reserved RNTI (radio network temporary identifier) or scrambling code, e.g., SI-RNTI, the RNTI for the system information.

In step 1809, the RACH (random access channel) configuration can be included as part of or one of system information blocks (SIBs). The RACH configuration can include UL RX beam resource configuration, such as the timing, frequency allocation for the UL RX beams; PRACH parameters (channel configuration, preamble format); access parameters (access probability, access barring); power parameters (initial target power, power ramp step, max number of attempts), preamble parameters (root sequence index, cyclic shift, number of sequences), contention resolution timer, and the like.

In step 1810, the UE can receive the DL signal of SIBs, including the RACH configuration. The UE can, for example, use the best DL RX beam to receive the signal based on the current measurement so far, or use one or multiple of the good DL RX beams of the good pairs of DL TX and RX beams, to receive the signal. The UE acquires PSBCH, to get the PDCCH configuration, then monitors the PDCCH marked with SI-RNTI, to get the location of SIB(s) on PDSCH, and the UE decodes SIB(s).

In steps 1811-1812, the UE can perform further channel estimation and measurement, based on the DL reference signal.

In step 1813, the UE can determine the preferred DL TX beam, (e.g., the UE determines the preferred DL TX beam as DL TX1.

In step 1814, the UE can determine the UL TX beam(s) and timing to send the signal on PRACH, for the receiving by the UL RX beam which can be the same as the UE's preferred DL TX (e.g., UL RX1, which is the same as DL TX1). The UE can use the configuration received in Step 1810, for the timing and resource for the BS to use UL RX 1.

In step 1815, the UE can send signal on PRACH. It can include the preamble. The UE can also determine the random access radio network temporary ID (RA-RNTI) which can be a function of the PRACH resource that the UE uses. The UE determines the preamble power level and sends the signal at such power level. The UE can also determine the UL TX beamwidth or antenna (array) gain, so that the UL link budget can achieve certain level for required UL service quality level.

In step 1816, the BS can receive on the UL RX beam (e.g., UL RX1). The BS can determine the DL TX beam to send the random access (RA) response to the UE, where the DL TX beam which is the same as the UL RX beam that receives the UE's signal (e.g., DL TX1).

In steps 1817-1818, the UE can perform further channel estimation and measurement, based on the DL reference signal.

In step 1819, the BS sends RA response, using the DL beam which is the same as the UL RX beam that receives the UE's signal, such as, using DL TX1. The BS uses RA-RNTI which can be a function of the PRACH resource, to mark the PDCCH for the RA response. The RA response can include PDCCH which addresses to a group of UEs with the RA-RNTI, and PDSCH which carries MAC random access response, backoff indicator or RA preamble identifier, timing adjustment, UL grant (hopping indicator, resource block assignment, coding and modulation, transmit power control, UL delay, CQI request), temp Cell RNTI (C-RNTI), and the like.

In step 1820, the UE receives RA response from the DL TX which is the same as the UE's preferred DL TX (e.g., DL TX1), using, for example, the best DL RX to receive based on the measurement so far. The UE will monitor the PDCCH marked with RA-RNTI that the UE determines in step 1815. The UE can compare the received preamble with its preamble sent in step 1715.

In steps 1821-1822, the UE can perform further channel estimation and measurement, based on the DL reference signal.

In step 1823, the UE determines the preferred DL TX beams, which can be one or multiple beams. For example, the UE can determine e.g., DL TX2, DL TX3 as its preferred DL TX beams.

In step 1824, the UE can adjust UL timing based on the timing advance. The UE can determine the UL TX beam(s) and timing and resource to send the scheduled signal for the receiving by the UL RX beam which can be the same as the previous Step 1816, and the DL TX beam as in Step 1819.

In step 1825, the UE sends the scheduled signal on UL, using the UL grant, including contention resolution ID, Temp Cell RNTI (TC-RNTI), and the UE's preferred DL TX beams (e.g., DL TX1, DL TX3), and the like.

In step 1826, the BS can receive on the UL RX beam, using the same UL RX beam (e.g., UL RX1) as the DL TX beam in previous step (e.g., step 1819). The BS can determine the DL TX beam (e.g., choose from B1, B2, B3, based on load, and the like) to send the second next signal to the UE from now, include the chosen DL TX beam ID (e.g., DL TX 3) in the first next signal, and send the first next signal on the DL TX in previous step (e.g., DL TX 1).

In steps 1827-1828, the UE can perform further channel estimation and measurement, based on the DL reference signal.

In steps 1829, the BS sends signal for contention resolution, where the signal can be on the previously used DL TX beam, e.g., on DL TX 1. The signal can be sent on both PDCCH and PDSCH. The PDCCH is marked by the temp cell RNTI (TC-RNTI) sent by the UE in step 1825. The signal can include contention resolution ID, chosen DL TX beam ID (e.g., DL TX 3) for the DL signal next, the resource configuration (e.g., timing, frequency and the like) of the UL RX beam (e.g., DL RX3).

In step 1830, the UE receives contention resolution from the DL TX which is the same as the UE's preferred DL TX (e.g., DL TX1), using e.g., the best DL RX to receive based on the measurement so far. If contention resolution succeeds, TC-RNT promotes to C-RNTI.

In step 1831, the UE sends UL signal following up the communication. The UL signal can be, e.g., confirmation, registration request, preferred DL TX beam(s) (e.g., DL TX2, DL TX4), and the like.

In step 1832, the BS receives on the UL RX beam (e.g., UL RX3) which is the same as the DL TX beam that is indicated in previous DL signal, e.g., in step 1829. The BS can determine the DL TX beam (e.g., DL TX4) to send second next (from now) DL signal to the UE.

In Step 1833, the BS sends DL signal on DL TX beam, (e.g., on DL TX3), which is the same as the DL TX beam that is indicated in previous DL signal, e.g., in step 1829. The DL signal can be sent by PDCCH and PDSCH. The PDCCH can be marked by the UE's C-RNTI. The DL signal can include, e.g., UE specific RS such as channel state indicator reference signal (CSI-RS), demodulation reference signal (DMRS), chosen DL TX beam ID (e.g., DL TX4) for the next DL signal, resource configuration of UL RX.

Then the UE can receive the signal from DL TX beam, (e.g., on DL TX3), which is the same as the DL TX beam that is indicated in previous DL signal, e.g., in step 1829.

The method for the UE to indicate the UE preferred DL beams in the UL signal, for the BS to indicate the chosen DL beam for the second next DL transmission to the UE, in the first next DL transmission to the UE using UE's previously notified DL beam, so the UE can receive the first next DL transmission, can be repeatedly used for data communication.

After UE builds up the channel state information (CSI) e.g., by measuring the CSI-RS, data communication with more efficiency can continue, e.g., on narrower beams for PDSCH, while data control such as PDCCH can be on wider beam such as the same beam or beam patterns as DL sync.

Some of the above steps can be omitted or repeated. For example, some of the channel measurement can be omitted or repeated.

Figure 19:
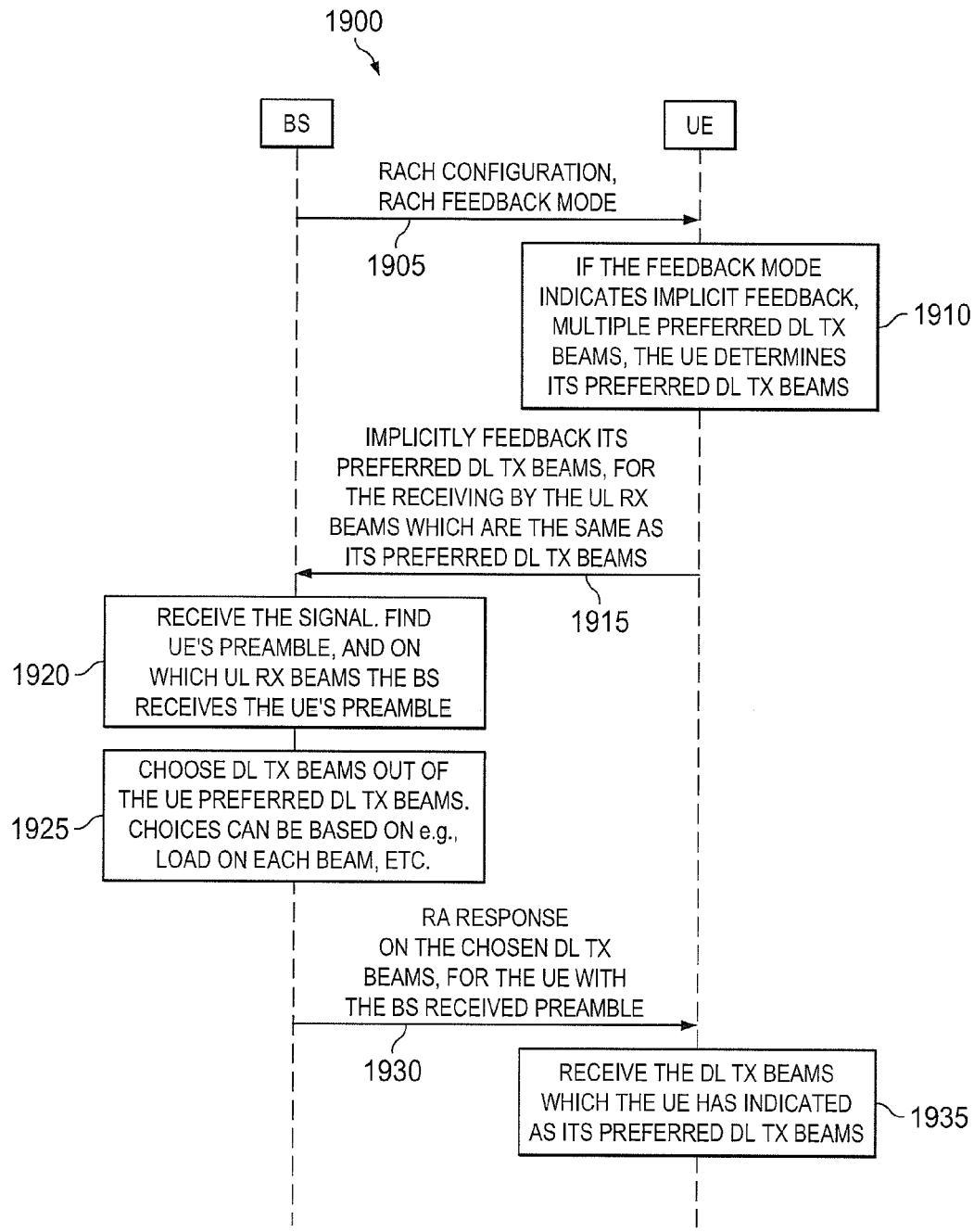
FIG. 19 illustrates an implicit-multiple UE's preferred DL beams feedback procedure according to embodiments of the present disclosure.

FIG. 19 illustrates a implicit-multiple preferred DL beams feedback procedure 1800 where the UE feeds back its preferred DL beams implicitly, not consuming payload, and feeds back multiple preferred DL beams, according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In the embodiments, the following procedure can be used for implicit feedback of the UE's multiple preferred DL beams in an implicit manner.

In step (i), when BS has its TX and RX beams calibrated 1905, e.g., the TX beams or beam patterns are the same as the RX beams or beam patterns, UE can feed back 1920 a first set of its one or multiple preferred DL TX beams, implicitly by sending the random access signal on physical random access channel (PRACH) at a resource (e.g., timing, frequency, beam, and the like) for being receiving by BS RX beam which is the same as the UE preferred DL TX beam. If there are multiple of preferred DL TX beams, the UE can also send the random access signal multiple instances for being receiving by multiple of the BS RX beams which can be within the first set of the UE's preferred DL TX beams.

In step (ii), once the BS receives 1920 the signal from PRACH on its one or multiple UL RX beams, the BS should regard the UL RX beams which receive a UE's PRACH signal, as the DL TX beams that the UE prefers for the first next DL transmission (e.g., the random access response) to the UE.

If there are multiple of such DL TX beams, the BS can choose 1925 some or all of these multiple DL TX beams that the UE prefers. The BS can then send 1930 the first next DL transmission or signal (e.g., the random access response) to the UE, using the BS chosen DL TX beams out of the UE preferred DL TX beams, which are the UL RX beams that the BS receives the UE's PRACH signal.

Alternatively, the BS can also choose some or all of these multiple DL TX beams that the UE prefers as the UL RX beams to receive the next scheduled information or scheduled signal from the UE. The chosen DL TX beam(s) and the chosen UL RX beam(s) can be same or different. The first next DL transmission signal can include the information on the BS chosen UL RX beams out of the UL RX beams which receive the UE's PRACH signal will be receiving at which time (e.g., identified by which frame, subframe, slots, or symbols, and the like), at which frequency (e.g., which band, subband, subcarriers, and the like) from the UE.

The BS can also choose one or multiple of the DL TX beams for a second next DL transmission or signal (e.g., the contention resolution). The first next DL signal can include the information (e.g., the beam ID) of the BS chosen DL TX beam or beams for the second next DL signal.

In step (iii), since UE does not know which one or multiple of its preferred DL TX beams that the BS would choose, the UE receives 1935 the first next DL signal (e.g., the random access response) from the said its preferred DL TX beams of the BS. For example, the UE can start receiving the signal from its preferred DL TX beams one after another, until it gets a signal, the UE does not need to continue on receiving the signal from the remaining its preferred DL TX beams.

The UE can then send the UL scheduled signal to the BS for the BS to receive at the UL RX beam or beams as the BS chooses. The scheduled signal from the UE can include a second set of one or multiple of its preferred DL TX beams or the good DL TX beams. If the second set of UE's preferred DL TX beams are not present, it means UE still prefers the DL TX beams in the first set.

In step (iv), the BS receives the UE's scheduled signal using its chosen UL RX beam or beams as chosen in step (ii). The BS also determine the DL TX beam or beams (e.g., choose from the received UE's preferred DL TX beams sent in the UL scheduled signal, based on load, and the like) to send the third next signal (e.g., the signal to the UE after the UE has succeeded the contention resolution) to the UE. The IDs of the chosen DL TX beams for the third next DL signal can be included in the second next signal (e.g., the signal for contention resolution). The BS sends the second next signal (e.g., the signal for contention resolution) using its chosen DL TX beam or beams which is chosen in step (ii) and notified to the UE.

The BS can also choose some or all of these multiple DL TX beams that the UE prefers in the most recent set of preferred DL TX beams by the UE (e.g., the second set of one or multiple of its preferred DL TX beams) as the UL RX beams to receive the next scheduled information or scheduled signal from the UE. The chosen DL TX beam(s) and the chosen UL RX beam(s) can be same or different. The second next DL transmission signal can include the information on the BS chosen UL RX beams out of the UL RX beams (e.g., the same as the beams in the second set of the UE's preferred DL TX beams) will be receiving at which time (e.g., identified by which frame, subframe, slots, or symbols, and the like), at which frequency (e.g., which band, subband, subcarriers and the like) from the UE.

In step (v), the UE receives the second next DL signal (e.g., the contention resolution) from the DL TX beam or beams which are indicated by the UE received the first next DL transmission (e.g., the random access response) as in step (iii).

If the UE passes the contention resolution, the UE gets its C-RNTI. The UE can send the follow up UL signal, such as confirmation, UL grant request, and the like, for the BS to receive at the UL RX beam or beams chosen by the BS in step (iv). The UE can include a third set of one or multiple of its preferred DL TX beams or the good DL TX beams in the follow up UL signal.

In step (vi), the BS receives at the UL RX beam or beams chosen by the BS in step (iv). BS sends the said third next DL signal (e.g., the signal to the UE after the UE has succeeded the contention resolution) to the UE). The third next DL signal can include the fourth next DL signal's DL TX beam, as well as the UL grant or UL scheduling for the UE to send the following UL signal.

For the embodiments associated with FIG. 17, steps (4)-(6) can be extended to the multiple DL TX beams case, such as to the steps (iv)-(vi) in embodiment associated with FIG. 19.

Figure 20:
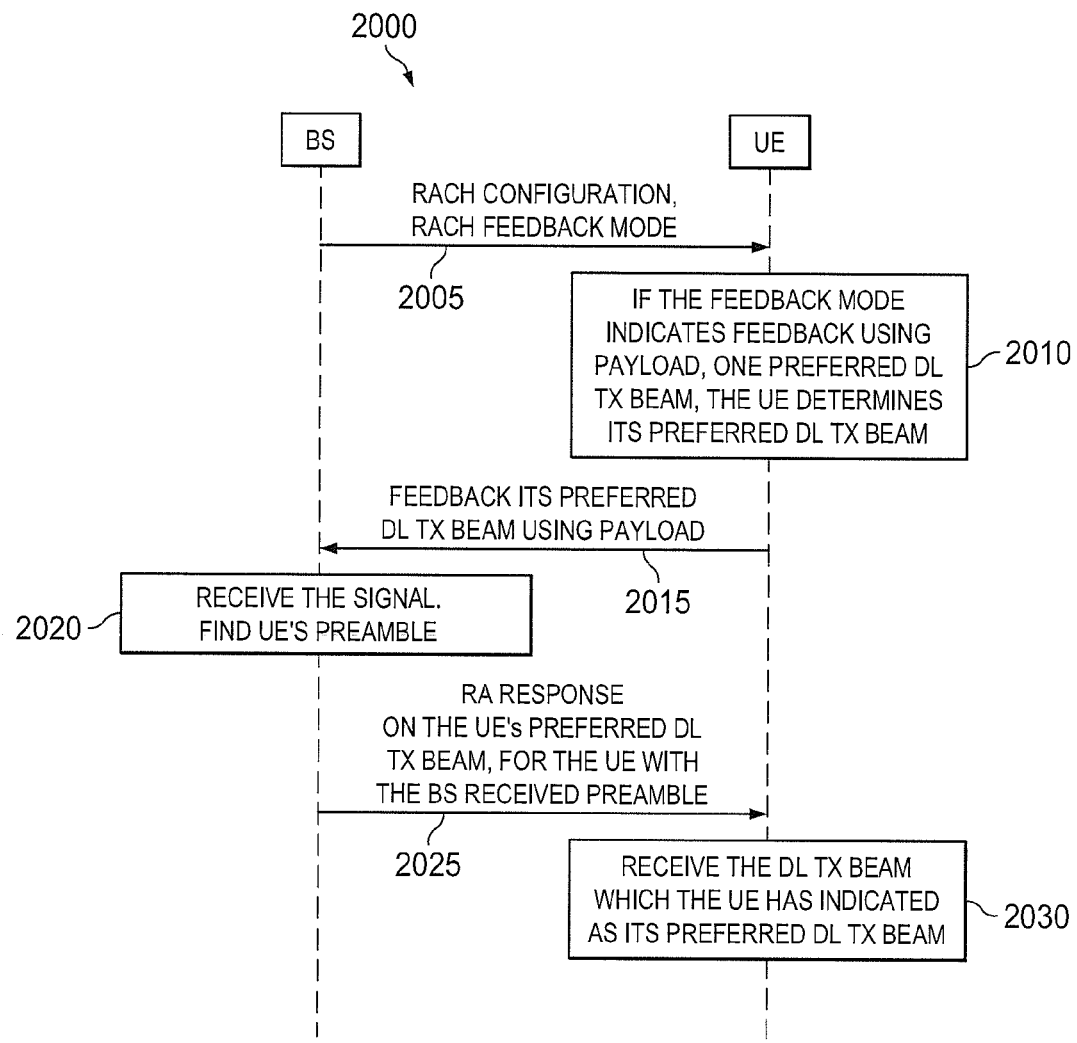
FIG. 20 illustrates an explicit feedback procedure according to embodiments of the present disclosure.

FIG. 20 illustrate an explicit feedback procedure 2000 where a UE feeds back its preferred DL beams explicitly, consuming payload, and feeds back one preferred DL beam, according to the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In certain embodiments, the following procedure can be used for the case that the UE feeds back its preferred DL beams explicitly, consuming payload, and feeds back one preferred DL beam.

As an alternative of the step (i) of the above embodiment associated with FIG. 17, when a BS has its TX and RX beams calibrated 2005, e.g., the TX beams or beam patterns are the same as the RX beams or beam patterns, the UE can feed back 2015 a first set of its one preferred DL TX beam, explicitly by sending the random access signal (including preamble for the random access) on physical random access channel (PRACH) at a resource (e.g., timing, frequency, beam, and the like).

For the explicit feedback of the UE's preferred DL TX beam, the method can be, e.g., the UE's preferred DL TX beam identifier (ID) can be part of the preamble (e.g., first a few bits, or last a few bits, and the like), or can be separate of the preamble, or can be concatenated with the preamble.

As an alternative of the step (ii) of the above embodiment associated with FIG. 17, once the BS receives 2020 the signal from PRACH on its UL RX beams, the BS should regard the UL RX beam which is explicitly indicated in the received signal on PRACH as the DL TX beam that the UE prefers for the first next DL transmission (e.g., the random access response) to the UE.

The BS can then send 2025 the first next DL transmission or signal (e.g., the random access response) to the UE, using the UE preferred DL TX beam, which is the UL RX beam that the BS receives the UE's PRACH signal. The first next DL transmission signal can include the information on the UL RX beam which receives the UE's PRACH signal will be receiving at which time (e.g., identified by which frame, subframe, slots, or symbols, and the like), at which frequency (e.g., which band, subband, subcarriers and the like) from the UE.

Figure 21:
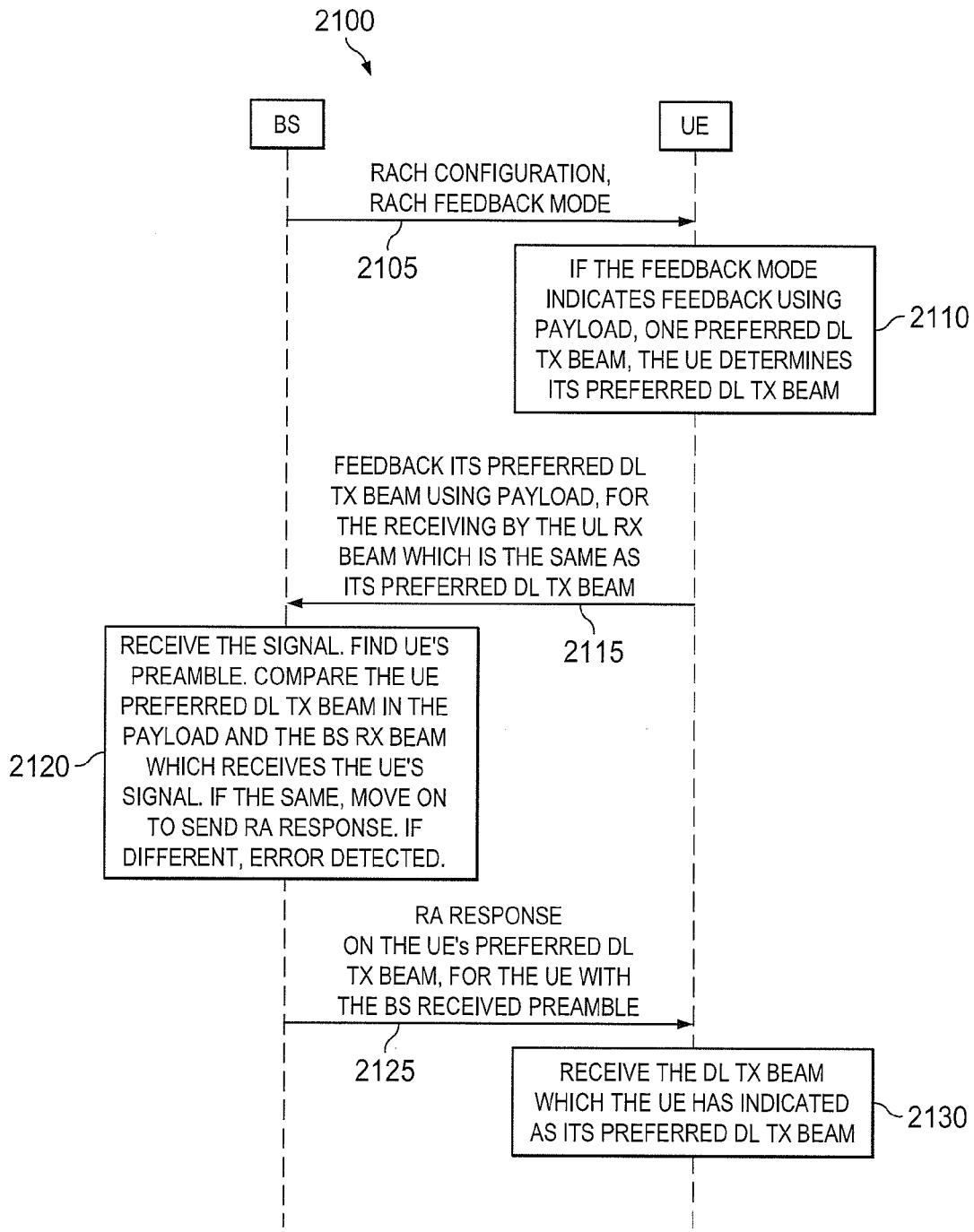
FIG. 21 illustrates an explicit-implicit feedback procedure according to embodiments of the present disclosure.

FIG. 21 illustrate an explicit-implicit feedback procedure 2100 where a UE feeds back its preferred DL beams explicitly, consuming payload, and feeds back one preferred DL beam according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In certain embodiments, the following method can be used for the case that the UE feeds back its preferred DL beams explicitly and implicitly, consuming payload, and feeds back one preferred DL beam, with error detection capability.

As an alternative of the step (i) in the above embodiments associated with FIG. 17, when base station (BS) has its TX and RX beams calibrated, e.g., the TX beams or beam patterns are the same as the RX beams or beam patterns, UE can feed back 2115 a first set of its one preferred DL TX beam, explicitly by sending the random access signal (including preamble for the random access) on physical random access channel (PRACH) at a resource (e.g., timing, frequency, beam, and the like) for the receiving by BS RX beam which can be the same as the first set of UE preferred DL TX beam.

For the explicit feedback of the UE's preferred DL TX beam, the method can be, e.g., the UE's preferred DL TX beam identifier (ID) can be part of the preamble (e.g., first a few bits, or last a few bits, and the like), or can be separate of the preamble, or can be concatenated with the preamble.

As an alternative of the step (ii) in the above embodiments associated with FIG. 17, once the BS receives 2120 the signal from PRACH on its UL RX beams, the BS should compare the UE's preferred DL TX beam ID in the signal from PRACH with the identifier of the BS RX beam which receives the UE's signal on PRACH.

If they are the different, the BS should disregard the PRACH signal, because there can be some error in decoding. This provides some error detection.

If they are the same, the BS should regard the UL RX beam which receives the UE's PRACH signal which is the same as the UE's preferred DLTX beam as indicated in the received signal on PRACH from the UE (with the received preamble), as the DL TX beam that the UE prefers for the first next DL transmission (e.g., the random access response) to the UE.

The BS can then send 2125 the first next DL transmission or signal (e.g., the random access response) to the UE, using the UE preferred DL TX beam, which is the UL RX beam that the BS receives the UE's PRACH signal. The first next DL transmission signal can include the information on the UL RX beam which receives the UE's PRACH signal will be receiving at which time (e.g., identified by which frame, subframe, slots, or symbols, and the like), at which frequency (e.g., which band, subband, subcarriers and the like) from the UE.

Figure 22:
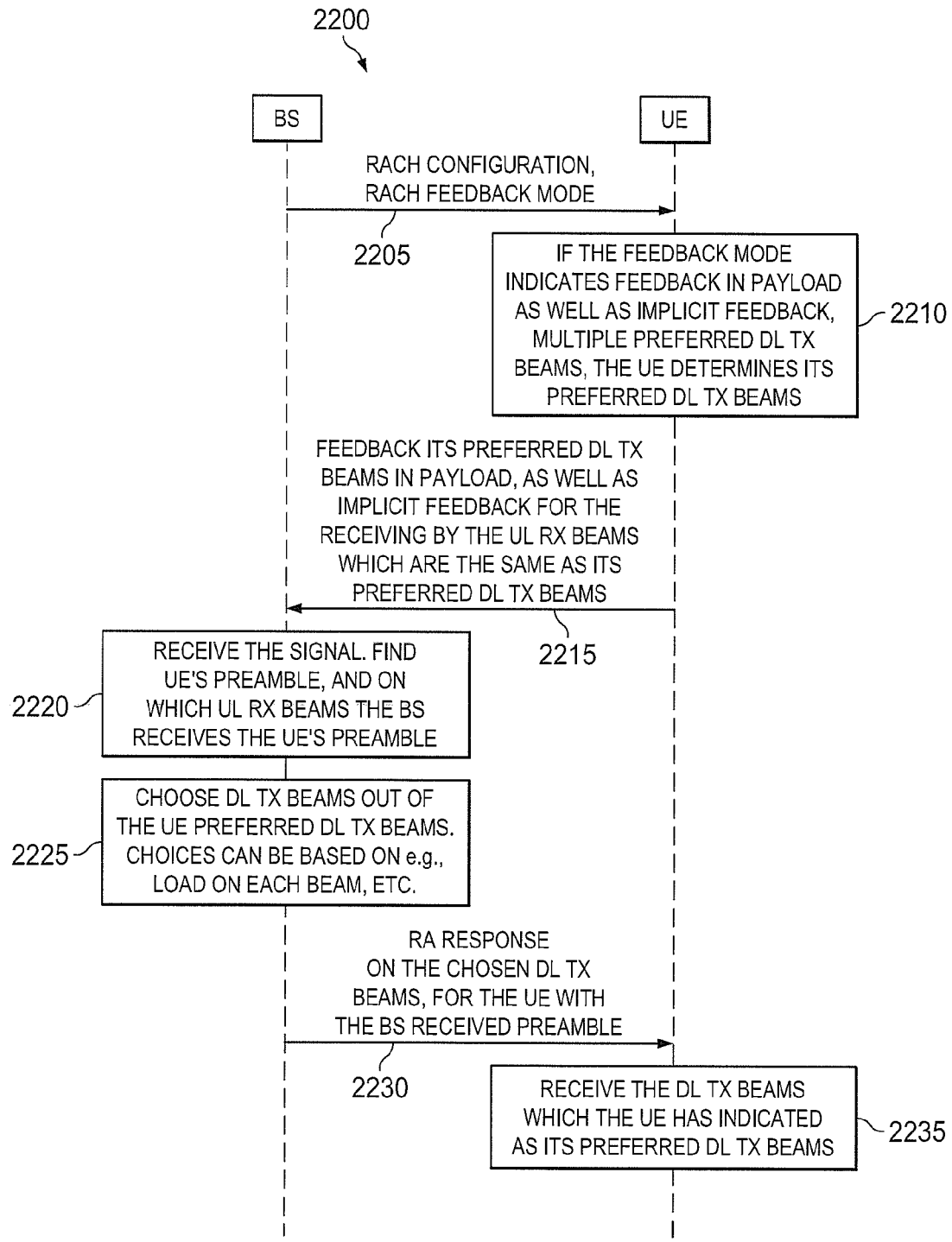
FIG. 22 illustrates an explicit-multiple UE's preferred DL TX beams feedback procedure according to embodiments of the present disclosure.

FIG. 22 illustrates an explicit-multiple UE's preferred DL TX beams feedback procedure 2200 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a mobile station.

The above embodiments with one preferred DL TX beam can be extended to embodiments with a multiple of UE's preferred DL TX beams. The UE can carry out the same steps for each of the multiple of the UE's preferred DL TX beams. For each of its preferred DL TX beams, the UE can send 2215 the feedback of the preferred DL TX beam in the random access signal payload, and transmit the signal for being receiving by the BS RX beam which can be the same as the preferred feedback DL TX beam in the random access signal payload.

The BS receives 2220 the random access signal over the UL RX beams, and the BS should compare the UE's preferred DL TX beam ID in the signal from PRACH with the identifier of the BS RX beam which receives the UE's signal on PRACH. If they are the different, the BS should disregard the PRACH signal. If they are the same, and if there are one or multiple of the preferred DL TX beams identified (i.e., passing the comparison testing), the BS and the UE can then perform the multiple beams approach as in the embodiments associated with FIG. 19.

In certain embodiments, the following method can be used for the case of UE feeds back its preferred DL beams explicitly (and it can feed back this preferred DL beams implicitly), consuming payload, and feeds back one or multiple preferred DL beams.

As an extension of the step (i) in the above embodiments associated with FIG. 19 for multiple beams, when a BS has its TX and RX beams calibrated, e.g., the TX beams or beam patterns are the same as the RX beams or beam patterns, a UE can feed back a first subset of a first set of its one or multiple preferred DL TX beams, explicitly by sending the random access signal (including preamble for the random access) on physical random access channel (PRACH) at a resource (e.g., timing, frequency, beam, and the like). The UE can also feedback a second subset of the first set of its preferred DL TX beams implicitly by sending the random access signal on physical random access channel (PRACH) at a resource (e.g., timing, frequency, beam, and the like) for the receiving by BS RX beams which are the same as the UE preferred DL TX beams.

For the explicit feedback of the UE's preferred DL TX beam, the method can be, e.g., the UE's preferred DL TX beam identifier (ID) can be part of the preamble (e.g., first a few bits, or last a few bits, and the like), or can be separate of the preamble, or can be concatenated with the preamble. If there are multiple of preferred DL TX beams, the UE can also send the random access signal multiple instances for the receiving by multiple of the BS RX beams which can be within the first set of the UE's preferred DL TX beams.

The first set of the UE's preferred DL TX beams can be the union of the first subset and the second subset of the UE's preferred DL TX beams.

One option is that the first subset and the second subset can be the same. In the option, if it is per DL TX beam based, i.e., for each of its preferred DL TX beams, the UE can send feedback of the preferred DL TX beam in the random access signal payload, and transmit the signal for the receiving by the BS RX beam which can be the same as the said feedback DL TX beam in the random access signal payload, error detection can be used, such as the method in previous embodiment.

Another option is that the first subset and the second subset can be disjoint or overlapping, and the elements in both subsets should be all treated as the UE's preferred DL TX beams.

Yet another option is that the first subset can overrule the second subset, i.e., only the elements in the first subset are the UE's preferred DL TX beams (as indicated in the random access signal payload), while the elements in the second subset are not treated as the UE's preferred DL TX beams.

The UEs and the BS should have the same understanding and same disclosure of the options, i.e., the UEs and the BS should use the same option. Such understanding can be preconfigured or predefined.

As an extension of the step (ii) in the above embodiments associated with FIG. 18 for multiple beams, once the BS receives the signal from PRACH on its one or multiple UL RX beams, the BS should FIGURE out the UE's preferred DL TX beam or beams, based on the preconfigured or predefined understanding of the options above.

If there are multiple of such DL TX beams, the BS can choose some or all of these multiple DL TX beams that the UE prefers. The BS can then send the first next DL transmission or signal (e.g., the random access response) to the UE, using the BS chosen DL TX beams out of the UE preferred DL TX beams, which are the UL RX beams that the BS receives the UE's PRACH signal.

The BS can also choose some or all of these multiple DL TX beams that the UE prefers as the UL RX beams to receive the next scheduled information or scheduled signal from the UE. The chosen DL TX beam(s) and the chosen DL RX beam(s) can be same or different. The first next DL transmission signal can include the information on the BS chosen UL RX beams out of the UL RX beams which receive the UE's PRACH signal will be receiving at which time (e.g., identified by which frame, subframe, slots, or symbols, and the like), at which frequency (e.g., which band, subband, subcarriers, and the like) from the UE.

The BS can also choose one or multiple of the DL TX beams for a second next DL transmission or signal (e.g., the contention resolution). The first next DL signal can include the information (e.g., the beam ID) of the BS chosen DL TX beam or beams for the second next DL signal.

In certain embodiments, the following steps can be used for the case of UE feeds back its preferred DL beams, when the beams or beam patterns are not calibrated at the BS TX and RX.

In step (i), when a BS has the TX beams or beam patterns different from the RX beams or beam patterns, the UE can feed back a first set of its one or multiple preferred DL TX beams, explicitly by sending the random access signal (including preamble for the random access) on physical random access channel (PRACH) at a resource (e.g., timing, frequency, beam, and the like).

For the explicit feedback of the UE's preferred DL TX beam, the process can be, e.g., the UE's preferred DL TX beam identifier (ID) can be part of the preamble (e.g., first a few bits, or last a few bits, and the like), or can be separate of the preamble, or can be concatenated with the preamble. The UE may need to try to send random access signal using all its TX beams.

In step (ii), once the BS receives the signal from PRACH on its one or multiple UL RX beams, the BS should regard the feedback carried in the received signal from the PRACH, as the DL TX beams that the UE prefers for the first next DL transmission (e.g., the random access response) to the UE.

If there are multiple of such DL TX beams, the BS can choose some or all of these multiple DL TX beams that the UE prefers.

The BS can then send the first next DL transmission or signal (e.g., the random access response) to the UE, using the BS chosen DL TX beams out of the UE preferred DL TX beams.

The BS can also choose UL RX beams to receive the next scheduled information or scheduled signal from the UE. The first next DL transmission signal can include the information on the BS chosen UL RX beams out of the UL RX beams which receive the UE's PRACH signal will be receiving at which time (e.g., identified by which frame, subframe, slots, or symbols, and the like), at which frequency (e.g., which band, subband, subcarriers, and the like) from the UE.

The BS can also choose one or multiple of the DL TX beams for a second next DL transmission or signal (e.g., the contention resolution). The first next DL signal can include the information (e.g., the beam ID) of the BS chosen DL TX beam or beams for the second next DL signal.

In step (iii), since the UE does not know which one or multiple of its preferred DL TX beams that the BS would choose, the UE receives the first next DL signal (e.g., the random access response) from the said its preferred DL TX beams of the BS. For example, the UE can start receiving the signal from its preferred DL TX beams one after another, until it gets a signal, the UE does not need to continue on receiving the signal from the remaining its preferred DL TX beams.

The UE can then send the UL scheduled signal to the BS for the BS to receive at the UL RX beam or beams as the BS chooses. The scheduled signal from the UE can include a second set of one or multiple of its preferred DL TX beams or the good DL TX beams. If the second set of UE's preferred DL TX beams are not present, it means UE still prefers the DL TX beams in the first set.

In step (iv), the BS receives the UE's scheduled signal using its chosen UL RX beam or beams as chosen in step (ii). The BS also determine the DL TX beam or beams (e.g., choose from the received UE's preferred DL TX beams sent in the UL scheduled signal, based on load, and the like) to send the third next signal (e.g., the signal to the UE after the UE has succeeded the contention resolution) to the UE. The IDs of the chosen DL TX beams for the third next DL signal can be included in the second next signal (e.g., the signal for contention resolution). The BS sends the second next signal (e.g., the signal for contention resolution) using its chosen DL TX beam or beams which is chosen in step (ii) and notified to the UE.

The BS can also choose UL RX beams to receive the next scheduled information or scheduled signal (the UL signal after the second next DL signal such as the contention resolution) from the UE. The second next DL transmission signal can include the information on the BS chosen UL RX beams out of the UL RX beams will be receiving at which time (e.g., identified by which frame, subframe, slots, or symbols, and the like), at which frequency (e.g., which band, subband, subcarriers, and the like) from the UE.

In step (v), the UE receives the second next DL signal (e.g., the contention resolution) from the DL TX beam beams which are indicated by the UE received the first next DL transmission (e.g., the random access response) as in (xx3). If the UE passes the contention resolution, the UE gets its C-RNTI.

The UE can send the follow up UL signal, such as confirmation, UL grant request, etc, for the BS to receive at the UL RX beam or beams as determined in step (iv).

The UE can include a third set of one or multiple of its preferred DL TX beams or the good DL TX beams in the follow up UL signal.

In step (vi), the BS receives at the UL RX beam or beams which are determined in step (iv). The BS sends the said third next DL signal (e.g., the signal to the UE after the UE has succeeded the contention resolution) to the UE). The third next DL signal can include the fourth next DL signal's DL TX beam(s), as well as the UL grant or UL scheduling for the UE to send the following UL signal.

In certain embodiments, when channel reciprocity does not hold for DL and UL, the BS can also include its preferred UL TX beam or beams in the first next DL signal (e.g., the random access response). The BS can also include the UL reference signal configuration in the first next DL signal (e.g., the random access response). The BS can use UL reference signal from the UE to measure the UL channel status. The UE can use the BS preferred UL TX beam or beams as indicated by the BS. The UE can send UL reference signal as configured by the BS.

When channel reciprocity does not hold for DL and UL, the BS can also include its preferred UL TX beam or beams in the second next DL signal (e.g., the contention resolution). The BS can also include the UL reference signal configuration in the second next DL signal (e.g., the contention resolution). The BS can use UL reference signal from the UE to measure the UL channel status. The UE can use the BS preferred UL TX beam or beams as indicated by the BS. The UE can send UL reference signal as configured by the BS.

In certain embodiments, a user equipment (UE) can perform the measurement of the DL beams, e.g., via the reference signals. From the broadcast information, UE can get the configuration of RACH, including RACH opportunities, RACH resources, and the like.

The UE can feed back the UE's preferred DL beam, together with preamble, in physical random access channel (PRACH). The feedback of the UE's preferred DL beam can be implicit or explicit, e.g., the feedback preferred DL beam index can be implicitly or explicitly embedded in the RACH preamble code. For example, if there are four DL beams, a two-bit index can be used to indicate one of these four beams. The two-bit index can be included in the RACH preamble sent from the UE. UE can select its RACH preamble, and send it at the RACH resource, or the resource of PRACH, or the RACH opportunity. UE sends its RACH preamble to resource of PRACH.

In certain embodiments, the UE can also feedback one or multiple of its preferred DL TX beams. When the UE needs to feedback multiple of its preferred DLTX beams, it can use, e.g., some preambles with longer length than the preamble for only feeding back one DL TX beam.

In certain embodiments, when channel reciprocity can be assumed and the BS TX and RX beams are calibrated, (e.g., the beams for the DL TX and UL RX are the same), the UE can send the RACH preamble to the BS RX beam which corresponds to (or which is the same as) the UE's preferred DL beam.

The UL RX beams at the BS to receive the UE's preamble, can be receiving at different times. These times can be informed to the UE in the DL broadcast channel beforehand. E.g., if the UE finds out BS DL TX beam #2 is its preferred beam, and BS UL RX beam #2 is the same as BS DL TX beam #2, and BS UL RX beam #2 will be receiving at time t1, then the UE can send the preamble at an estimated time such that the BS can receive it at time t1.

The UE can send the preamble at the time that the BS uses RX beam #2 to receive. For example, BS can have RX beam #2 up for a certain period of time, so as to allow UEs at different TX beams to transmit signal and to be received. The up-time that RX beam #2, in this example, can be long enough taking into account the timing advance. Alternatively, it can be that, the UE may need to send the preamble in all directions.

The UE can feed back one or multiple of the preferred DL beams. UE can send the preamble to the BS, and BS receives at certain RX beam. The BS sends back information to the UE, using the same beam as the BS RX beam. The BS can carry BS RX beam it would use for the next round, in the payload information.

In certain embodiments, the BS detects preambles at certain resources. For each resource, it can have a corresponding RA-RNTI code. In each resource, the BS can also detect one or multiple preambles. The BS puts the information to the UEs whose preambles or the feedbacks indicating to the same preferred DL TX beam together, into the said DL TX beam, to be transmitted over the said DL TX beam. But they can be related to different PRACH resources hence corresponding to different RA-RNTIs.

The BS sends PDCCHs marked with RA-RNTIs (can be for a group of UEs that the BS detects their attempts at the resources, and these UEs can have the same or different preambles.), as well as in data resource, the UL grant, timing adjustment, temp C-RNTI, the like. RA-RNTI is corresponding to the PRACH resource in which the preamble is transmitted.

In certain embodiments, the UL sync done by adjusting timing, the like. The UE decodes PDCCH on every slice, then it gets the data portion, to get the next round which PDCCH slice the UE would use.

Alternative: UE only decodes PDCCH on the slice that it feeds back. The data to UE would be also just in the slice that the UE feeds back. If preamble matches, UE sends scheduled information to the BS, including temp C-RNTI and contention resolution ID (such as 48-bit UE MAC ID, globally unique).

In certain embodiments, BS sends a PDCCH (again on UE preferred DL slice) and shared channel, for the contention resolution (contention resolution ID). Now the BS can also indicate to the UE what the BS's determined DL TX slice to use for the next DL transmission.

In certain embodiments, UE only decodes PDCCH on the slice that the UE prefers. UE decodes the PDCCH on the slice indicated at the right timing (UE gets PCFICH, looks for the location for the PDCCH on the indicated slice, and goes to the right place). If successful, temp C-RNTI promotes to C-RNTI.

In certain embodiments, after RACH, UE gets a RNTI (@) Explicit signaling: BS tells UE which PDCCH slice it would use for the resource allocation of its unicast data UE blind decodes PDCCH marked by UE's RNTI. UE goes to the PDCCH slice indicated by the BS; UE then blind decode the resource allocation.

If the explicit signaling in (@) is not sent, the UE may need to try all the PDCCH slices, blind decode each of them, to find out. Note that the explicit signaling can also be implicit, e.g., UE tells which slice it wants, and assume the BS would always agree on it, then the UE can just try to decode the reported slice. Unless BS indicates explicitly, the UE would assume it is the one that the UE prefers or has fed back.

In certain embodiments, UE can go to PCFICH, get format of PDCCH. Alternatively, the UE can also go to secondary PBCH (SPBCH): e.g., for Secondary MIB (SMIB), to get the location of PDCCH (on slices) PCFICH, or SPBCH, is physical channel. The indication can be for per slice: e.g., PCFICH region x is for slice x. UE behavior can be simplified. The indication may not need to be fixed region for each slice, but it can be mixed and shared by slices: e.g., one shared region, inside it, indicates which PDCCH slide is in which resource. The UE may need to decode everything inside.

In certain embodiments, all the procedures can be applied and extended to the random access procedure, which can be used, e.g., for the initial access when establishing a radio link; to re-establish a radio link after radio-link failure, for the handover when UL synchronization needs to be established to the new cell, to establish UL synchronization if UL or DL data arrives when the UE is in connected mode and the UL is not synchronized; for the purpose of positioning using positioning methods based on UL measurements; as a scheduling request if no dedicated scheduling-request resources have been configured on physical UL control channel.

All the procedures can be also be applied and extended to the random access procedure which may not need the contention resolution, or contention-free random access. The contention free RACH can be used, e.g., for re-establishing UL synchronization upon DL data arrival, handover, and positioning. In the contention free RACH, the UE can be told by the BS about the preamble, and the resources (e.g., time, frequency, beams, power, beamwidth, antenna gain, and the like) allocated for the UE to send signal on PRACH.

The embodiments of the present disclosure provide a variety of the RACH procedures in the millimeter-wave mobile broadband. Although described in exemplary embodiments, aspects of one or more embodiments can be combined with aspects from another embodiment without departing from the scope of this disclosure.

In certain embodiments, the BS indicates whether its TX and RX beams are calibrated, e.g., for the random access channel (RACH) procedure, or some other procedures such as open loop data communication, the initial network entry procedure, and the like.

The BS indicates the feedback method or mode to be used by the UE. The indication is explicit in the signal. Different methods are used for the BS TX and RX calibrated case, and non-calibrated case. The indication is also via a mapping function which maps some system information such as BS Effective Isotropic Radiation Power (EIRP) to the index of the feedback methods.

In RACH, or in any situation that the BS does not know which UE's preferred DL TX beam or beams would be, and if the base station has its TX and RX calibrated, such as TX and RX beams are the same, the UE sends preferred DL TX beam implicitly, by sending the information such as the RACH preamble to the BS's RX beam which is the same as the UE's preferred DL TX beam, and the BS knows which the UE's preferred DL is by knowing which of its UL RX beam receives the preamble. The UE also sends one or multiple of its preferred DL TX beams in the payload of PRACH channel, such as having some bits in RACH preamble to indicate which beam it would prefer, or having some bits separately to indicate one or multiple of its preferred DL TX beams, and the indicated beams may or may not include the one which is the same as the UL RX beam to which the UE sends preamble.

The BS sends random access response to the UE with the preamble received in the UE's preferred DL TX beams. If there are one or multiple UE's preferred DL TX beams, the BS chooses to send via one or multiple DL TX beams. The BS chooses to send via only one DL TX beam, the same one as the UL RX beam that BS receives the UE's preamble, even though the UE has indicated in the RACH signaling or preamble that the UE prefers multiple of the preambles. The UE needs to receive from its indicated preferred DL TX beams.

If for each of its preferred DL TX beams, the UE sends a feedback of the preferred DL TX beam in the random access signal payload, and transmit the signal for being receiving by the BS RX beam which is be the matched with the feedback DL TX beam in the random access signal payload, use it for error detection. If matches, the BS sends a random access response. If no match, discard it. Then the UE retry the procedure.

A UE receives the information on its RX beam to receive the information from its preferred DL TX beam. Since the UE does not know which beam the BS can choose to TX, the UE tries to receive on all its preferred DL TX beams. As an alternative, the UE only tries to receive the information from one DL TX beam, the same one as the UL RX beam that BS receives the UE's preamble.

A physical secondary broadcast channel (PSBCH) indicates the Physical Downlink Control Channel (PDCCH) resource location. The PSBCH can indicate whether the PDCCH for each beam is scheduled or exists in the current subframe, and if it exists, where is the resource allocation or the zone for the PDCCH of the beam. When a UE decodes the PSBCH, it can find, whether the PDCCH for each beam exists in the current subframe. Not all of the PDCCH can exist in the same subframe. If the PDCCH, e.g., for the unicast data to certain UEs, is not scheduled in the current subframe, the PSBCH will indicate that the PDCCH for that beam does not exist in the current subframe, hence the UE does not need to proceed to go to decode the PDCCH, if the UE has a current association to the said PDCCH on the said beam. Otherwise, if the UE finds that the PDCCH that it currently associates is scheduled in the current subframe, the UE further go to the PDCCH to decode it, to find out whether its data is scheduled.

A UE is associated with one or multiple of the PDCCHs on one or multiple of the beams. When a UE is associated with a PDCCH beam, the PDCCH carries the information for the UE's data resource allocation and so on, or the PDCCH can carry the information for the UE's unicast data, if the UE is scheduled.

A PSBCH has a common region to point to one or multiple of the zones for the PDCCHs. The PSBCH also has a separate region for each of the PDCCH zone. The PSBCH has predefined resources, as a predefined physical channel, for example. The UE knows it beforehand. If there are multiple of the regions for PSBCH, each of the regions is predefined for the resources and the UE knows the resource allocation beforehand, hence the UE may not need to go to the regions that it does not have association with the PDCCHs. Alternatively, the UE can have blind decoding to find out the region for each of the beams.

A PSBCH informs the PDCCH location to the UE. For example, a bit map is used where the bit map size is the number of PDCCH beams, and wherein each bit (if set to 1) indicates whether the beam is carried in this subframe. For broadcast information, all of the beams are used hence the bit map is all 1s. For multicast or unicast, some of the beams are used, hence the bit map indicates 1s and 0s.

A BS informs the UE which DL TX beam will be used for the next transmission to the said UE. The UE tries to receive the information from the said DL TX beam of the BS. The BS also informs the UE about the best DL TX beam for the UL grant.

The UE sends the information of its preferred DL beam in the scheduled UL grant.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing random access by a User Equipment (UE) in a wireless network, the method comprising:
   selecting a pair of a beam power and a beamwidth of at least one UE transmit beam for an initial random access signal, the beam power and the beamwidth adjustively paired with each other to enable the at least one UE transmit beam to reach a base station;
   generating the at least one UE transmit beam having the pair of the beam power and beamwidth, using an antenna array according to a configuration;
   transmitting the random access signal to the base station (BS) on the at least one UE transmit beam;
   determining at least one UE preferred Downlink (DL) transmit (DL TX) beam; and
   feeding back, to the BS, the at least one UE preferred DL TX beam on the at least one UE transmit beam either explicitly or implicitly, wherein feeding back the at least one UE's preferred DL transmit beam implicitly comprises:
      sending the random access signal on the at least one UE transmit beam at a timing for being overlapped with a BS receive (BS RX) beam, the BS RX beam being matched with the at least one UE preferred DL TX beam.

2. The method of claim 1, wherein the pair of the beam power and the beamwidth of the at least one UE transmit beam is determined based on at least one of requirements comprising: a velocity of the UE, a latency of the random access, a call priority, or a path loss.

3. The method of claim 2, further comprising:
   adjusting the pair of the beam power and the beamwidth for a retransmission of the UE transmit beam to reach further or less, depending whether the transmission of the initial random access signal fails or succeeds.

4. A method for performing random access by a Base Station (BS) in a wireless network, the method comprising:
   receiving a random access signal on at least one User Equipment (UE) transmit beam having a pair of a beam power and a beamwidth, the beam power and the beamwidth adjustively paired with each other to reach the BS, from a UE;
   configuring at least one downlink transmit (DL TX) beam for transmitting a response to the random access signal;
   transmitting the response to the random access signal to the UE on the at least one DL TX beam;
   determining, by the UE, the at least one UE preferred DL TX beam;
   feeding back, by the UE to the BS, the at least one UE's preferred DL TX beam on the at least one UE transmit beam either explicitly or implicitly based on the feedback mode;
   determining at least one UE preferred DL TX beam from the at least one UE transmit beam; and
   sending the response to the random access signal on the at least one UE preferred DL TX beam at a timing for being overlapped with a BS receive (BS RX) beam, the BS RX beam being matched with the at least one UE preferred DL TX beam.

5. The method of claim 4, wherein
   the pair of the beam power and the beamwidth of the at least one UE transmit beam for an initial random access signal is determined based on at least one of requirements comprising: a velocity of the UE, a latency of the random access, a call priority, or a path loss.

6. The method of claim 4, further comprising:
   transmitting a feedback mode information for at least one UE preferred DL transmit (DL TX) beam to the UE.

7. A user equipment for performing random access in a wireless network, the User Equipment (UE) comprising a processing circuit configured to:
   select a pair of a beam power and a beamwidth of at least one UE transmit beam for an initial random access signal, the beam power and the beamwidth adjustively paired with each other to enable the at least one UE transmit beam to reach a Base Station (BS);

generate the at least one UE transmit beam using an antenna array having the pair of the beam power and the beamwidth, according to a configuration;

transmit the random access signal to the BS on the at least one UE transmit beam;

determine at least one UE preferred DL transmit (DL TX) beam; and feed back, to the BS, at least one UE preferred DL TX beam on the at least one UE transmit beam either explicitly or implicitly, wherein the processing circuit is further configured to send the random access signal on the at least one UE transmit beam at a timing for being overlapped with a BS receive (BS RX) beam, the BS RX beam being matched with the at least one UE preferred DL TX beam.

8. The user equipment of claim 7, wherein the pair of the beam power and the beamwidth of the at least one UE transmit beam for an initial random access signal is determined based on at least one of requirements comprising: a velocity of the UE, a latency of the random access, a call priority, or a path loss.

9. The user equipment of claim 8, wherein the processing circuit is further configured to adjust the pair of the beam power and the beamwidth for a retransmission of the at least one UE transmit beam to reach further or less, depending whether the transmission of the initial random access signal fails or succeeds.

10. A base station for performing random access by a Base Station (BS) in a wireless network, the BS comprising a processing circuit configured to:

receive a random access signal on at least one User Equipment (UE) transmit beam having a pair of a beam power and a beamwidth, the beam power and the beamwidth adjustively paired with each other to reach the BS, from a UE;

configure at least one downlink transmit (DL TX) beam for transmitting a response to the random access signal; and transmit the response to the random access signal to the UE on the at least one DL TX beam;

determine the at least one UE preferred DL TX beam; and feed back, to the BS, the at least one UE preferred DL TX beam on the at least one UE transmit beam either explicitly or implicitly, based on the feedback mode, wherein the processing circuit is further configured to determine the at least one UE preferred DL TX beam from the at least one UE transmit beam, and send the response to the random access signal on the DL TX beam at a timing for being overlapped with by a BS receive (BS RX) beam, the BS RX beam matched with the UE preferred DL TX beam.

11. The base station of claim 10, wherein the pair of the beam power and the beamwidth of the at least one UE transmit beam for an initial random access signal, based on at least one of requirements comprising: a velocity of the UE, a latency of the random access, a call priority, or a path loss.

12. The base station of claim 10, wherein the processing circuit is further configured to transmit a feedback mode information for at least one UE preferred DL transmit (DL TX) beam to the UE.

* * * * *

UNITED STATES PATENT AND TRADEMARK OFFICE
CERTIFICATE OF CORRECTION

PATENT NO. : 9,468,022 B2
APPLICATION NO. : 14/133483
DATED : October 11, 2016
INVENTOR(S) : Ying Li et al.

Page 1 of 1

It is certified that error appears in the above-identified patent and that said Letters Patent is hereby corrected as shown below:

On the Title Page

After Item (65) Prior Publication Data, insert:
--Related U.S. Application Data
(60) Provisional application No. 61/745,977, filed on Dec. 26, 2012, provisional application No. 61/748,363, filed on Jan. 2, 2013.--

Signed and Sealed this
Twenty-fourth Day of December, 2019

Andrei Iancu
*Director of the United States Patent and Trademark Office*